(12) United States Patent
Neil

(10) Patent No.: US 12,298,499 B2
(45) Date of Patent: May 13, 2025

(54) RESIDUAL ABERRATION CONTROLLER FOR ADJUSTABLE AESTHETIC IMAGING IN IMAGING OPTICAL SYSTEMS

(71) Applicant: Iain A. Neil, Canobbio (CH)

(72) Inventor: Iain A. Neil, Canobbio (CH)

( * ) Notice: Subject to any disclaimer, the term of this patent is extended or adjusted under 35 U.S.C. 154(b) by 359 days.

(21) Appl. No.: 17/950,288

(22) Filed: Sep. 22, 2022

(65) Prior Publication Data

US 2023/0273428 A1 Aug. 31, 2023

Related U.S. Application Data

(60) Provisional application No. 63/250,504, filed on Sep. 30, 2021.

(51) Int. Cl.
G02B 27/00 (2006.01)

(52) U.S. Cl.
CPC ..... G02B 27/0056 (2013.01); G02B 27/0068 (2013.01); G02B 27/0075 (2013.01)

(58) Field of Classification Search
CPC ............ G02B 27/0056; G02B 27/0068; G02B 27/0075
USPC ........................................................ 359/673
See application file for complete search history.

(56) References Cited

U.S. PATENT DOCUMENTS 6,664,529 B2 12/2003 Pack et al.
9,797,980 B2 10/2017 Smitherman
9,798,928 B2 10/2017 Carr et al.
9,898,688 B2 2/2018 Bleiweiss
10,266,263 B2 4/2019 Zhang et al.
10,565,789 B2 2/2020 Livens et al.
10,901,437 B2 1/2021 Zhang et al.
(Continued)

FOREIGN PATENT DOCUMENTS

CN 110827415 A 2/2020
KR 101150510 B1 5/2012
WO 2011054040 A1 5/2011

OTHER PUBLICATIONS

International Search Report and Written Opinion dated Dec. 23, 2022, issued in connection with PCT/US2022/044338, filed Sep. 22, 2022.

*Primary Examiner* — William Choi
(74) *Attorney, Agent, or Firm* — Downs Rachlin Martin PLLC

(57) ABSTRACT

A residual aberration controller arranged in the optical path of an image-forming light beam to create an aesthetic effect in an otherwise sharp image by selectively introducing residual aberrations into the wavefront of the image-forming light beam. The residual aberration controller is adjustable between a first configuration that provides either no substantial change or a relatively small aesthetic change to the otherwise sharp image and a second configuration that provides a substantial change to the sharp image to create the aesthetic effect. Aesthetic effects can include, to varying degrees, flare, bokeh, image softening, anamorphic and related effects that are desirable in certain imaging applications but that are difficult to produce in a quick and reversible manner. The residual aberration controller can be combined with almost any type of objective lens to achieve aesthetic imaging effects quickly, affordably and reversibly by a simple adjustment and without defocus.

24 Claims, 38 Drawing Sheets

(56) References Cited

U.S. PATENT DOCUMENTS

| | | | |
|---|---|---|---|
| 2012/0075719 A1* | 3/2012 | Ryu | G02B 27/646 |
| | | | 359/693 |
| 2017/0277951 A1 | 9/2017 | Wagner et al. | |
| 2018/0284404 A1 | 10/2018 | Shimomura et al. | |
| 2018/0356617 A1 | 12/2018 | Yamada et al. | |
| 2019/0094344 A1 | 3/2019 | Steinmann et al. | |
| 2019/0387175 A1 | 12/2019 | Kikuchi et al. | |

* cited by examiner

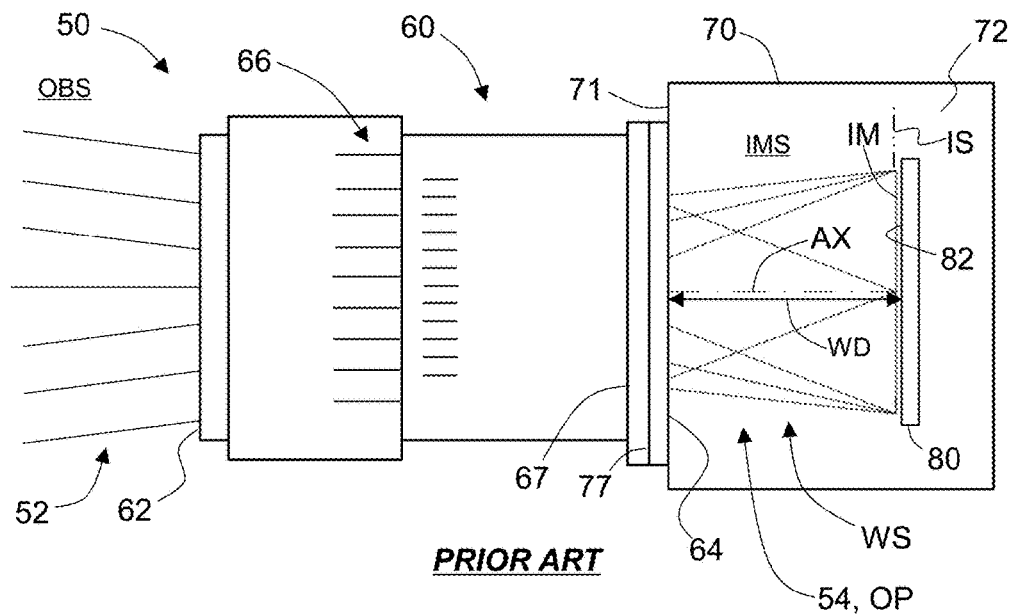
FIG. 1A *PRIOR ART*
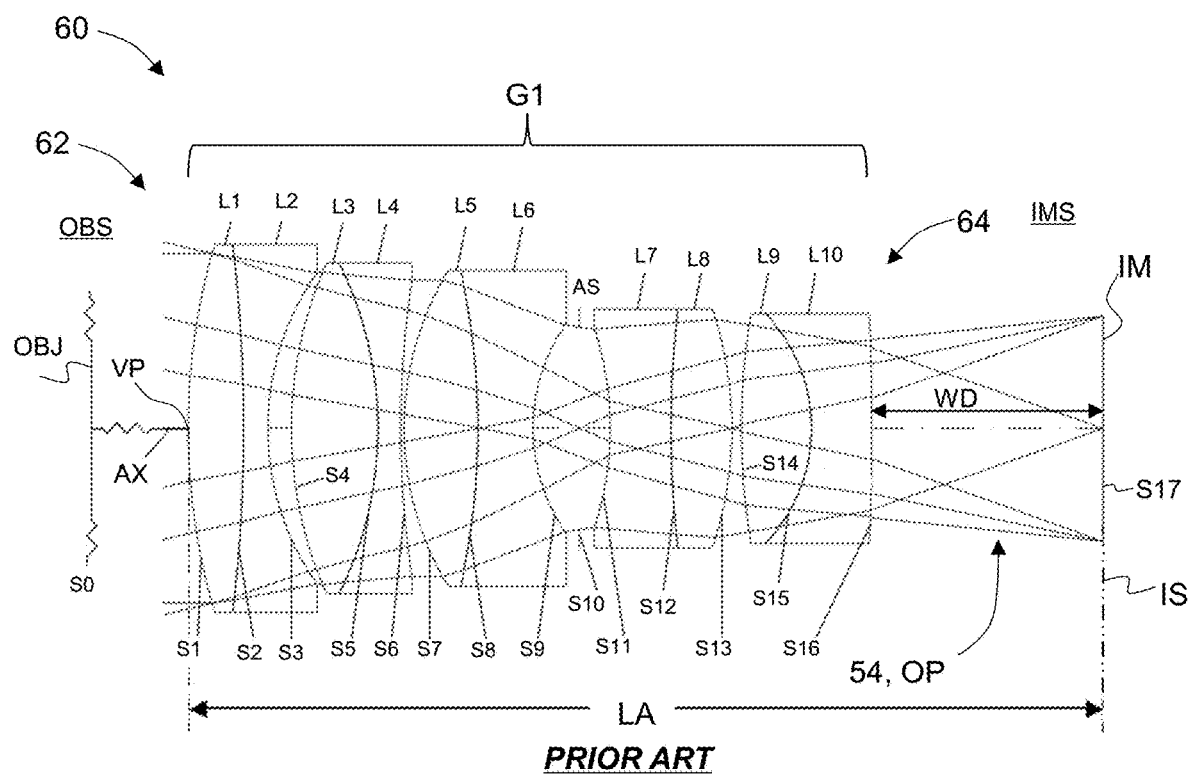
FIG. 1B *PRIOR ART*

Objective Lens + RAC

300

Object - Center

302

Image - Objective Only

Object - Corner

304

Image - Objective Only

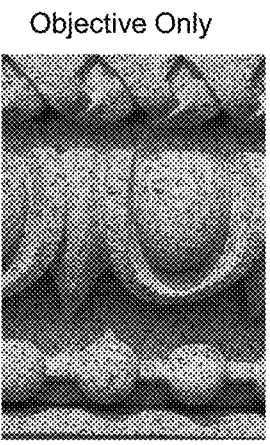 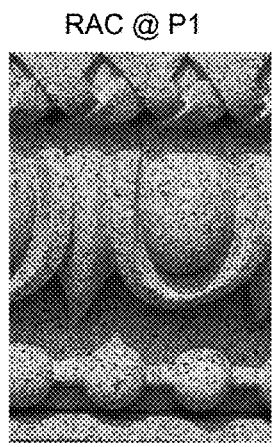 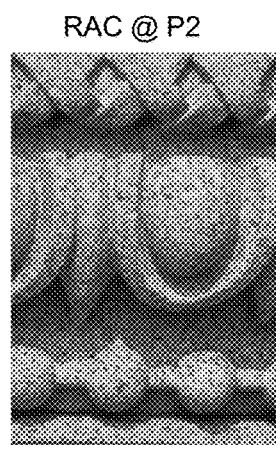 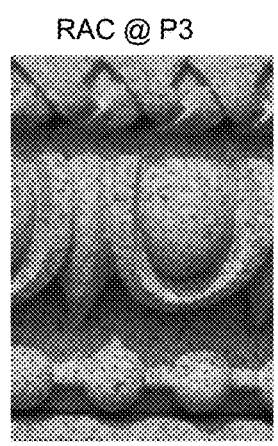
FIG. 19A  FIG. 19B  FIG. 19C  FIG. 19D
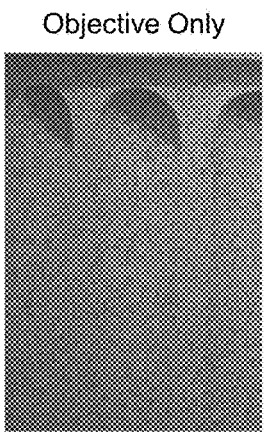 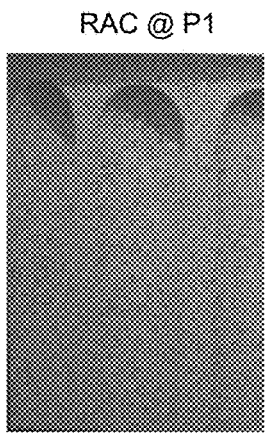 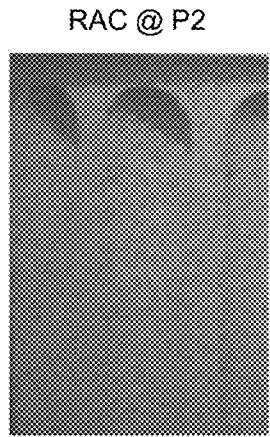 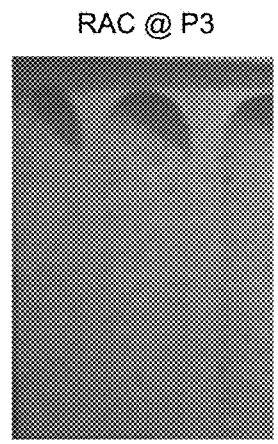
FIG. 20A  FIG. 20B  FIG. 20C  FIG. 20D

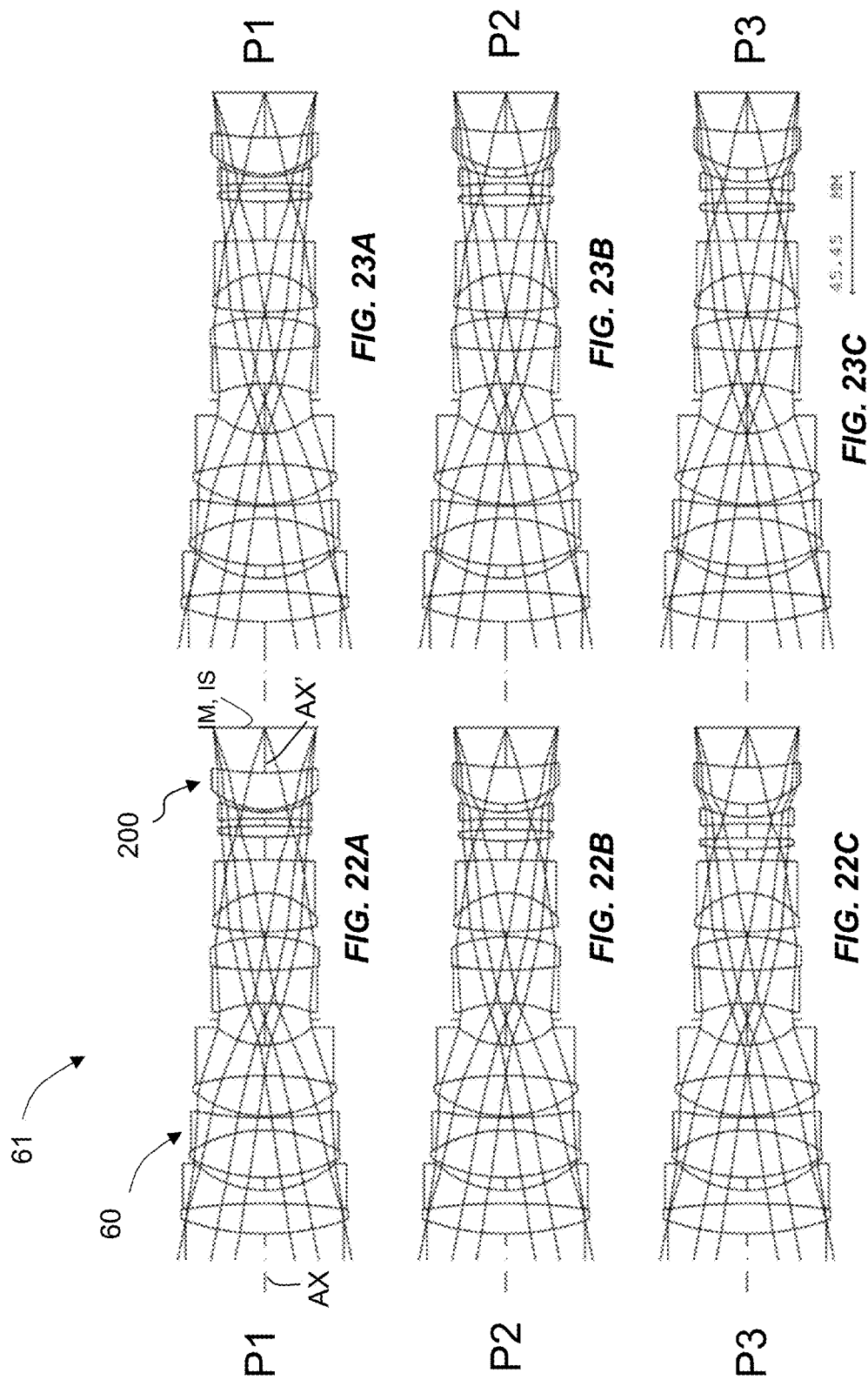

Objective Only

RAC @ P1

RAC @ P2

RAC @ P3

Objective Only

RAC @ P1

RAC @ P2

RAC @ P3

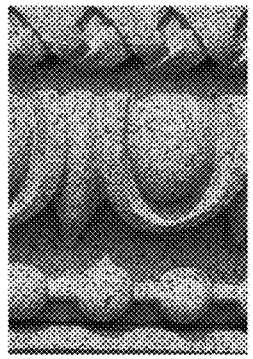 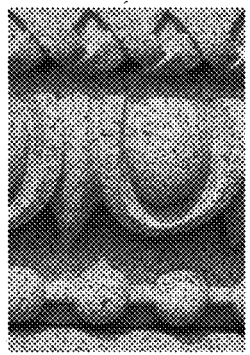 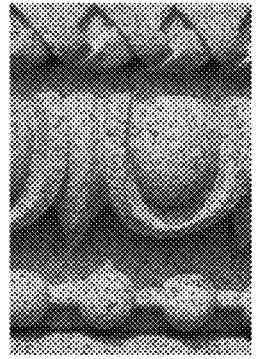 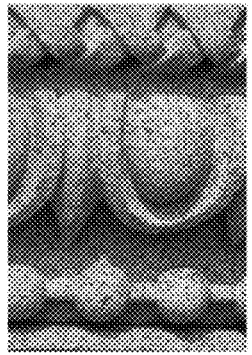
FIG. 28A   FIG. 28B   FIG. 28C   FIG. 28D
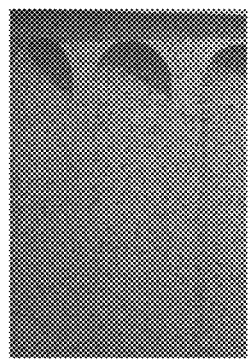 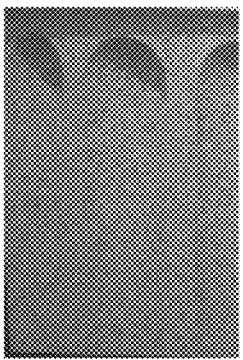 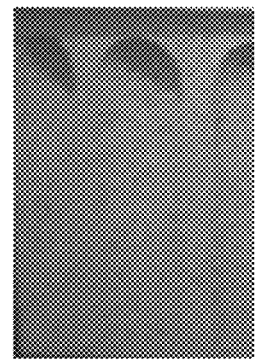 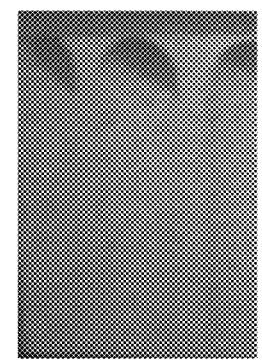
FIG. 29A   FIG. 29B   FIG. 29C   FIG. 29D Objective Only 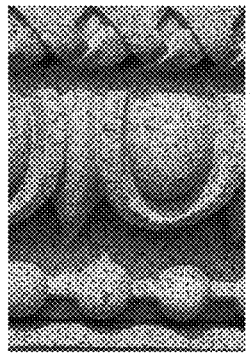
RAC @ P1 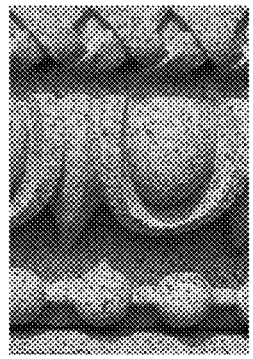
RAC @ P2 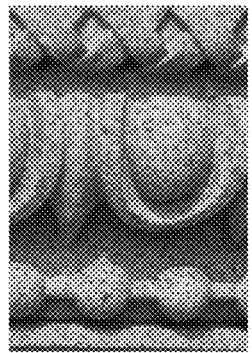
RAC @ P3 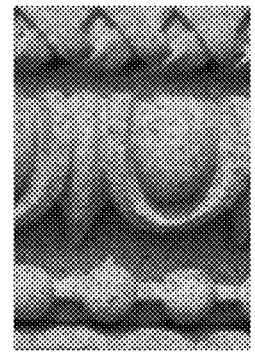
*FIG. 33A*  *FIG. 33B*  *FIG. 33C*  *FIG. 33D*
Objective Only 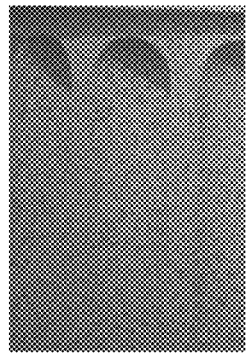
RAC @ P1 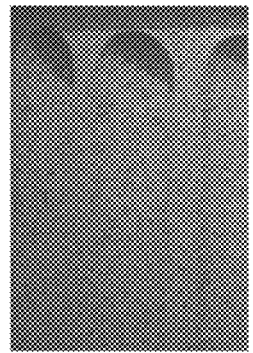
RAC @ P2 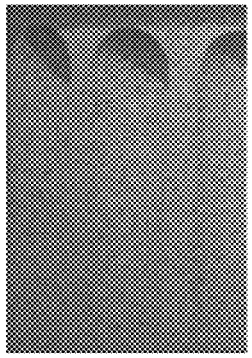
RAC @ P3 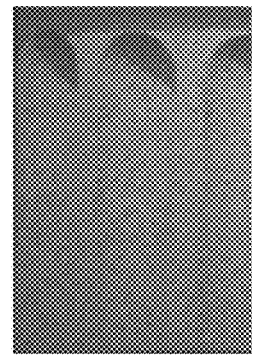
*FIG. 34A*  *FIG. 34B*  *FIG. 34C*  *FIG. 34D*

27.78 mm

Objective Lens + RAC

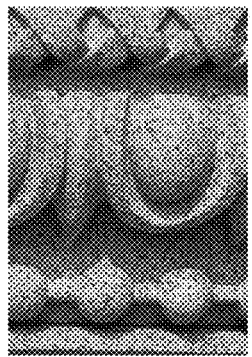   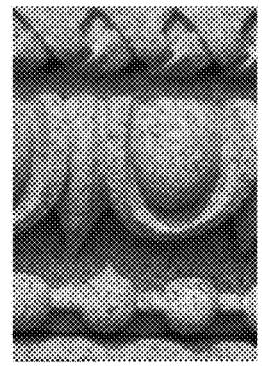
Objective Only / RAC @ P1 / RAC @ P2 / RAC @ P3
*FIG. 37A*  *FIG. 37B*  *FIG. 37C*  *FIG. 37D*
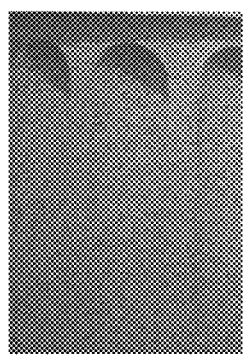 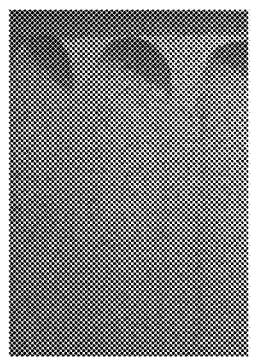 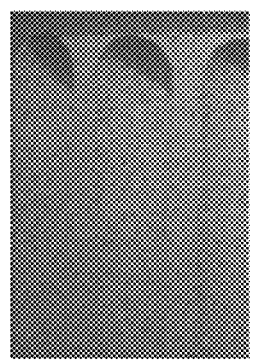 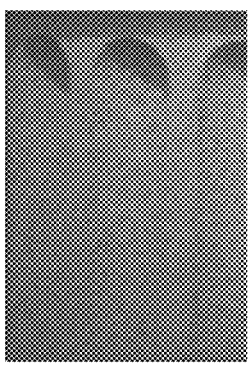
Objective Only / RAC @ P1 / RAC @ P2 / RAC @ P3
*FIG. 38A*  *FIG. 38B*  *FIG. 38C*  *FIG. 38D*

25.00 mm

Objective Lens + RAC

Objective Only

RAC @ P1

RAC @ P2

RAC @ P3

Objective Only

RAC @ P1

RAC @ P2

RAC @ P3

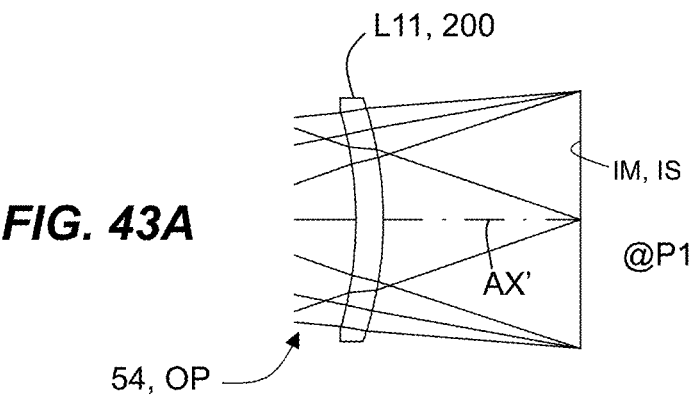
FIG. 43A
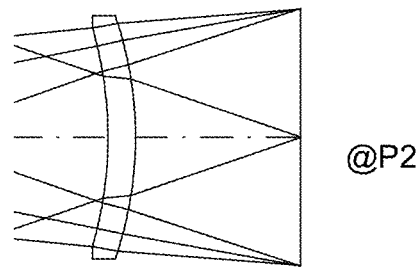
FIG. 43B
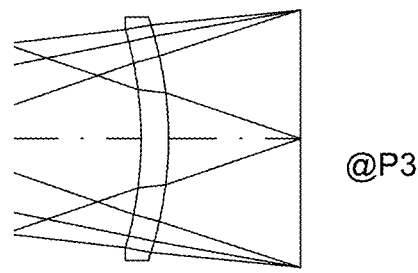
FIG. 43C
27.78 mm Objective Lens + RAC

RESIDUAL ABERRATION CONTROLLER FOR ADJUSTABLE AESTHETIC IMAGING IN IMAGING OPTICAL SYSTEMS

CLAIM OF PRIORITY

This application claims the benefit of priority of U.S. Provisional Patent Application Ser. No. 63/250,504, filed Sep. 30, 2021, and titled "Residual Aberration Controller for Adjustable Aesthetic Imaging in Imaging Optical Systems", which is incorporated by reference herein in its entirety.

FIELD

The disclosure relates to imaging optical systems, and in particular to an adjustable device that can be used in a wide range of imaging optical systems to achieve aesthetic imaging effects in a controlled manner.

BACKGROUND

The field of cinematography generally involves performing motion-picture photography ("filming") by recording images of different scenes using a cinematographic camera that uses either film or a digital image sensor. To achieve desired artistic effects using close-up shots, wide-angle shots, defocused shots, etc., the cinematographic camera is adapted to accommodate a variety of imaging optical systems called "objective lenses". An objective lens having a single focal-length lens is referred to in the art as a "prime lens," while an objective lens having multiple-focal-length lenses is referred to in the art as a "zoom lens." An objective lens can utilize spherical elements, anamorphic elements or both.

Imaging optical systems are normally designed to provide the sharpest image possible. This is accomplished in the lens design process by using lens design software by minimizing optical aberrations.

The advent of high-resolution electronic (digital) sensors has caused a mass migration from film (analog) image capture to electronic (digital) image capture. Images captured with film tend to have a natural organic look whereas images captured electronically tend to have an artificial or "clinical" look. To make digital images more aesthetically pleasing and more like film images they need to be changed by some means that usually involves softening the images and making them less sharp. For example, lighting can be altered to make images softer and less sharp. Likewise, optical filters can be used either in front of, within or after the imaging optical systems (but upstream of the image plane) to make images softer and less sharp.

Although image softening can be performed after image capture using computer-based image processing, it is preferrable to be able to see the resultant image as it is captured and not later on away from the location of the image capture so that imaging adjustments (e.g., illumination, filtering, etc.) can be made in real time to optimize the particular aesthetic effect being sought.

Anamorphic imaging optical systems are known to provide softer (less sharp) images as compared to contemporary spherical imaging optical systems. Spherical imaging optical systems (which have all spherical lens elements) can be designed to produce softer images. Such anamorphic and spherical imaging optical systems may each have the limitation of producing only a single and fixed image performance that is not readily altered by the end user.

The known approaches to achieve softened images produce a single image performance that involves time and effort to realize, entails additional cost and may not provide the particular aesthetic rendering being sought. Spherical imaging optical systems designed to produce softer images have to be specially designed for the specific aesthetic effect and so cannot produce a sharp image, thereby requires an additional lens and a lens swap. Combinations of light sources, filters and specially designed imaging optical systems can also be used, but with the attendant increase in complexity and cost of the implementation. Likewise, multiple imaging optical systems that form only softened images can be designed and developed. However, this increases the total number of imaging optical systems required, which increases cost. For example, in cinematography, this would require a set of "softened" prime lenses along with a set of "sharp" prime lenses. Given that the cost of a single prime lens can be in the range of $5,000 to $40,000, and that the lenses typically have to be packaged and shipped to various filming locations, this very quickly becomes a very expensive undertaking even for low-cost lenses.

There is a long-felt need in the camera industry and especially in the cinematographic industry for an imaging optical system that can provide both sharp imaging and also a desired aesthetic imaging by making a simple and quick adjustment beyond just using defocus or by changing the lighting or optical filtering. The extent of this long-felt need is perhaps best illustrated by the fact that some have gone to the extreme length of taking prime lenses and knocking parts of them with a mallet in an effort to permanently reduce the lens performance to achieve a softened image.

SUMMARY

The disclosure is directed to a residual aberration controller (RAC) arranged in the optical path of an image-forming light beam to create an aesthetic effect in an otherwise sharp image. The aesthetic effective is caused by the RAC selectively introducing residual aberrations into the wavefront of the image-forming light beam. The RAC is adjustable between a first configuration (position) that provides either no substantial change or a relatively small aesthetic change to the otherwise sharp image and a second configuration (position) that provides a substantial change to the sharp image to create the aesthetic effect. Aesthetic effects can include, to varying degrees, flare, bokeh, image softening, anamorphic and related effects that are desirable in certain imaging applications but that are difficult to produce in a quick and reversible manner. The RAC can be combined with almost any type of objective lens to achieve aesthetic imaging effects quickly, affordably and reversibly by a simple adjustment and without defocus.

In some embodiments, the RAC disclosed herein is universal, meaning that it can be used with virtually any imaging optical system, including prime lenses and zoom lenses for different imaging applications where there is sufficient room, such as the working space between the imaging optical system and the image sensor.

In some embodiments, the RAC can be made swappable between different types of imaging optical systems. In an example, the RAC can be designed with a relatively large clear aperture so that it can be used with imaging optical systems having both small and large clear apertures.

In an example, the RAC can include an aperture stop that is adjustable to match the aperture of the imaging optical system.

In some embodiments, the RAC disclosed herein is axially adjustable between at least two different axial positions (configurations) that provide an imaging optical system (or more specifically, the combined imaging optical system of the imaging optical system and the RAC) with more than one type of image performance. One configuration of the RAC provides the smallest change to the imaging quality of the imaging optical system and in some examples can leave the imaging quality substantially unchanged while one or more other configurations there is a substantial change to the image quality to provide for an aesthetic imaging effect by introducing a suitable amount of residual aberrations. In some examples, all RAC configurations provide for an aesthetic imaging effect.

Aspects of the disclosure are directed to and are applicable to imaging optical systems such as spherical and anamorphic prime and zoom objective lenses.

The aesthetic imaging effect enabled by the RAC is achieved by means other than defocus. By defocusing an optical system, the image produced can be made less sharp but the image is only out of focus in the sense that refocusing the lens will make the image sharp again. The RAC disclosed herein is configured to adjust the amount of residual aberrations at the image in a select way that reduces the sharpness of the image in a manner that cannot be substantially sharpened by changing the lens focus.

The main primary aberrations of an optical system are spherical aberration, coma, astigmatism, field curvature, distortion and longitudinal and lateral chromatic aberrations. Since an imaging optical system is normally well corrected for residual aberrations, the RAC is configured to selectively introduce select types of residual aberrations in select amounts to reduce the sharpness of the image to achieve an aesthetic effect without completely degrading the image quality to the point where the image is unusable. For example, changing chromatic and distortion characteristics of an image do not usually significantly soften an image to make it less sharp, unless they are taken to extremes that cause an unacceptably large image performance degradation. By introducing select amounts of spherical aberration to the optical system, the sharpness of the axial and off-axis image performance is reduced. By introducing one or more of coma, astigmatism and field curvature to the optical system in select amounts, the sharpness of the off-axis image performance is reduced.

Changing the axial spacing of at least one lens element of the RAC relative to either the imaging optical system or the image surface or both enables modification of the image sharpness in a way that produces an aesthetic imaging effect. Where the RAC comprises multiple lens elements, the axial lens spacing(s) can be changed, as well as the spacing relative to either the imaging optical system or the image surface to adjust the amounts of residual aberrations needed to obtain different degrees of the aesthetic effect.

In some embodiments, the RAC has at least one position that introduces a minimum about of residual aberrations and this position is referred to as the "minimum configuration" that has the least effect on the imaging quality. In some cases where the minimum configuration produces virtually no change in residual aberrations of the optical imaging system, it can also be referred to as the "null configuration" or "null position. Having a null configuration allows for a changing between sharp imaging and aesthetic (i.e., softened) imaging by simply adjusting the configuration of the RAC much in the same way a zoom lens is adjusted. This allows for the RAC to remain in place rather than having to be physically removed from the combined imaging optical system when sharp imaging is desired. This also obviates the need for additional and separate objective lenses designed for softened imaging. Having a minimum configuration that is not a null configuration is also useful in that it allows for more choices (positions) for creating the aesthetic imaging effect. This may be an advantageous option for an embodiment where the RAC is configured to be readily attached to/detached from or inserted into/removed from the imaging optical system.

By producing various amounts of different residual aberrations, the RAC can change the overall image sharpness and image performance of the optical system. By selectively changing one or more of the field aberrations (e.g., coma, astigmatism and field curvature) for example, the off-axis image sharpness can be modified without substantially changing the on-axis image sharpness. This modified off-axis image sharpness can be adjusted for different image performance by introducing more or less coma, more or less astigmatism and/or more or less field curvature, thus altering the look of the image to make it less sharp, i.e., to appear visibly softer.

Different configurations of the RAC can be used with different prime or zoom imaging optical systems, as disclosed below. The RAC can also be used with different prime lenses and zoom lenses in embodiments where the RAC is configured as a module that can be added to and removed from (e.g., swapped into and out of) different imaging optical systems.

The RAC disclosed herein may comprise multiple lens elements and utilize multiple kinds of optical surface shape such as spherical, plano (flat), aspherical, cylindrical, toroidal asphere, free-form, etc. In other examples, the RAC can comprise a single lens element.

A RAC containing three lens elements and having up to three axial lens element movements allows for the RAC to be optimized to introduce different combinations of at least more or less coma, more or less astigmatism and/or more or less field curvature, thus producing a range of aesthetic effects in the image. The examples shown in FIGS. 22A through 22C and 23A through 23C and discussed below are good examples of this with a constant prescription of the lens elements and the only difference being in the different axial movements of the lens elements. In other words, an example RAC can have more than one sets of axial positions of the lens elements, thereby defining more than one RAC configuration.

To minimize optical and mechanical complexity and reduce cost, the RAC may have only two axial lens element movements. Thus, embodiments of the RAC can either comprise or consist of two or more optical elements, with only two optical elements being axially movable between the first position and the second position.

To further minimize optical and mechanical complexity and reduce cost, the RAC may contain only two lens elements where only one of the two optical elements has an axial movement (i.e., is axially moveable). Thus, embodiments of the RAC can either comprise or consist of first and second optical elements wherein only one of these first and second optical elements is axially movable between at least a first position and a second position. More specifically, in one example, for the second optical element being closer to the image than the first optical element, only the first optical element is axially movable between the first position and the second position, while in another example, only the second optical element is axially movable between the first position and the second position.

In some cases where the imaging optical system has an engraved focus distance scale, it is desirable to maintain the calibration of the focus distance scale after the RAC is added. Thus, in some examples the RAC can be configured to maintain a constant or nearly constant overall length for the imaging optical system alone and for the imaging optical system with the RAC added, thereby maintaining accuracy of the focus scale.

In addition, the focal length change by adding the RAC is less than +/−15% or more preferably less than +/−12% or more preferably less than +/−10% or even more preferably less than +/−8% or even more preferably less than +/−5%.

Another aspect of the disclosure is an optical system with an imaging optical system and a RAC that may be designed to provide the optical system with the substantially same f-number as the f-number of the imaging optical system alone or a different f-number, e.g., to within 15% or to within 10% or to within 5%.

A further aspect of the disclosure is an optical system with an imaging optical system and a RAC that may be designed to provide the optical system with the same image circle diameter as the image circle diameter of the imaging optical system alone or a different image circle diameter.

Axially moving one or more lens elements of the RAC can be achieved mechanically using conventional cams such as known in the art and employed for instance in contemporary zoom lenses. Computer controlled axial movements of one or more lens elements of the RAC can also be achieved electro-mechanically using computer hardware and software and motors such as known in the art and employed for instance in contemporary zoom lenses.

An embodiment of the disclosure is directed to a residual aberration controller adjustable for causing an aesthetic change in an image formed by an image-forming light beam, comprising:
 a) one or more optical elements operably disposed in an image-forming optical path over which the image-forming light beam travels; and b) wherein at least one of the one or more optical elements is axially movable between at least a first position (configuration) and a second position (configuration) wherein:
  i) the first position alters the image-forming light beam by introducing at least one residual aberration to cause a first amount of the aesthetic change to the image; and
  ii) the second position comprises either:
   A) a null position that causes no substantial aesthetic change to the image, or;
   B) a minimum position that causes a second amount of the aesthetic change to the image that is less than the first amount of the aesthetic change to the image.

Another embodiment of the disclosure is the residual aberration controller as described above, wherein the residual aberration controller has an overall optical power of less than one diopter.

Another embodiment of the disclosure is the residual aberration controller described above, wherein the residual aberration controller has optics consisting of a single lens element.

Another embodiment of the disclosure is the residual aberration controller described above, wherein the residual aberration controller has optics consisting of two lens elements.

Another embodiment of the disclosure is the residual aberration controller described above, wherein the residual aberration controller has optics consisting of three lens elements.

Another embodiment of the disclosure is the residual aberration controller as described above, wherein the residual aberration controller comprises at least three lens elements.

Another embodiment of the disclosure is the residual aberration controller as described above, wherein the image-forming light beam is formed by an image-forming optical system having a focal length, and wherein the residual aberration controller does not change the focal length by more than 15% or alternatively by no more than 10%.

Another embodiment of the disclosure is the residual aberration controller as described above, wherein the image-forming light beam forms the image on an image sensor surface, and wherein the residual aberration controller resides immediately adjacent the image sensor surface.

Another embodiment of the disclosure is the residual aberration controller as described above, wherein the image-forming light beam is formed by an image-forming optical system having a working space, and wherein the residual aberration controller is operably disposed within the working space.

Another embodiment of the disclosure is the residual aberration controller as described above, wherein the residual aberration controller is removably attachable to a rear-end of the image-forming optical system as a rear-end attachment.

Another embodiment of the disclosure is the residual aberration controller as described above, wherein the residual aberration controller is formed integral with the image-forming optical system.

Another embodiment of the disclosure is the residual aberration controller as described above, wherein the image-forming light beam forms an intermediate image, and wherein the residual aberration controller resides adjacent and optically upstream of the intermediate image.

Another embodiment of the disclosure is the residual aberration controller as described above, wherein the at least one residual aberration comprises at least one of spherical aberration, coma, astigmatism and field curvature.

Another embodiment of the disclosure is the residual aberration controller as described above, wherein the image-forming light beam has a root-mean-square (RMS) wavefront error, and wherein the at least one residual aberration increases the RMS wavefront error by at least a ½ wave for at least one field position of the image and for at least one imaging wavelength between at least the first position and the second position.

Another embodiment of the disclosure is the residual aberration controller described herein, wherein the aesthetic change in the image comprises at least one of flare and bokeh.

Another embodiment of the disclosure is the residual aberration controller as described herein, wherein the aesthetic change in the image substantially replicates imaging by an anamorphic optical system.

Another embodiment of the disclosure is the residual aberration controller described above, wherein the image-forming light beam is formed by an all spherical image-forming optical system and wherein the one or more optical elements are all spherical optical elements.

Another embodiment of the disclosure is a combined imaging optical system that is adjustable to cause an aesthetic change in an image, comprising:
 an optical imaging system configured to form an image-forming light beam that travels over an imaging-forming optical path to form the image at an image surface and within a depth of focus;

a residual aberration controller (RAC) comprising one or more lens elements operably arranged in the image-forming optical path and wherein at least one of the one or more elements is axially movable to define:
  a) the first configuration that introduces at least one residual aberration to the image-forming light beam to cause a first amount of the aesthetic change to the image; and
  b) a second configuration that comprises either: i) a null position that causes no substantial aesthetic change to the image, or ii) a minimum position that introduces at least one residual aberration to cause a second amount of the aesthetic change to the image that is less than the first amount of the aesthetic change to the image.

Another embodiment of the disclosure is the combined imaging optical system as described above, wherein the RAC resides between the imaging optical system and the image surface.

Another embodiment of the disclosure is the combined imaging optical system as described above, wherein the RAC is configured as a rear attachment that can be attached to and detached from a rear end of the imaging optical system.

Another embodiment of the disclosure is the combined imaging optical system as described above, wherein the RAC has optics consisting of either:
  a) a single lens element;
  b) a first lens element and a second lens element; and
  c) a first lens element, a second lens element and a third lens element.

Another embodiment of the disclosure is the combined imaging optical system as described above, wherein the at least one residual aberration comprises one or more of: spherical aberration. astigmatism, coma and field curvature.

Another embodiment of the disclosure is the combined imaging optical system as described above, wherein the imaging optical system is selected from the group of imaging optical systems comprising: a photographic objective, a cinematographic objective, and a videographic objective.

Another embodiment of the disclosure is the combined imaging optical system according to claim 21, wherein the image formed by the image-forming light beam forms an intermediate image, and wherein the RAC resides adjacent and optically upstream of the intermediate image.

Another embodiment of the disclosure is the residual aberration controller as described above, wherein the image as formed by the imaging optical system has a root-mean-square (RMS) wavefront error, and wherein the at least one residual aberration increases the RMS wavefront error by at least a ½ wave for at least one field position of the image and for at least one imaging wavelength between at least the first configuration and the second configuration.

Another embodiment of the disclosure is the combined imaging optical system as described above and further comprising a digital image sensor operably arranged within the depth of focus of the image surface.

Another embodiment of the disclosure is the combined imaging optical system as described above, wherein the aesthetic change in the image forms an aesthetic image that is digitally captured by the digital image sensor to form a digital aesthetic image and further comprising: a processor unit configured to process the digital aesthetic image to form a processed digital aesthetic image; and a memory unit configured to store the processed digital aesthetic image.

Another embodiment of the disclosure is a method of adjustably producing an aesthetic effect in an image formed by an image-forming optical beam, comprising:
  operably disposing a residual aberration controller (RAC) in the image-forming optical beam; and
  adjusting the RAC between:
    a) a first configuration that introduces at least one residual aberration to the image-forming light beam to cause a first amount of the aesthetic change to the image; and
    b) a second configuration that is either: i) a null position that causes no substantial aesthetic change to the image; or ii) a minimum position that introduces at least one residual aberration to cause a second amount of the aesthetic change to the image that is less than the first amount of the aesthetic change to the image.

Another embodiment of the disclosure is the method as described above and further comprising: forming the imaging-forming optical beam using an imaging optical system; and operably attaching the RAC to the imaging optical system as a rear attachment.

Another embodiment of the disclosure is the method described above and further comprising: forming the image-forming optical beam using an imaging optical system having a working space; and operably disposing the RAC within the working space.

Another embodiment of the disclosure is the method as described above and further comprising: forming the imaging-forming optical beam using one of: a cinematographic objective lens; a photographic objective lens; and a videographic objective lens.

Another embodiment of the disclosure is the method as described above, wherein the at least one residual aberration comprises at least one of spherical aberration, coma, astigmatism and field curvature.

Another embodiment of the disclosure is the method as described above, wherein producing the aesthetic change in the image forms an aesthetic image and further comprising: capturing a digital image of the aesthetic image using a digital image sensor.

Another embodiment of the disclosure is the method as described above and further comprising: displaying the digital image of the aesthetic image.

Another embodiment of the disclosure is the method as described above and further comprising: creating a movie by capturing a series of digital images of the aesthetic images.

Another embodiment of the disclosure is the method as described above, wherein the light-forming optical beam has a root-mean-square (RMS) wavefront error, and wherein the at least one residual aberration increases the RMS wavefront error by at least a ½ wave for at least one field position of the image and for at least one imaging wavelength between at least the first configuration and the second configuration.

Another embodiment of the disclosure is the method as described above, wherein the aesthetic effect in the image comprises at least one of flare and bokeh.

Another embodiment of the disclosure is the method as described above, wherein the RAC has optics consisting of only spherical lens elements and wherein the aesthetic effect in the image substantially replicates imaging by an anamorphic optical system.

BRIEF DESCRIPTION OF THE DRAWINGS

FIG. 1A is a schematic diagram of a contemporary camera system that includes an imaging optical system and a camera housing that operably supports a digital image sensor at the image surface of the imaging optical system.

FIG. 1B is a schematic diagram of an example well-corrected contemporary imaging optical system for the camera system of FIG. 1A.

FIGS. 19A through 19D show the central portion image using just the objective lens imaging optical system (FIG. 19A, which is the same as FIG. 17B) and for the combined imaging optical system that uses the first example three-element RAC at positions P1, P2 and P3 (FIGS. 19B, 19C and 19D, respectively).

FIGS. 20A through 20D show the corner portion image using just the objective lens imaging optical system (FIG. 20A, which is the same as FIG. 18B) and for the combined imaging optical system that uses the first example three-element RAC at positions P1, P2 and P3 (FIGS. 20B, 20C and 20D, respectively).

FIGS. 22A through 22C are schematic diagrams that show a first set of positions P1, P2 and P3 for the combined imaging optical system that includes the second three-element RAC.

FIGS. 23A through 23C are schematic diagrams that show a second set of positions P1, P2 and P3 for the combined imaging optical system that includes the second three-element RAC.

FIGS. 28A through 28D show the central portion image using just the objective lens imaging optical system (FIG. 28A, which is the same as FIG. 17B) and for the combined imaging optical system that uses the second example three-element RAC at the second set of positions P1, P2 and P3 (FIGS. 28B, 28C and 28D, respectively).

FIG. 29A through FIG. 29D show the corner portion image using just the objective lens imaging optical system (FIG. 29A, which is the same as FIG. 18B) and for the combined imaging optical system that uses the second example three-element RAC at the second set of positions P1, P2 and P3 (FIGS. 29B, 29C and 29D, respectively).

FIGS. 33A through 33D show the central portion image using just the objective lens imaging optical system (FIG. 33A, which is the same as FIG. 17B) and for the combined imaging optical system that uses the first example two-element RAC at positions P1, P2 and P3 (FIGS. 33B, 33C and 33D, respectively).

FIGS. 34A through 34D show the corner portion image using just the objective lens imaging optical system (FIG. 34A, which is the same as FIG. 18B) and for the combined imaging optical system that uses the first example two-element RAC at positions P1, P2 and P3 (FIGS. 34B, 34C and 34D, respectively).

FIGS. 36A through 65C are residual aberration histograms for the combined imaging optical system that includes the second example two-element RAC for the positions P1, P2 and P3, respectively.

FIGS. 37A through 37D show the central portion image using just the objective lens imaging optical system (FIG. 37A, which is the same as FIG. 17B) and for the combined imaging optical system that uses the second example two-element RAC at positions P1, P2 and P3 (FIGS. 37B, 37C and 37D, respectively).

FIGS. 38A through 38D show the corner portion image using just the objective lens imaging optical system (FIG. 38A, which is the same as FIG. 18B) and for the combined imaging optical system that uses the second example two-element RAC at positions P1, P2 and P3 (FIGS. 38B, 38C and 38D, respectively).

FIGS. 43A through 43C are schematic diagrams of an example of a single-element RAC operably disposed in the image-forming optical path and showing the different positions P1, P2 and P3.

Figure 2A:
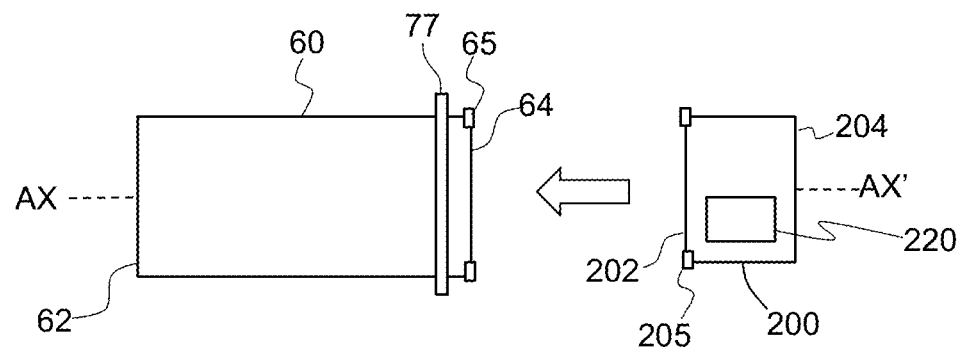
FIG. 2A is a schematic diagram of an example imaging optical system along with a RAC in the process of being attached to the back end of the imaging optical system in an attachable-detachable configuration.

The information shown in the Figures, and the data contained in the Tables set forth below were generated by CodeV® optical design software, which is commercially available from SYNOPSYS, INC, Pasadena, California, USA.

DETAILED DESCRIPTION

The claims as set forth below are incorporated into and constitute part of this General Description.

The various Tables used herein to support this Detailed Description are set forth together just prior to the claims in a "Tables" section for convenience.

The term "imaging optical system" is used herein to refer to any optical system used to form an image. An objective lens is one type of imaging optical system, and a cinematographic objective lens is a particular type of objective lens used in the movie industry. The RAC disclosed herein is described in connection with objective lenses for cinematography by way of non-limiting example and illustration since it is believed the RAC will find much use and fulfill a long-felt need in this particular industry, as discussed above, as well as in any industry where there is an imaging requirement that could benefit from being adjustable. Unless otherwise stated, the imaging optical system is assumed to be well-corrected and provide a high-quality, sharp image. Example types of imaging optical systems useful for the present disclosure include a camera lens system (camera objective), cinematographic objective (including prime lenses and zoom lenses) and video objectives.

The term "optically upstream" as in "A is optically upstream of B" means arranged such that light is first incident upon A and then is incident upon B. Likewise, the term "A is optically downstream of B" means that light is first incident upon B and then is incident upon A.

The term "image-forming optical path" means the light path over which an image-forming light beam travels. It is emphasized that the image-forming optical path exists in the absence of the image-forming light beam and is used to reference the portion of an image-forming optical system where the light travels when the image-forming optical system forms an image at the image surface. In an example, the image-forming optical path resides between the last optical element in the image-forming optical system and the image surface of the image-forming optical system.

In the discussion below, a lens surface of a given lens element is said to be a front surface when it is closest to the object space and a rear or back surface when it is closest to image space. For example, for a positive meniscus lens disposed with its convex surface closest to object space and its concave surface closest to image space, the convex surface is referred to as a "front convex surface," while the concave surface can be referred to as a "rear concave surface" or "back concave surface."

The object space is denoted OBS and is immediately adjacent the front end of the optical system described below and so defines a frontward direction while the image space is denoted IMS and is immediately adjacent a back or rear end of the optical and so defines a rearward or backward direction.

The reference numbering convention for the lens elements and optical surfaces in the optical diagrams is selected to match the information provided in the corresponding Tables. For ease of illustration, not every Figure includes all of the reference numbers, especially where the reference numbers can be found on previous Figures.

The term "well corrected" with reference to an imaging optical system or other optical system means that the imaging performance of the imaging optical system or other optical system is optimal, i.e., the imaging optical system imaging performance is optimized to within design tolerances and manufacturing tolerances to provide the highest imaging performance possible for the given lens configuration. Thus, the term "well-corrected" can mean a design that minimizes the amount of residual aberrations to achieve the sharpest imaging possible for the given lens.

The term "sharpness" means the amount of contrast of a border or edge of a feature.

A "residual aberration" means an aberration that remains in an optical system after the design has been optimized or substantially optimized to reduce the overall aberrations to achieve high-quality (relatively sharp) imaging. Residual aberrations can be thought of as relatively small departures from an ideal optical wavefront. Residual aberrations can arise from manufacturing shortcomings when an imaging optical system is constructed and so can be larger than indicated by the optical prescription. The RAC disclosed herein is designed to provide an overall increase in the amount of residual aberrations, which can include in some examples reducing some residual aberrations while increasing other residual aberrations to achieve the overall effect. The RAC does not change the residual aberrations of the imaging optical system per se, as these are fixed by the design and construction of the imaging optical system. Rather, the RAC controls the amount of residual aberrations for the combined imaging optical system of the imaging optical system and the RAC and include minimum configuration where the performance of the imaging optical system is affected the least as compared to the other RAC configurations. In some examples, the minimum configuration can also be a null configuration. It is also noted that "introducing" one or more residual aberrations can mean to increase the overall amount of an existing residual aberration or can mean creating a new residual aberration. It is also noted that defocus is not considered a residual aberration as this term is used herein. In an example of the RAC disclosed herein, the aesthetic effect imparted to the otherwise sharp image can be selected to occur at a best focus position for the aesthetic image. Alternatively, the aesthetic image can be viewed with some defocus, with the aesthetic effect in this case being due mainly to the residual aberrations and with some additional effect due to defocus. In an example of the RAC disclosed herein, the residual aberrations that produce the aesthetic effect imparted to the otherwise sharp image formed by the imaging optical system are not changed by refocusing of the imaging optical system. The aesthetic effect, whether it be from spherical aberration, coma, astigmatism, etc., does not provide the same look as refocusing the imaging optical system. In other words, the look produced by refocusing is not the same as the look produced by the RAC. Of course, the RAC can also produce a defocus but that would be in addition to the residual aberrations introduced by the RAC. The choice of whether to include defocus or not in addition to the RAC residual aberrations is up to the end user and can be based on the desired aesthetic imaging effect being sought or deemed the most pleasing taking into account the totality of the circumstances surrounding the given imaging application.

The discussion below makes reference to tangential and sagittal aberrations. Those skilled in the art of lens design know that there are various forms of aberrations, with tangential and sagittal forms being two commonly used examples for field aberrations such as coma and astigmatism. Thus, reference to an aberration without specifying the particular form is meant to communicate that any of the known forms apply. For example, reference to "astigmatism" can mean tangential astigmatism, sagittal astigmatism or any other form or category of astigmatism, including those forms/categories better suited for use in optometry for example.

It is noted here that while a main aspect of the disclosure is directed to using a RAC for a well-corrected lens, one skilled in the art will understand that the RAC disclosed herein can be used to improve the imaging quality of an imaging optical system that is not well-corrected. This can occur when the RAC introduces residual aberrations that reduce or cancel the more pronounced residual aberrations in the "non-well-corrected" imaging optical system.

The term "aesthetic imaging" as used herein means imaging performance that is intentionally made to be substantially less than optimal to achieve an observable imaging effect by providing an overall increase in the residual aberrations over those already in the imaging optical system, and in particular to achieve an observable imaging effect that has an aesthetic or pleasing quality, as opposed to an observable imaging effect that has a level of degradation such that the resultant image would be considered unusable for the given application. As noted above, defocus is not considered to be a residual aberration as this term is used herein, and the aesthetic imaging effect is one that can be observed within the depth of focus of the imaging optical system as well as outside of the depth of focus. Said differently, the aesthetic imaging effect created by the RAC is not removable by refocusing the image, though defocus can be optionally used to add to the aesthetic effect.

An aesthetic effect is a discernable imaging effect, especially when compared to an ideal or well-corrected image. Image softening is generally considered a desirable aesthetic imaging effect in cinematography for certain applications, as is the aesthetic effect produced by (or that replicates) imaging using an anamorphic objective lens. These are just two examples of readily discernable aesthetic imaging effects that are known to be desirable and appealing in certain cinematography applications and that can be achieved using the systems and methods disclosed herein. Other effects include flare, bokeh and the general look of an anamorphic image, as well as the effect where the depth of field is different as measured in the horizontal and vertical directions of objects within the image area or over the field of view of the lens. The RAC disclosed herein can, to varying degrees, replicate some or all these effects, depending on the type and magnitude of the residual aberrations introduced by the RAC.

Examples of the RAC disclosed herein can be considered as a type of rear conversion lens assembly in that it is not primarily intended for use as an imaging optical system by itself, but rather is used in combination with an imaging optical system and in a preferred embodiment in the working space between the most downstream lens element of the imaging optical system and the image surface.

The RAC can be incorporated into the original imaging optical system as a permanent adjustable lens group when the imaging optical system is being assembled, or can be added to an existing imaging optical system, preferably in the working space immediately adjacent and upstream of the image surface. In some instances, the RAC can be supported independent of the imaging optical system, e.g., using a separate support structure. Such a separate support structure can be incorporated into or onto a camera body, for example.

The RAC can be considered as a type of "optical synthesizer" in analogy to an electronic synthesizer used to modify audio signals. In this context, an optical synthesizer is an optical device that can shape and/or modulate optical images by having at least one axially movable lens element to provide aesthetically different images, which are also referred to in the art as "organic images." The optical synthesizer operates by axially moving at least one of its lens elements. Such movement can be controlled by a mechanical cam or by computer-controlled motors.

The optical system diagrams presented herein are for an infinite focus for the imaging optical system unless otherwise stated since the configurations of the given RAC for intermediate and close focus settings are substantially the same as for the infinite focus setting.

Camera System

FIG. 1A is a schematic diagram of an example prior art contemporary camera system 50. The camera system 50 includes an imaging optical system 60 that has a front end 62, a back end 64, and a lens axis AX. The imaging optical system 60 is configured to receive object light 52 that originates in an object space OBS from an object (not shown; see FIG. 1B) and create an image-forming light beam 54 that travels over an image-forming optical path OP and that forms an image IM at an image surface IS in an image space IMS. The imaging optical system 60 includes a focus scale 66 and a first lens mount 67 at or near the back end 64.

The camera system 50 also includes a camera body 70 having a front end 71 and interior 72. The front end 71 includes a mount 77. The imaging optical system 60 is configured to be attached and detached to camera body 70 using the lens mounts 67 and 77, which can be the standard types of mounts known in the art.

The camera system 50 also includes an electronic (digital) image sensor 80 that resides within the camera body interior 72 and that has a sensor surface 82 that resides substantially at the image surface IS of the imaging optical system 60. The camera body 70 may also support additional components (not shown), such as electronic and mechanical components. The imaging optical system 60 defines a working distance WD, which is the distance from the last or backmost lens surface to the image surface IS. The portion of the camera body interior between the image surface IS and the camera body front end 71 constitutes a working space WS.

The camera system 50 can be for example a still camera system, a cinematographic camera system, etc., and the imaging optical system 60 can be a prime imaging optical system (i.e., with a single focal length), a zoom imaging optical system (i.e., with multiple focal lengths), etc. The imaging optical system 60 is assumed to be well-corrected to provide optimal imaging performance for the image IM formed at the image surface IS.

Example Imaging Optical System

FIG. 1B is a schematic diagram of an example configuration for the imaging optical system 60 of the camera system 50 of FIG. 1A. The example imaging optical system 60 is formed by ten lens elements, labeled L1 through L10 in order along the lens axis AX from the front end 62 to the back end 64 and that constitutes for the purposes of this discussion a single lens group G1. The lens element pairs L1-L2, L3-L4, L5-L6, L7-L8 and L9-L10 of the lens group G1 form five doublets. The example imaging optical system 60 is an all-spherical design and represents an example type of lens that can be used in cinematography.

The lens group G1 includes surfaces S1 through S16, with surface S1 being the first or front-most lens surface, and the surface S10 defined by an aperture stop AS disposed between lens elements L6 and L7. An object OBJ in the object space OBS constitutes an object surface S0 while the image surface IS constitutes a last or backmost surface denoted in FIG. 1B as surface S17. Thus, the working distance WD is shown in FIG. 1B as being the axial distance from surface S16 to surface S17.

The example imaging optical system 60 has a single fixed focal length FL of 100 mm, a full aperture of f/1.5 and covers an image circle diameter of 43.3 mm. The imaging optical system 60 has an axial length LA from a vertex point VP of the first lens surface S1 adjacent the object space OBS to the image surface IS of 185 mm.

Table 1A below sets forth the lens design prescription for the imaging optical system 60. The term "non-air" means a solid lens material such as glass, plastic or crystalline. While the example imaging optical system 60 is set forth in detail, it is emphasized that other imaging optical system configurations can be utilized. The imaging performance of the imaging optical system 60 is discussed below in greater detail.

Table 1B sets forth the wavefront aberrations in RMS waves at 531.6 microns for the imaging optical system 60.

Combined Imaging Optical System

Figure 2B:
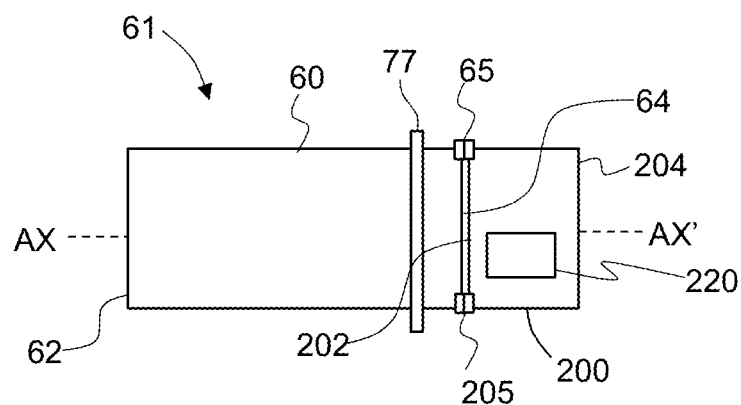
FIG. 2B is similar to FIG. 2A and shows the RAC attached to the back end of the imaging optical system.

FIG. 2A is a schematic diagram of an example imaging optical system 60 of the type described above, along with RAC 200 disclosed herein. The RAC has an axis AX', a front end 202 and a back end 204. The example RAC includes a front-end mount 205 configured to operably engage a back-end mount 65 at the back end 64 of the imaging optical system 60. The mounts 65 and 205 can be conventional male-female lens mounts known in the art. FIG. 2B shows the RAC 200 operably connected to the imaging optical system 60 to form a combined imaging optical system 61 with the respective axes AX and AX' being coaxial.

The RAC 200 can include a drive system 220 configured to control the configuration of RAC 200 by axially moving one or more lens elements therein using techniques known in the art (e.g., for zoom lenses) and as explained below. In an example, the drive system 220 is electronic and/or computer controlled.

Figure 2C:
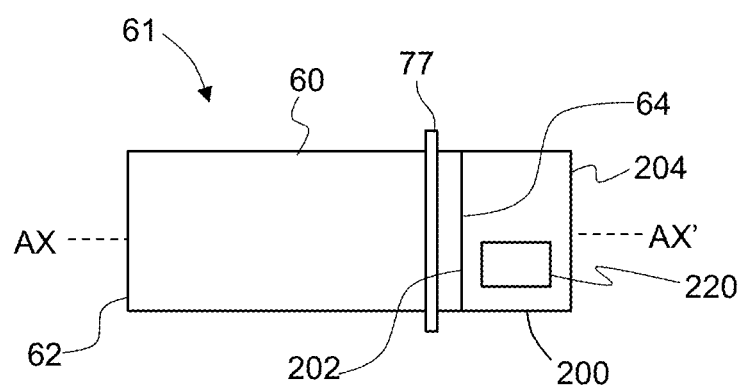
FIG. 2C is similar to FIG. 2B except that the RAC is formed integral with the imaging optical system and so is not attachable-detachable.

FIG. 2C is similar to FIG. 2B except that the RAC 200 is shown as formed integral with the imaging optical system 60, i.e., it is not attachable and detachable.

Figure 2D:
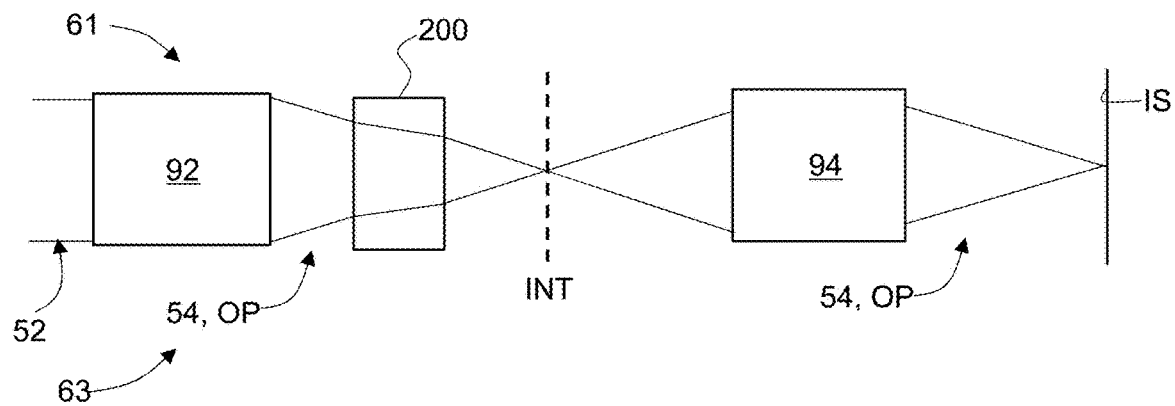
FIG. 2D is a schematic diagram of an example imaging optical system in the form of a relay optical system and showing an example of how the RAC can be operably disposed upstream of the intermediate image plane located between front and back sections of the relay optical system.

FIG. 2D is a schematic diagram of an example combined imaging optical system 61 in the form of a relay system 63 having a front section 92 and a back section 94. An intermediate image plane INT resides between the front and back sections 92 and 94. The RAC is disposed in the imaging-forming optical path OP upstream of the intermediate image plane INT to form the combined imaging optical system 61. The RAC 200 can also be disposed in the image-forming optical path OP between the back section 94 and the image surface IS. This example illustrates that the RAC 200 disclosed herein need not only be arranged immediately adjacent the image surface IS of an imaging optical system, but can be positioned anywhere in an imaging system where there is sufficient room and where the light has been processed by at least one upstream optical element.

Camera System with RAC

Figure 3A:
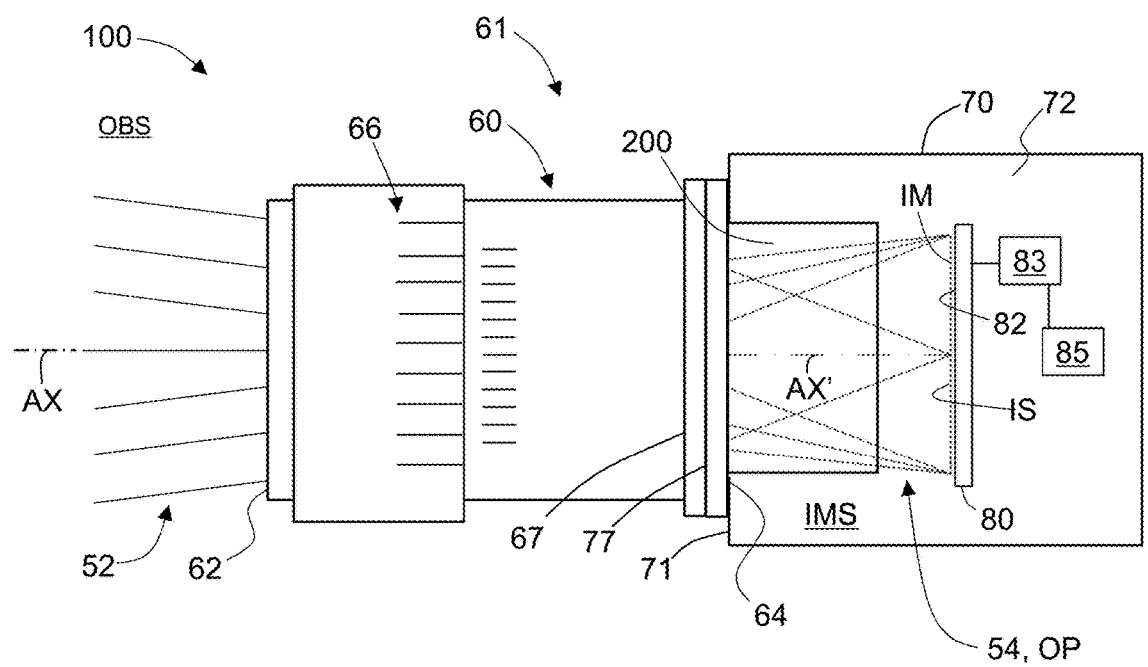
FIG. 3A is a schematic diagram of an example camera system similar to that shown in FIG. 1A but wherein the RAC is attached to the back end of the imaging optical system and extends into the camera body interior.

FIG. 3A is similar to FIG. 1A except that it shows an example camera system 100 that additionally includes the RAC 200 as disclosed herein and operably disposed relative to the imaging optical system 60. In the example of FIG. 3A, the RAC 200 extends into the camera interior 72. In other examples, the RAC 200 can extend partially into the camera interior 72 or not extend into the camera interior, depending on the ultimate location of the image surface IS relative to the sensor surface 82. The camera system 100 also is shown in FIG. 3A as having a processor 83 electrically connected to the image sensor 80, and a memory unit (memory) 85 electrically connected to the processor. The processor 83 can be used to process digital images captured by the image sensor 80, and the memory 85 can be used to store the processed digital images. A sequence of processed digital images can be used to make a movie or video.

The RAC 200 receives the image-forming light beam 54 and is configured to introduce thereto one or more residual aberrations in relative amounts sufficient to alter the imaging performance of the imaging optical system 60 at the image surface IS. This allows for the combined imaging optical system 61 to form a more aesthetically pleasing image IM. In some examples, the axial length LA and the focal length FL of the combined imaging optical system 61 are substantially the same as that of the imaging optical system 60, e.g., to within 3% in some examples and to within 2% in other examples. This has the advantage that the focus scale 66 of the imaging optical system 60 remains substantially calibrated when the RAC 200 is in place. In other examples where the focal length and axial length of the combined imaging optical system 61 changes substantially relative to that of the imaging optical system 60 alone, the focus scale can be recalibrated.

Example RACs

Several example RACs 200 are now set forth. The first example is a three-element RAC and this example is used to explain the RAC in detail along with its principles of operation and its performance in the combined imaging optical system 61. Certain aspects of the discussion and the principles and results of this first example also pertain to the following examples and so are not repeated in their entirety for the other RAC examples.

First Example Three—Element RAC

Figure 3B:
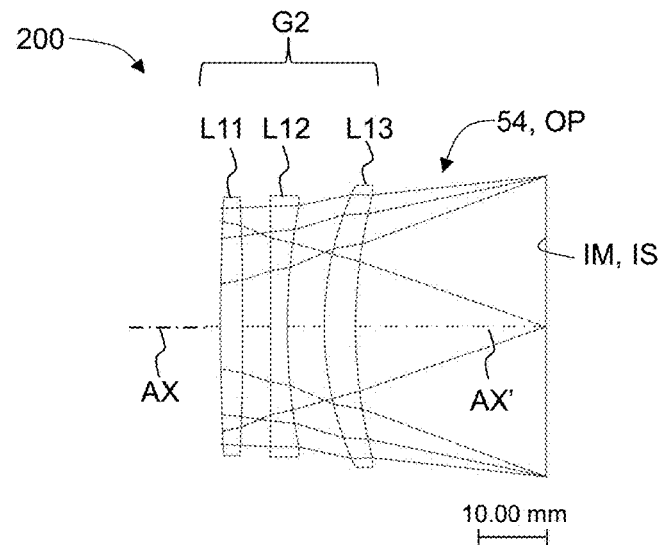
FIG. 3B is a schematic diagram of a first example of a three-element RAC operably disposed in the image-forming optical path.

FIG. 3B is a close-up schematic diagram of a first example of a three-element RAC 200 disposed in the image-forming optical path OP. The three lens elements are denoted L11, L12 and L13. The RAC 200 is shown as comprising a single lens group G2 for convenience so that the combined imaging optical system 61 can also be discussed in terms of lens groups G1 and G2, as discussed below.

In the first example three-element configuration of the RAC 200 of FIG. 3B, the lens element L11 is a convex-convex lens with a focal length f11 and optical power Ø11=1/f11. The lens element L12 is a bi-concave lens with a focal length f12 and optical power Ø12=1/f12, and the lens element L13 is a positive meniscus lens with a focal length f13 and optical power Ø12=1/f12 and with its front surface S21 being the convex surface. While the lens elements L11, L12 and L13 have spherical surfaces, the surface shapes of the lens elements may be other than spherical.

Figure 3C:
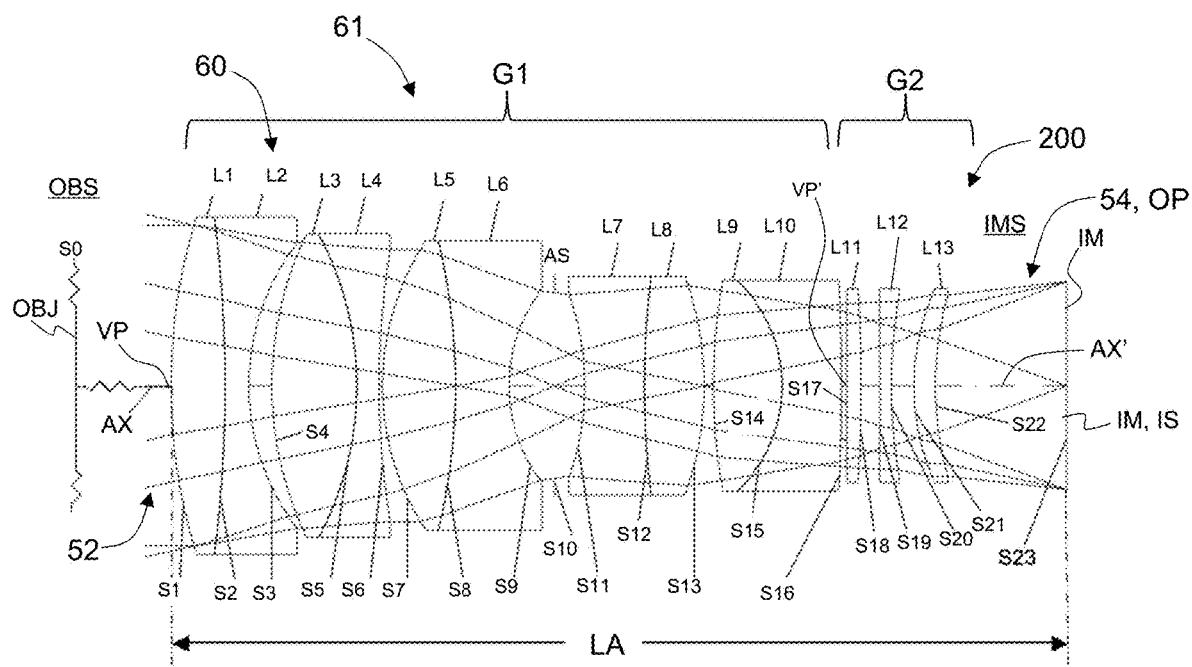
FIG. 3C is a schematic diagram of an imaging optical system in the form of an objective lens and showing the first example three-element RAC operably disposed in the working space of the object lens to form a combined imaging optical system.

FIG. 3C is a schematic diagram similar to FIG. 1B but showing the first example three-element RAC 200 of FIG. 3B operably disposed adjacent the back end 64 of the imaging optical system 60 and lens group G1 thereof to form the combined imaging optical system 61. The addition of the RAC 200 to form the combined imaging optical system 61 results in the renumbering of some of the lens surfaces. Lens element L11 includes surfaces S17 and S18, lens element L12 includes surfaces S19 and S20, lens element L13 includes surfaces S21 and S22, while the image surface IS is now denoted as surface S23. The lens element L11 is stationary while lens elements L12 and L13 are axially movable to define the different configurations of the RAC 200.

Figure 4A:
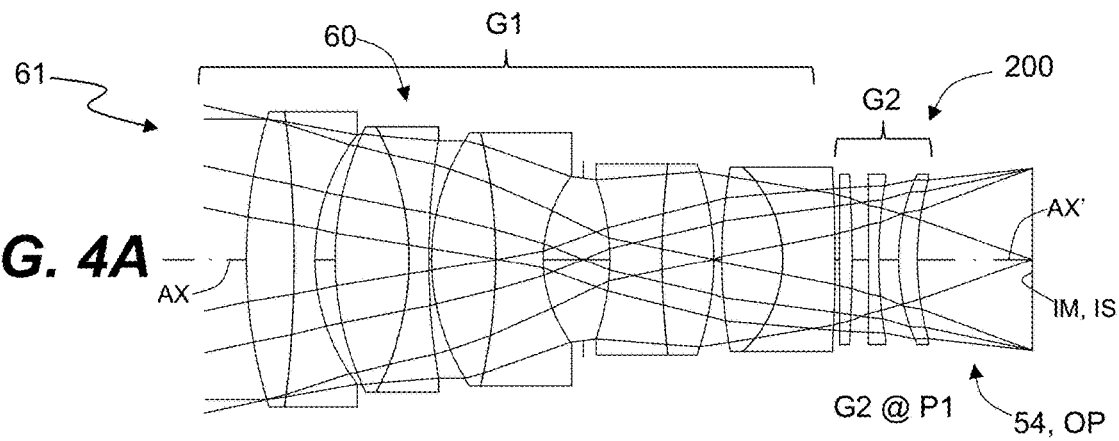
FIGS. 4A through 4C show the combined imaging optical system for three different example adjusted lens positions (configurations) P1, P2 and P3 for the RAC.
Figure 4B:
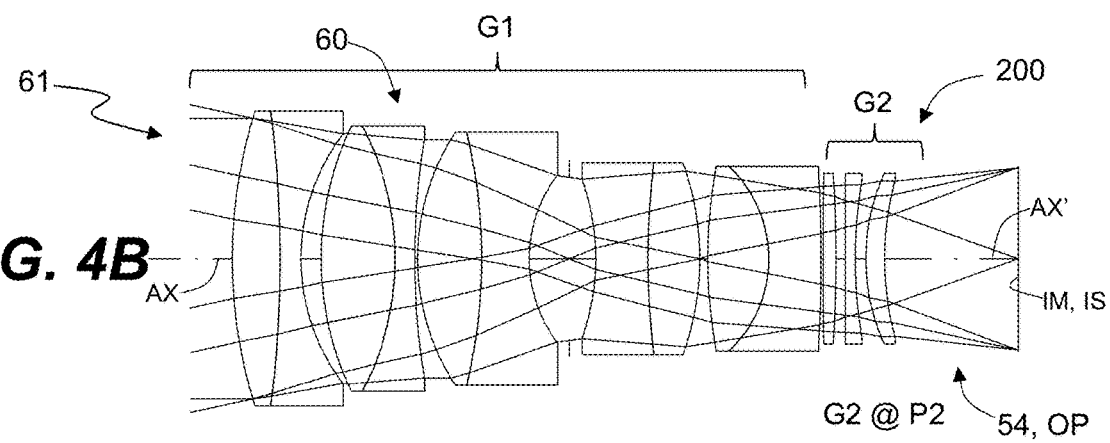
Figure 4C:
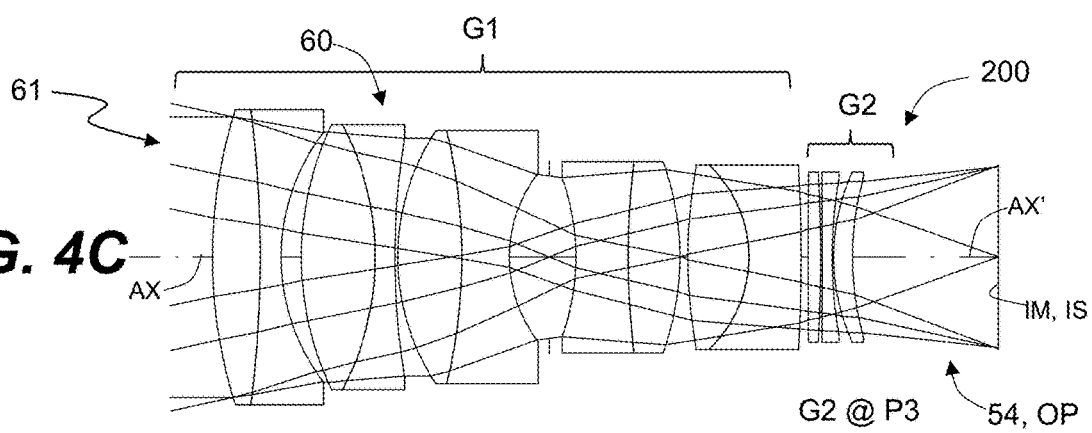
Figures 5A, 5B, 5C:
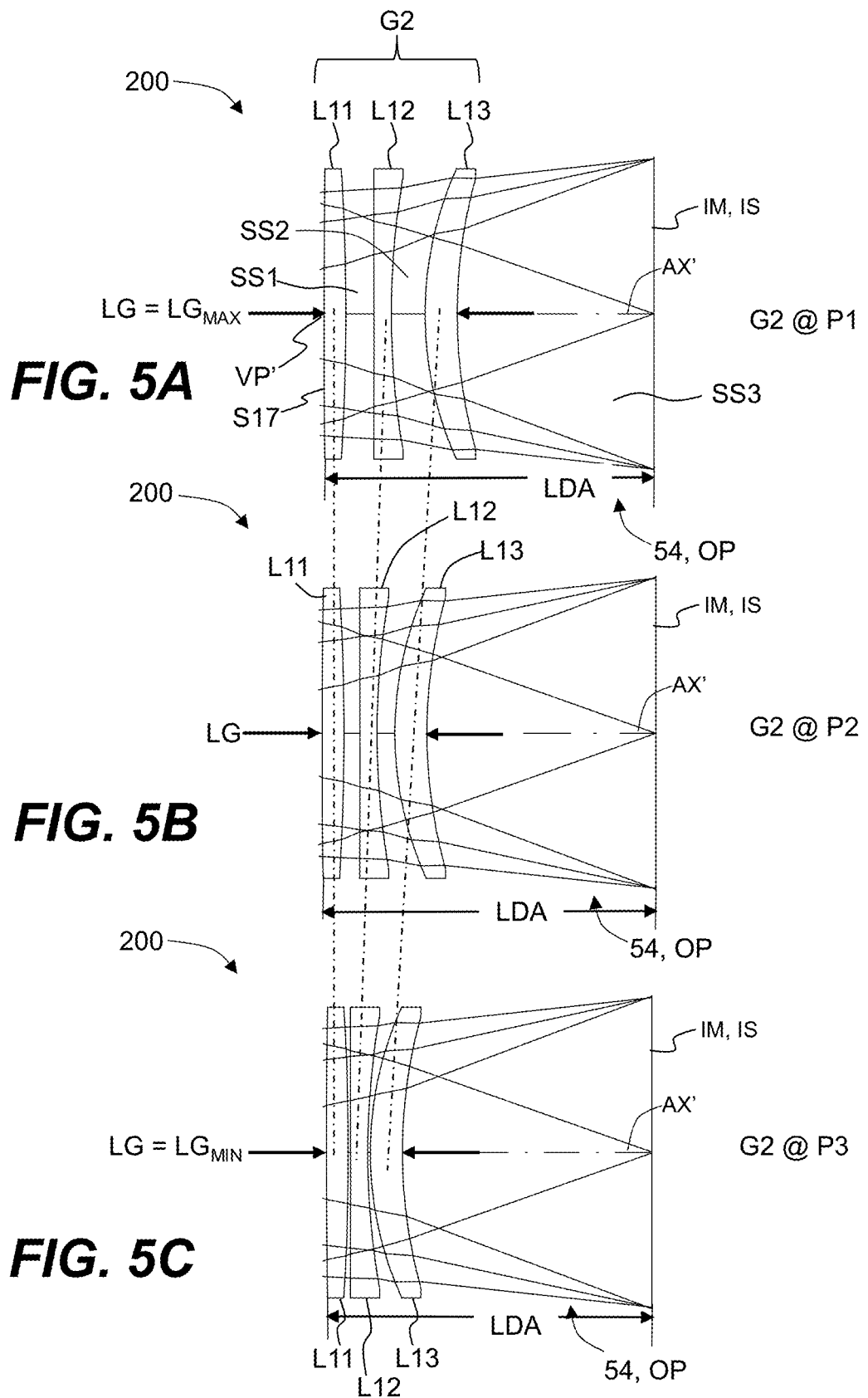
FIGS. 5A through 5C are close-up views of the first example three-element RAC showing the three example lens positions P1, P2 and P3 shown in FIGS. 4A through 4C along with the axial movements of the lens elements.

FIGS. 4A through 4C show the combined imaging optical system 61 for three different configurations corresponding to lens positions P1, P2 and P3 of the RAC. FIGS. 5A through 5C are close-ups of the first example three-element RAC 200 of FIG. 3B and show how the lens elements L12 and L13 are axially movable to the three different positions P1, P2 and P3. The three different positions P1, P2 and P3 are associated with different imaging performances of the combined imaging optical system 61, as discussed below.

With reference to FIGS. 4A through 4C and FIGS. 5A through 5C, the different positions P1, P2 and P3 of the RAC 200 are formed by axially moving the two rearward lens elements L12 and L13 toward the front lens element L11.

In position P1, the three lens elements L11, L12 and L13 have the most spacing between them (and thus is associated with the maximum axial length $LG=LG_{MAX}$ of G2), while the position P3 has the least spacing between them (and thus is associated with the minimum axial length $LG=LG_{MIN}$ of G2), with position P2 being an intermediate position. Even though the spacing between the image surface IS and the backmost lens surface of lens element L13 changes, the overall axial length LA remains substantially the same. Note also that the RAC 200 has a maximum axial length $LG_{MAX}$<WD so that the RAC can fit and operate within the working space WS.

Table 1C set forth below is similar to Table 1A but adds the lens elements L11, L12 and L13 of the first example three-element RAC 200 to the imaging optical system 60. Note that the RAC 200 does not include surface S17 per se, but is included in the RAC section of Table 1B to account for the different spacings between the backmost surface S16 of the imaging optical system 60 and the front-most surface S17 of the RAC for the different positions.

For the first example three-element RAC 200 set forth in Table 1C the lens element L11 has a focal length f11=225.7 mm (and thus positive optical power of Ø11=1/f11=0.00444 mm-1 or 4.43 diopters), the lens element L12 has a focal length f12=−106.2 mm (and thus negative optical power Ø12=1/f12=−0.009 $mm^{-1}$ or −10.6 diopters) and the lens element L13 has a focal length f13=226.5 mm (and thus positive optical power Ø13=1/f13=0.00442 mm-1 or 4.42 diopters). Note that for the example RAC 200, the individual lens powers satisfy the relationship |Ø11|+|Ø13|>|Ø12|.

The example RAC 200 has an overall focal length at position P1 of FP1=−1048.6 mm, an overall focal length at position P2 of FP2=−969.1 mm, and an overall focal length at position P3 of FP3=−904.6 mm. The corresponding overall or total optical powers Ø of the RAC at the three positions P1, P2 and P3 are:

ØT1=1/FP1=−0.000954 $mm^{-1}$ or −0.954 diopters
ØT2=1/FP2=−0.001032 $mm^{-1}$ or −1.032 diopters
ØT3=1/FP3=−0.001105 $mm^{-1}$ or −1.105 diopters Thus, the RAC 200 in general has overall negative and relatively weak optical power regardless of its configuration based on the lens element positions. In a general example, the RAC 200 has less than 1 diopter of optical power.

With reference again to FIGS. 5A through 5C, in an example, the RAC 200 defines an axial length LDA as measured from a front vertex VP' of the lens surface S17 of lens element L11 to the image surface IS, with the example RAC having a RAC axial length LDA of 46.83 mm for each of the positions P1, P2 and P3. In an example, the axial length LDA is less than the axial working distance WD.

With reference to FIG. 5A, the RAC 200 includes two internal separation spaces SS1 and SS2 between lens elements L11 and L12 and between lens elements L12 and L13, respectively. The RAC 200 also defines an external separation space SS3 between backmost lens element L13 of lens group G2 and the front-most lens element L11 of the RAC and another separation space between the backmost surface S22 of the backmost lens element L13 of the RAC and the image surface S23 or IS. These separation spaces SS1, SS2 and SS3 are adjustable to define the imaging positions P1, P2 and P3 while maintaining a substantially constant axial length LA from the first optical surface S1 to the image surface S23 or IS.

Variable imaging performance of the combined imaging optical system 61 can also be achieved while the camera system 100 captures images continuously over time. The axial lens movements for the RAC 200 may be realized using the aforementioned drive system 220, which can employ mechanical means known in the art, such as by using one or more mechanical cams like those used for focusing and zooming of optical systems like prime lenses and zoom lenses. Also as noted above, the drive system can be electronically and/or computer controlled.

Residual Aberration Control

As noted above, the purpose of the RAC 200 is to introduce residual aberrations in a controlled and reversible way, i.e., of the type and magnitude considered useful for image softening or otherwise rendering more aesthetic an electronic image captured directly from a well-corrected imaging optical system 60. This includes simulating the type of imaging obtained by an anamorphic imaging optical system even when the imaging optical system 60 is non-anamorphic. For example, the RAC 200 can, to varying degrees, create or suggest flare, bokeh and/or the generally recognized ethereal effect achieved using anamorphic objective lenses even when the imaging optical system 60 and the RAC employ only spherical optics.

In an example, one of the positions (configurations) of the RAC 200 does not substantially change the imaging performance of the imaging optical system 60, i.e., it does not introduce residual aberrations in sufficient amounts to create the desired modified (softened) image IM. This is position P1, which is referred to herein as the null position. Having a null position is very useful because it allows for the RAC 200 to remain part of the combined imaging optical system 61 and set to the null position to perform relatively sharp imaging when aesthetic modification of the image is desired.

Figure 6:
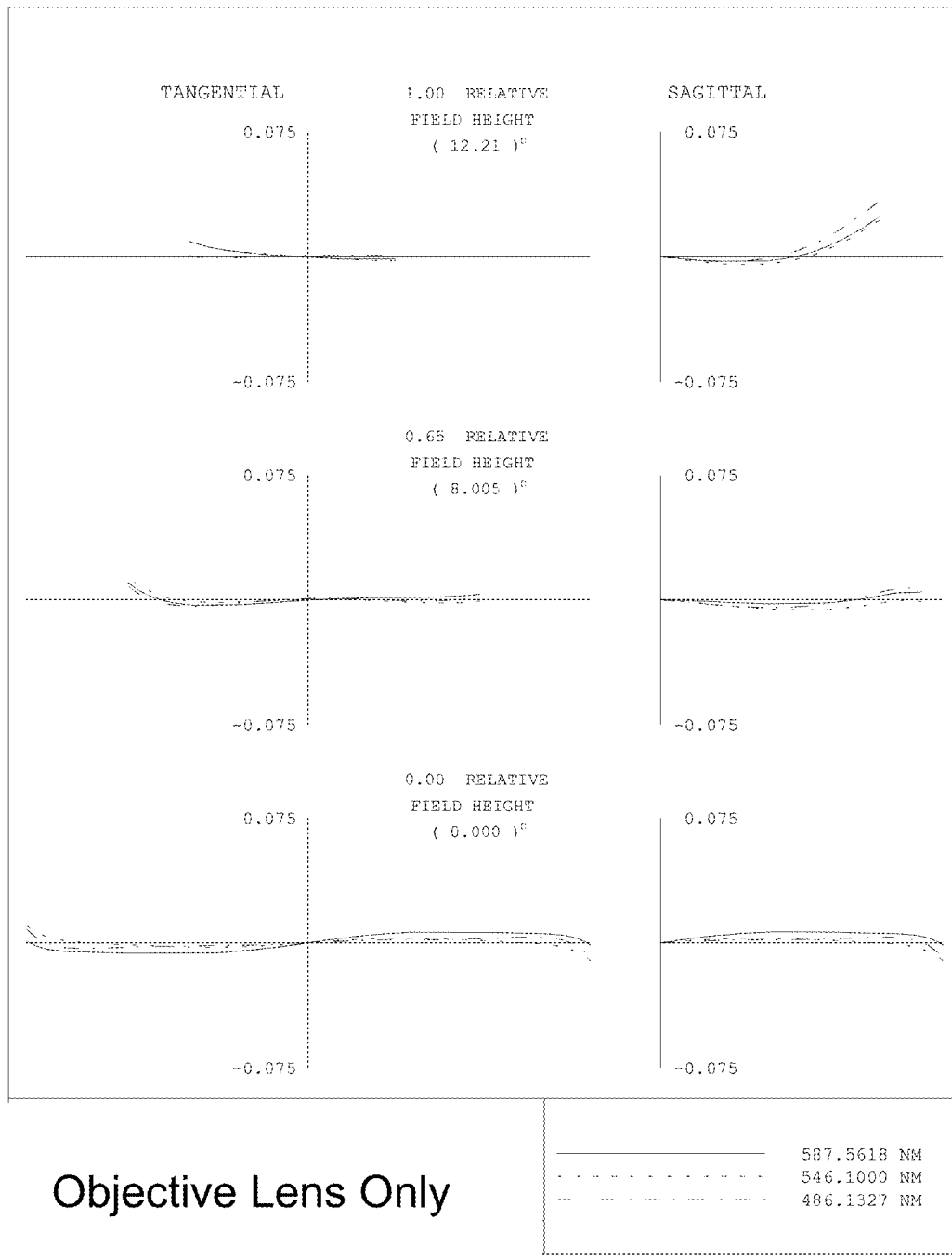
FIG. 6 is a polychromatic transverse ray aberration plot with a vertical scale of plus and minus 0.075 mm for the objective lens of FIG. 1B showing the image performance at three field positions of zero, 0.65 of the full field and at the full field, at approximate wavelengths of 587.6 nm, 546.1 nm and 486.1 nm (solid, dashed and dot-dashed, respectively).

FIG. 6 plots the transverse ray aberrations for the imaging optical system 60 at infinity focus distance only for three different wavelengths of 587.5618 nm, 546.1000 nm and 486.1327 nm and for three different relative field heights of 0.00 (on axis), 0.65 (approx. midfield) and 1.00 (edge of field). The corresponding field angles are also shown. The plots of FIG. 6 indicate that the imaging optical system 60 is very well corrected and it will be understood by those in the art that the imaging optical system 60 forms a relatively sharp image when in focus.

Figure 7:
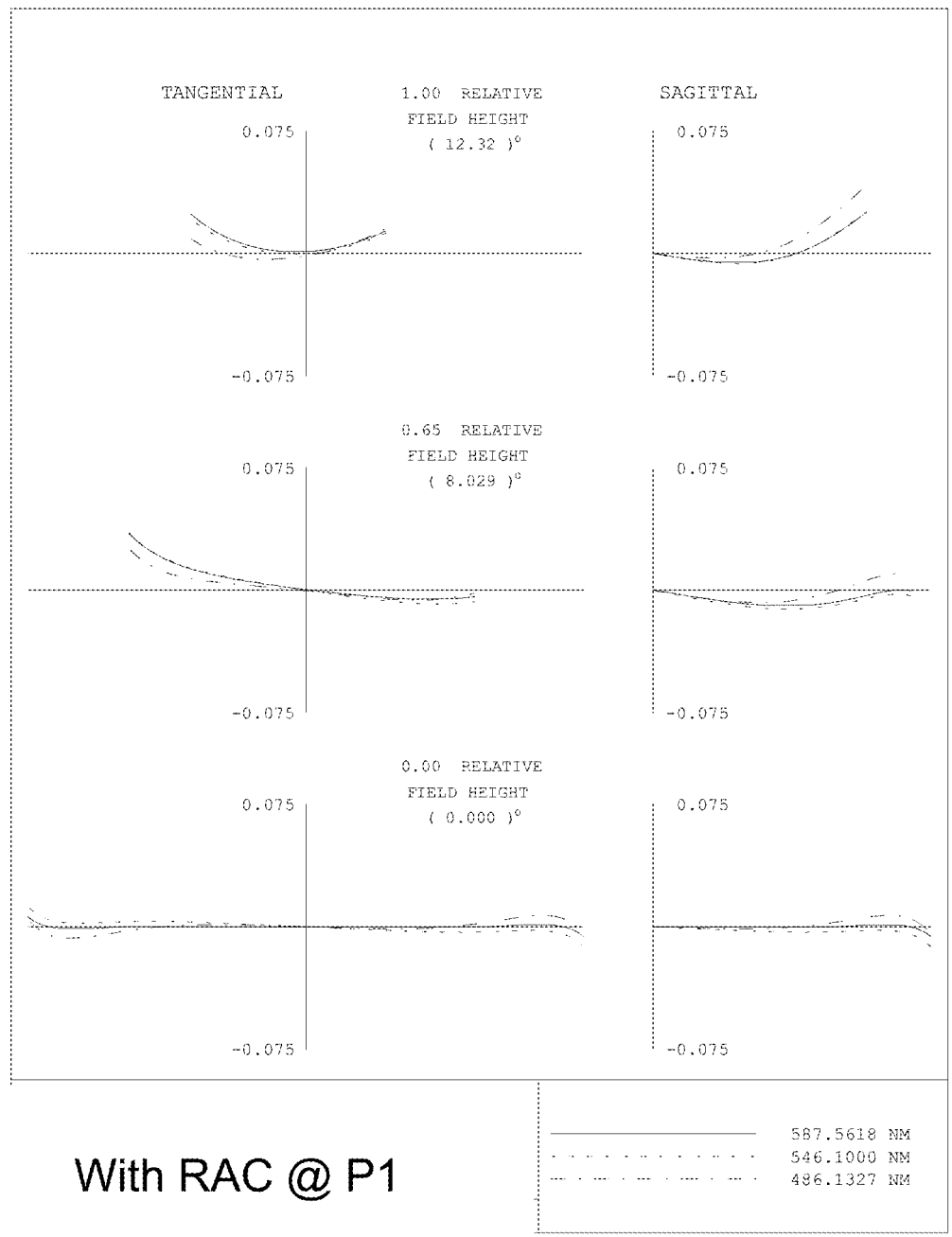
FIGS. 7 through 9 are polychromatic transverse ray aberration plots similar to FIG. 6 but for the combined imaging optical system of FIG. 3C with the first example three-element RAC set at positions P1, P2 and P3, respectively.
Figure 8:
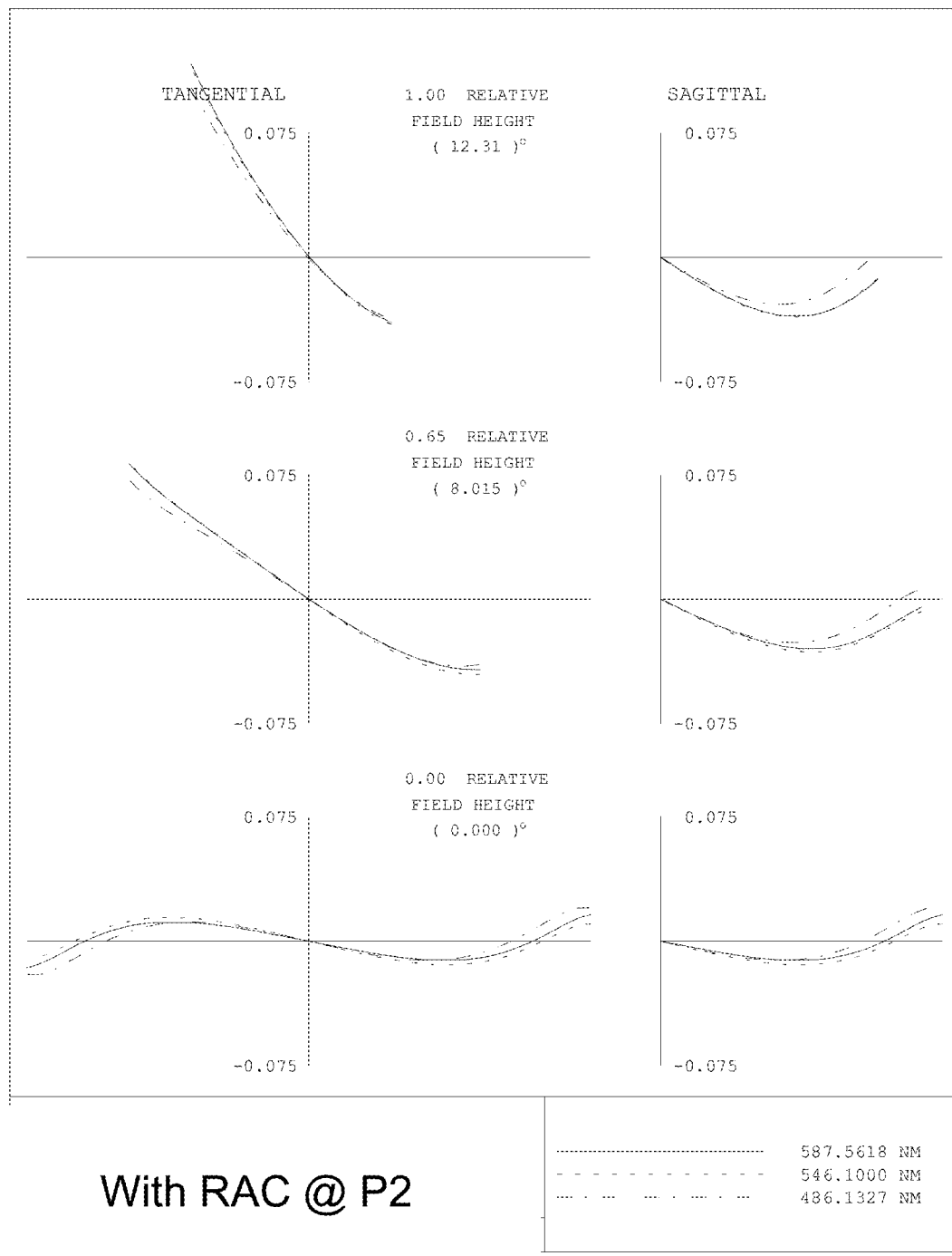
Figure 9:
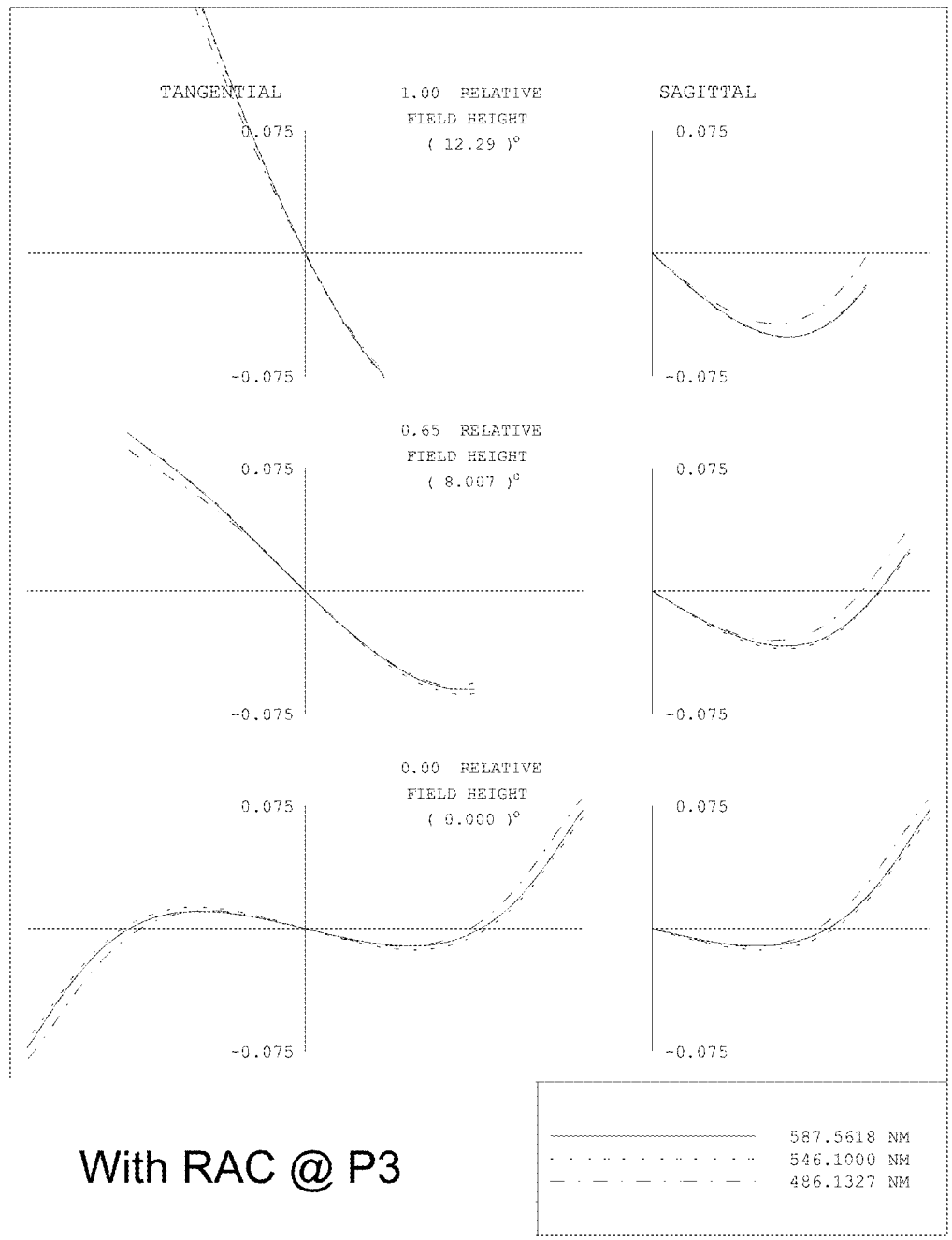

FIGS. 7, 8 and 9 are plots of the transverse ray aberrations similar to that of FIG. 6 (at infinity focus distance) but for the combined imaging optical system 61 formed by the imaging optical system 60 and the RAC 200, with the RAC at positions P1, P2 and P3, respectively.

The image performance shown in FIG. 7 is very similar to that shown in FIG. 6 for just the imaging optical system 60, which is to be expected for the null position. On the other hand, the transverse aberration plots of FIGS. 8 and 9 for positions P2 and P3 are noticeably different to those of FIGS. 6 and 7. The increasing residual aberrations introduced by the RAC 200 at positions P2 and P3 are indicated by larger upper and lower vertical departure of the ray aberration curves from the horizontal axis of the graphs, partly due to greater amounts of spherical aberration and astigmatism. These increased residual aberrations make the image performance at positions P2 and P3 progressively less sharp and more akin to what would be expected when using cinematographic cameras that utilize film rather than a digital image sensor as the recording medium.

Figure 10:
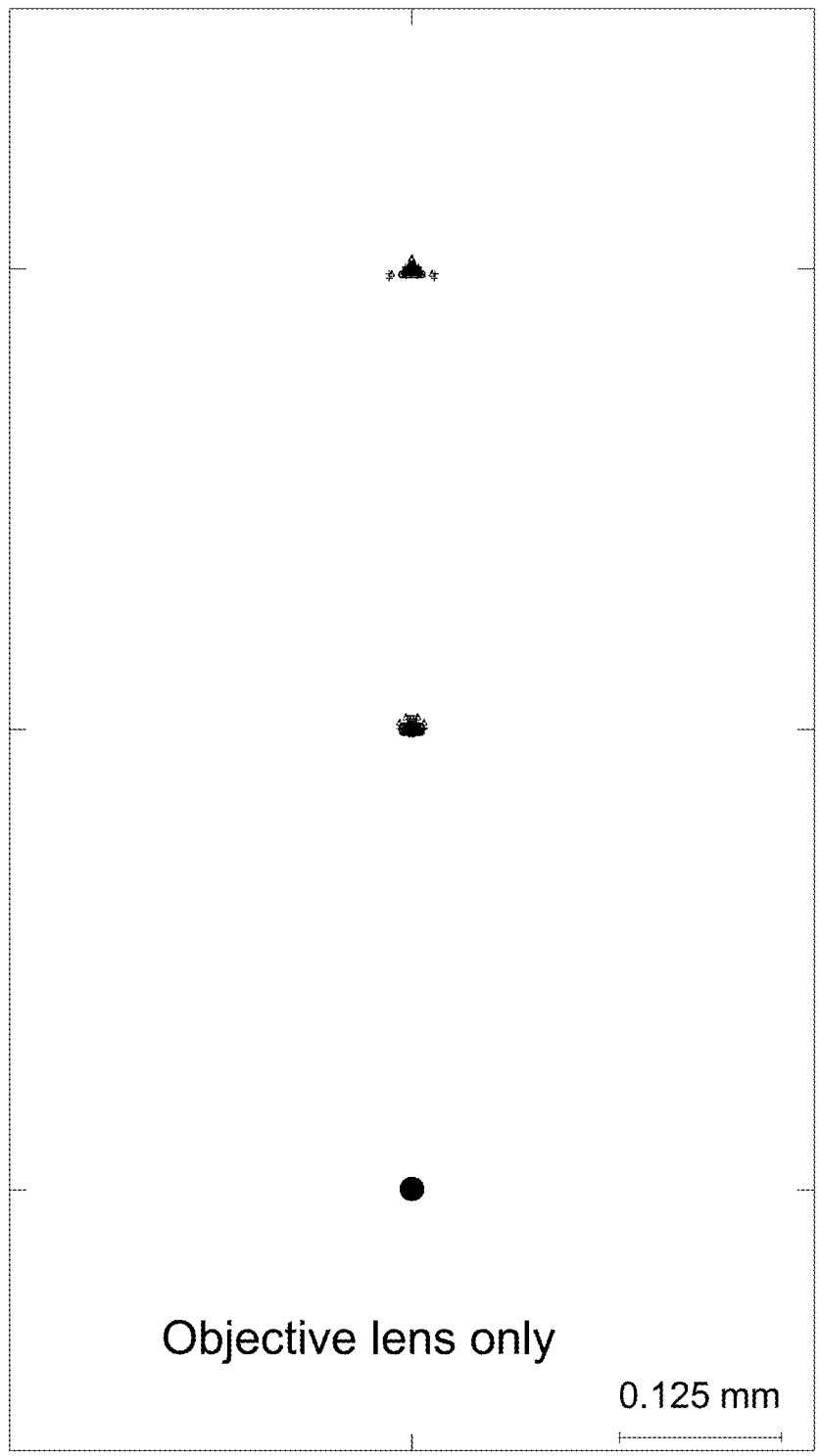
FIG. 10 is a spot diagram plot for the object lens imaging optical system of FIG. 1A at the three field positions of zero, 0.65 of the full field and at the full field, at approximate wavelengths of 587.6 nm, 546.1 nm and 486.1 nm.
Figure 11:
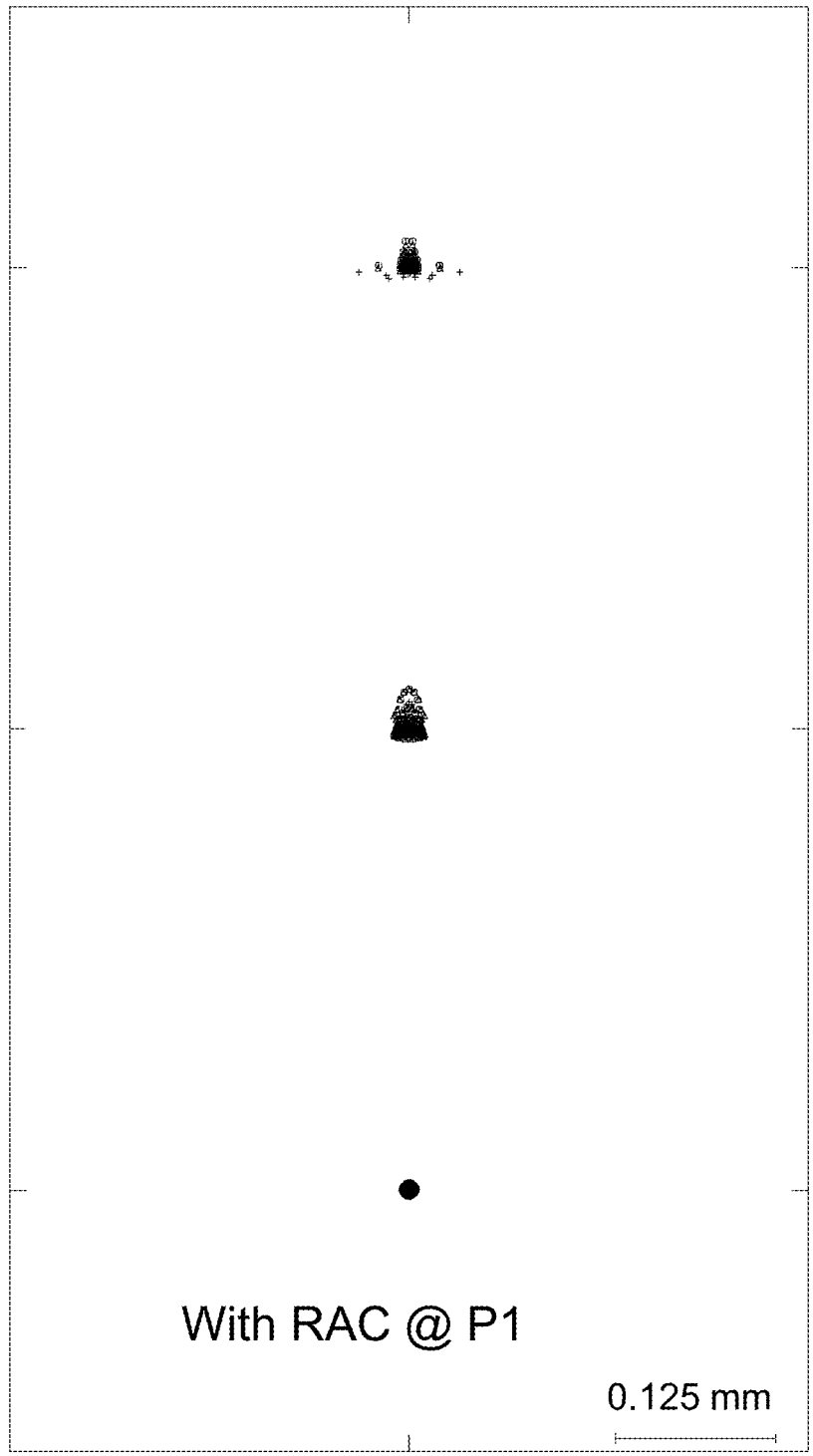
FIGS. 11 through 13 are spot diagram plots similar to FIG. 10 but for the combined imaging optical system with the first example three-element RAC set at positions P1, P2 and P3, respectively.
Figure 12:
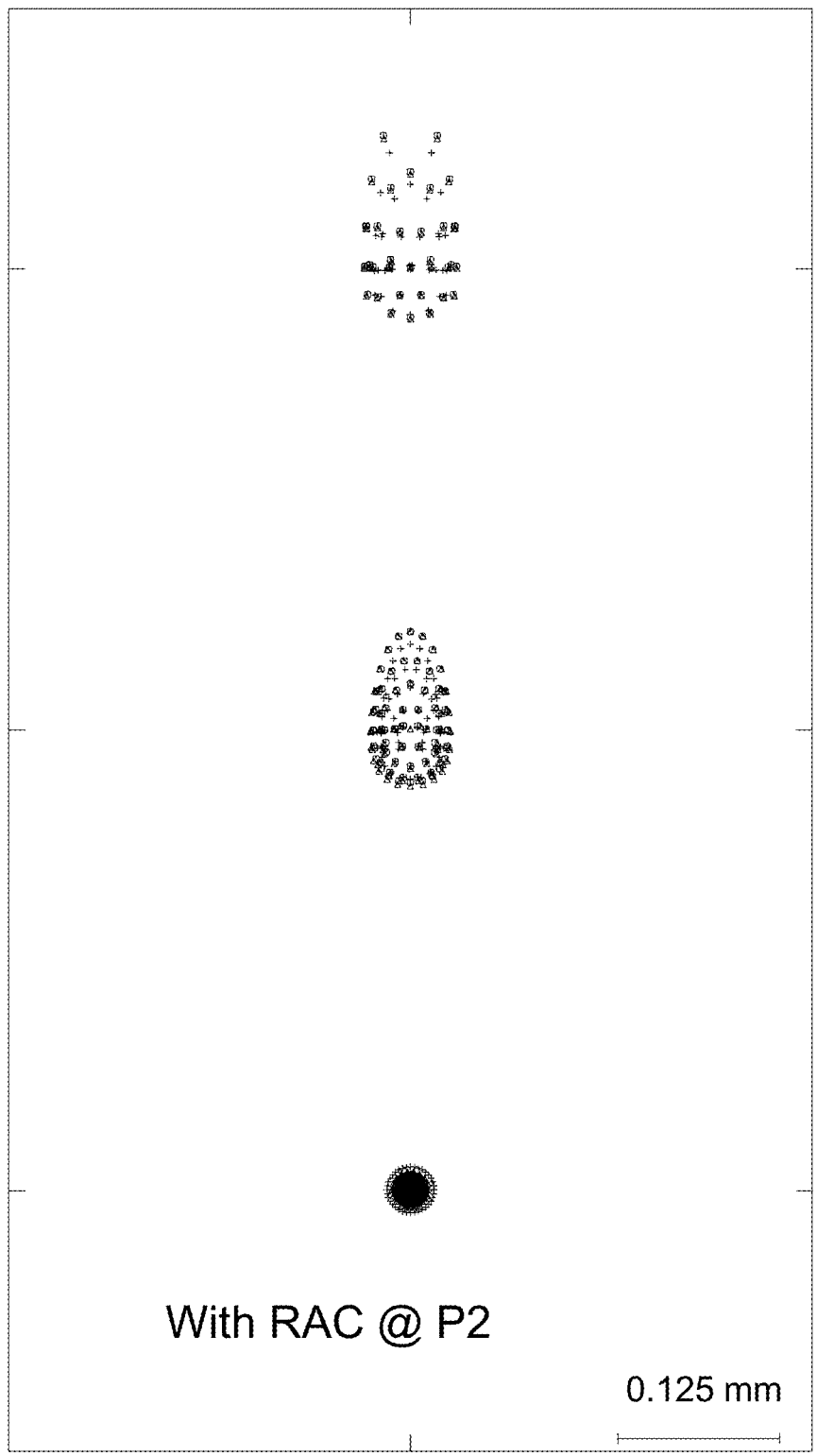
Figure 13:
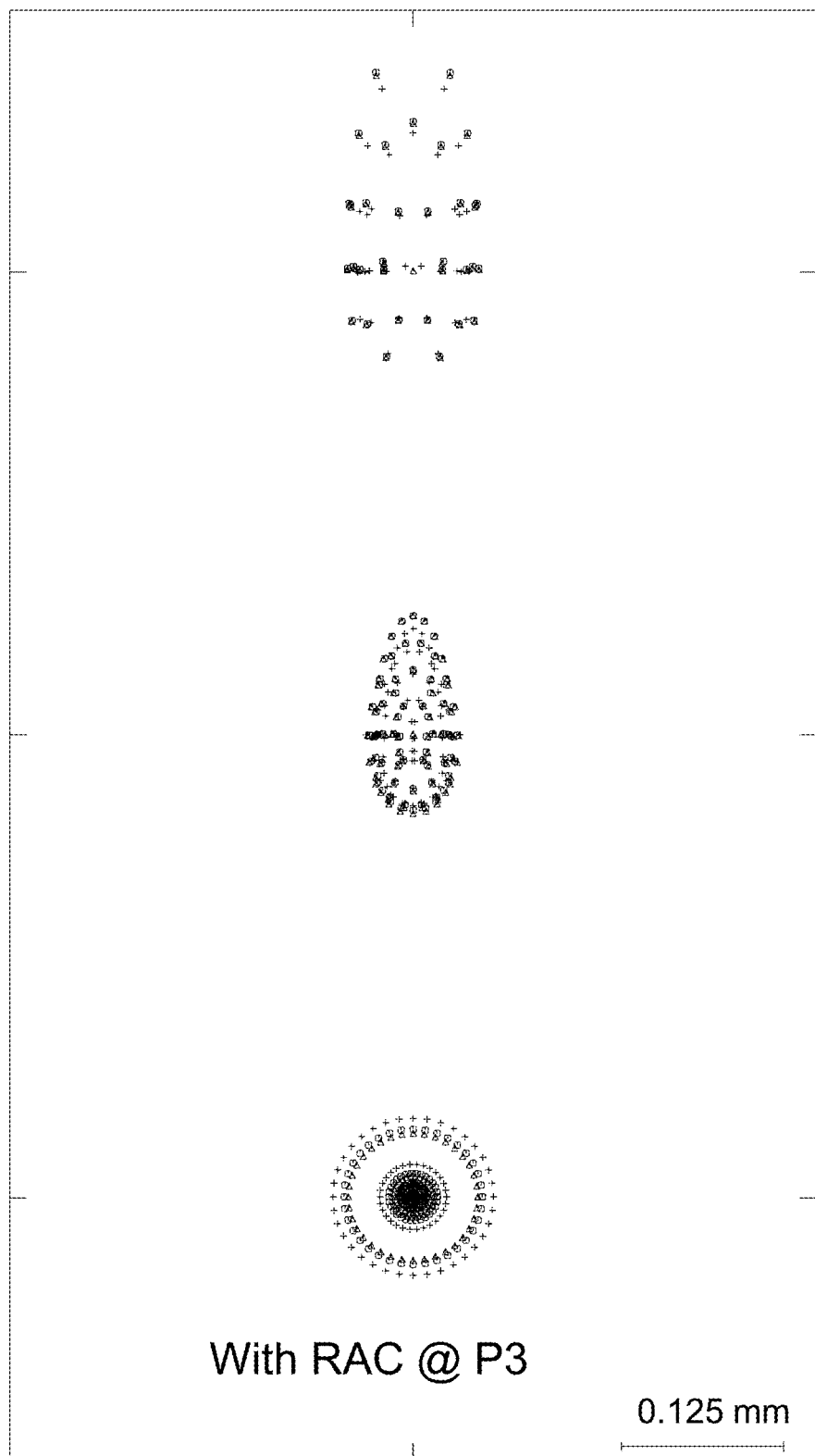

FIGS. 10 through 13 are spot diagram plots of light rays at the image surface IS for on axis (bottom plot), mid-field (middle plot) and edge-of-field (top plot). FIG. 10 is for the imaging optical system 60 only, while FIGS. 11 through 13 are for the combined imaging optical system 61 of the imaging optical system and the RAC 200 for RAC positions P1, P2 and P3, respectively. The same residual aberration characteristics of FIG. 7 through FIG. 9 are readily illustrated in the spot diagrams of FIG. 10 through FIG. 13 as an increase in spot size, a change in spot shape change and ray density differences.

Figure 14A:
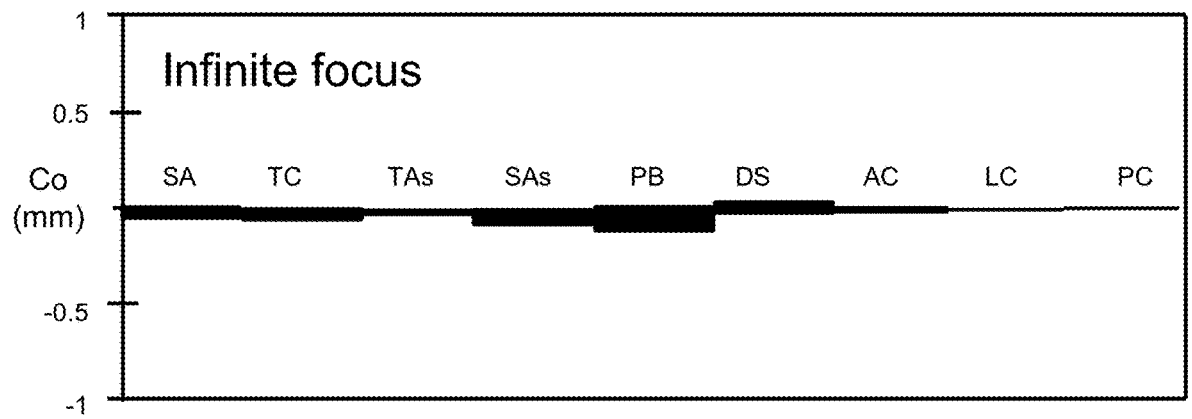
FIGS. 14A through 14C are residual aberration histograms of the aberration coefficients Co (mm) for the example object lens imaging optical system for infinite focus, intermediate focus and close focus, respectively, and wherein the residual aberrations which are identified using the following symbols from left to right in the plot: Spherical aberration=SA; Tangential coma=TC; Tangential Astigmatism=TAs; Sagittal Astigmatism=SAs; Petzval blur=PB; distortion=DS; Axial color=AC; lateral color=LC; and Petzval curvature=PC.
Figure 14B:
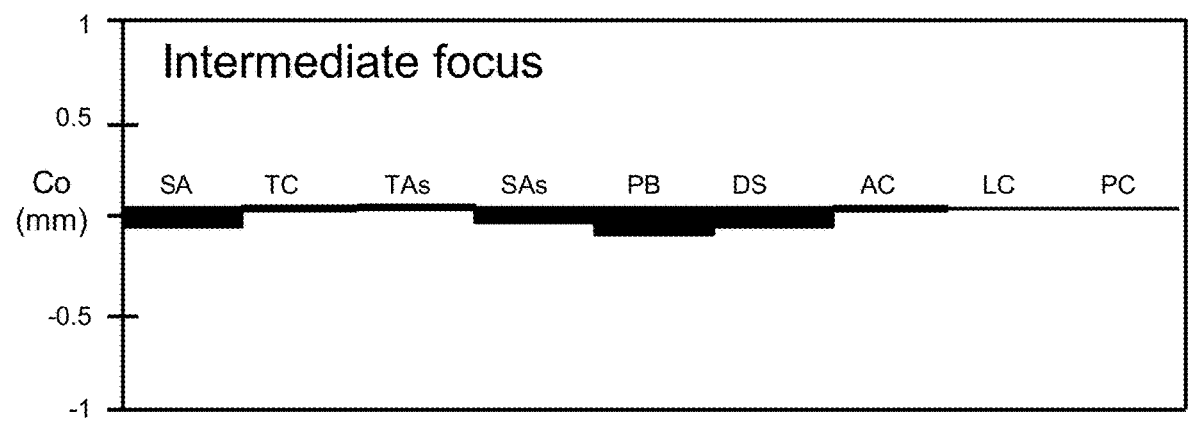
Figure 14C:
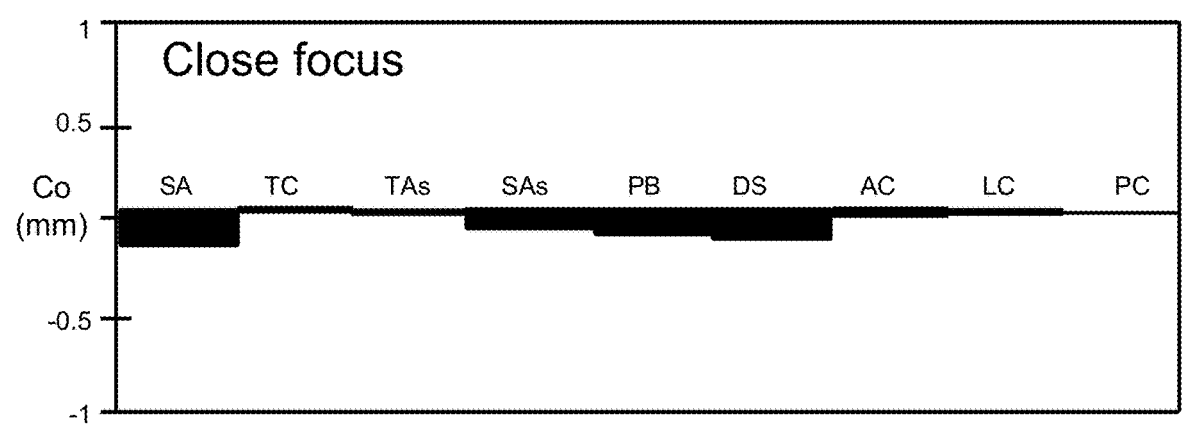

FIGS. 14A through 14C are residual aberration histograms for the imaging optical system 60 only for infinite focus, intermediate focus and close focus, respectively. Each histogram plots the size of the aberration coefficient (which can be negative) for various types of residual aberrations, which are identified using the following symbols from left to right in the plot: Spherical aberration=SA; Tangential coma=TC; Tangential Astigmatism=TAs; Sagittal Astigmatism=SAs; Petzval blur=PB; distortion=DS; Axial color=AC; lateral color=LC; and Petzval curvature=PC.

FIGS. 14A through 14C show that changing the focus setting of the imaging optical system does not substantially change the amount of residual aberrations. Thus, in the discussions below, only the infinite focus setting is considered for ease of illustration and discussion.

Figure 15A:
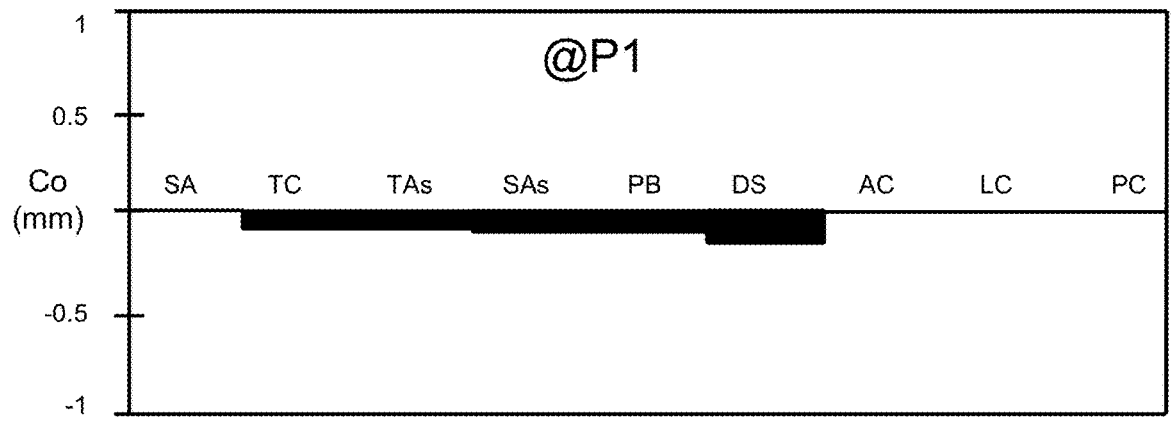
FIGS. 15A through 15C are residual aberration histograms similar to FIG. 14A (infinite focus) for RAC positions P1, P2 and P3, respectively.
Figure 15B:
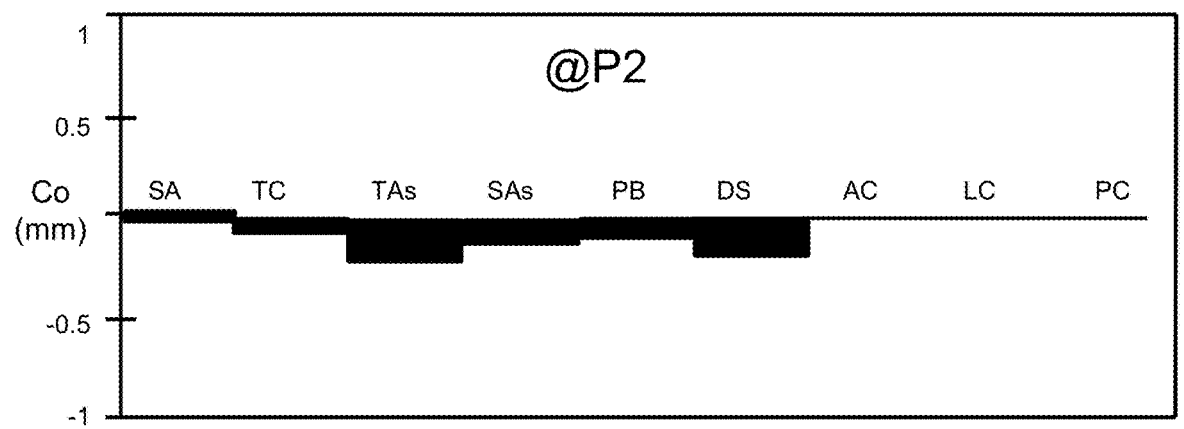
Figure 15C:

FIGS. 15A through 15C are residual aberration histograms for the combined imaging optical system 61 that uses the first example three-element RAC 200 (see FIG. 3A) at positions P1, P2 and P3, respectively. The aberration histograms of FIGS. 15A through 15C show the on-axis (central region) having a slowly increasing spherical aberration over positions P1, P2 and P3 of the axially movable lens elements and show off-axis (corner region) having slowly increasing Sagittal Astigmatism and greater increasing Tangential Astigmatism over positions P1, P2 and P3 of the axially movable lens elements. The on-axis (central region) residual Spherical aberration of this imaging optical system 60 with the example three-element RAC 200 increases in a positive direction going from axial positions P1 to P2 to P3. The off-axis (corner region) residual Tangential and Sagittal Astigmatism aberrations increase in the negative direction when going from axial positions P1 to P2 to P3.

Figure 16:
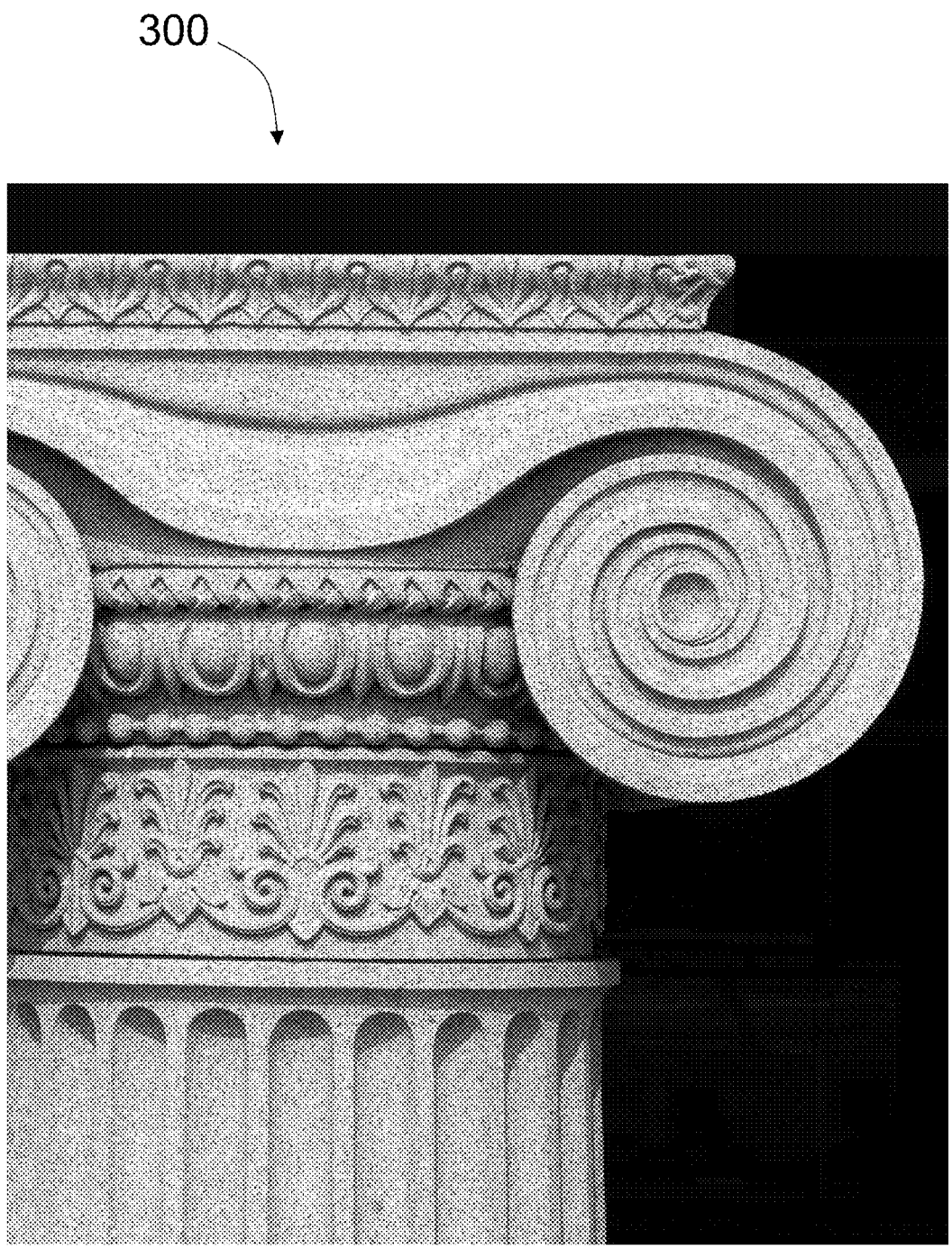
FIG. 16 is the example object used to perform imaging simulations for the objective lens imaging optical system alone and for the combined imaging optical system that includes the RAC to show the aesthetic imaging effect achieved by the RAC disclosed herein.
Figure 17A:
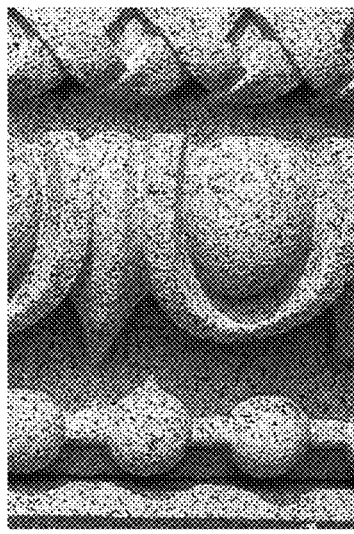
FIG. 17A is a central section of the original object of FIG. 16.
Figure 17B:
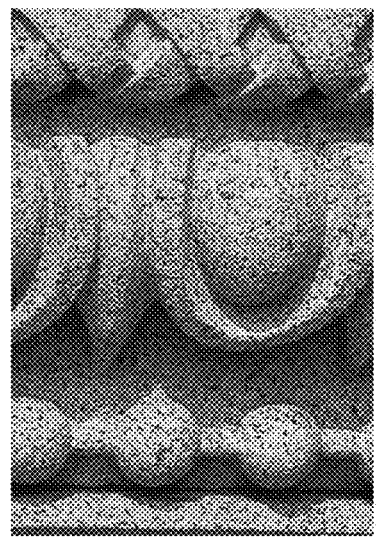
FIG. 17B is an image of the central section of the original object of FIG. 16 obtained by simulation using just the object lens imaging optical system of FIG. 1B.
Figure 18A:
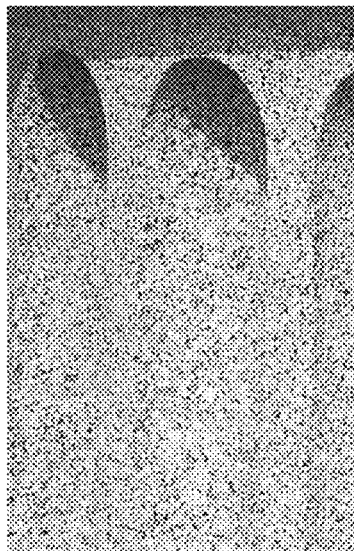
FIGS. 18A and 18B are similar to FIGS. 17A and 17B but for a corner section of the original object.
Figure 18B:

The impact of the change in the amounts of residual aberrations on the imaging of the combined imaging optical system 61 is illustrated using imaging simulations. FIG. 16 is an example black and white reference object 300 used in the simulations. FIGS. 17A and 17B show a close-up of a central region 302 of the reference object 300 (FIG. 17A) and the image at infinite focus as formed using just the imaging optical system 60 (FIG. 17B). FIGS. 18A and 18B are similar to FIGS. 17A and 17B but for a corner region 304 of the reference object 300. The diminution of intensity between the original object 300 and the corresponding images is due to the lens design software imposing a reduction in optical transmission through lens elements of the object lens 60, resulting in a darker image as compared to the object.

FIGS. 19A through 19D show the imaging optical system image of the central section 302 of the reference object (FIG. 19A) along with images of the central section 302 as formed using the combined imaging optical system 61 with the first example three-element RAC 200 for position P1 (FIG. 19B), position P2 (FIG. 19C) and position P3 (FIG. 19D). FIGS. 20A through 20D are similar to FIGS. 19A through 19D but for a corner region 304 of the reference object 300. The softness in the images in FIGS. 19C, 19D, 20C and 20D is mainly due to residual aberrations and not due to defocus at a constant image distance. In particular, with reference to the aberration histograms of FIGS. 15A through 15C, the aesthetic imaging quality at positions P2 and P3 are mainly due to differences in Spherical aberration and Axial Color.

Table 1D bellow sets forth the wavefront values and relative differences between values for the imaging optical system 60 alone and combined imaging optical system 61 for the first three-element RAC 300 of FIG. 3A for the different positions P1, P2 and P3 (for infinite focus).

Second Example Three—Element RAC Example

Figure 21:
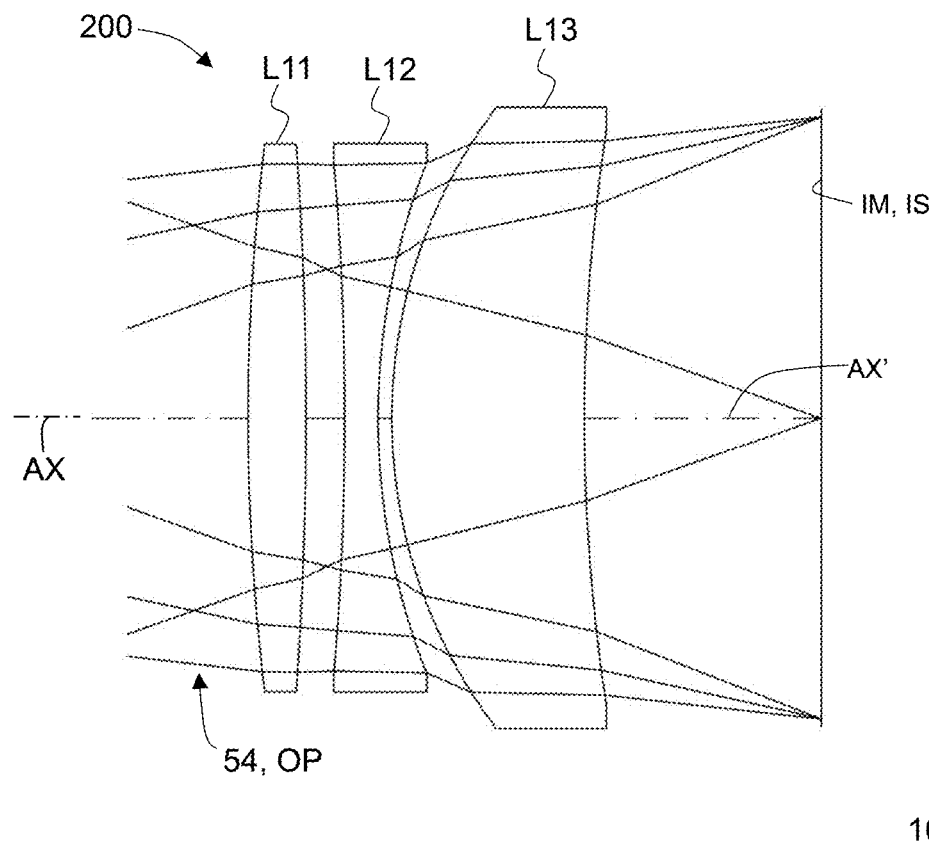
FIG. 21 is a schematic diagram of a second example of a three-element RAC operably disposed in the image-forming optical path.

FIG. 21 is a close-up schematic diagram similar to FIG. 3B and shows a second example three-element RAC 200 operably disposed in the image-forming optical path OP. The lens element L11 is biconvex, the lens element L12 is biconcave and the lens element L13 is positive meniscus. This second example three-element RAC 200 includes two sets of positions P1 through P3 having substantially different imaging performance. This means that two sets of aesthetic effects are provided by the same three lens elements, thereby making the combined imaging optical system 61 more versatile in its ability to provide for aesthetic imaging options.

Tables 2A and 2B below set forth the optical prescriptions for the second example three-element RAC 200 that show the two different sets of positions P1 through P3.

FIGS. 22A through 22C show the first set of positions P1, P2 and P3 for combined imaging optical system 61 that includes the second three-element RAC 200 while FIGS. 23A through 23C show the same combined imaging optical system 61 for the second set of positions P1, P2 and P3.

The Tables 2A and 2B indicate that the differences in lens movements of the two sets of positions occur at separations of S17, S19, S21 and S23.

Figure 24A:
FIGS. 24A through 24C are residual aberration plots for the combined imaging optical system that includes the second example three-element RAC for the first set of positions P1, P2 and P3.
Figure 24B:
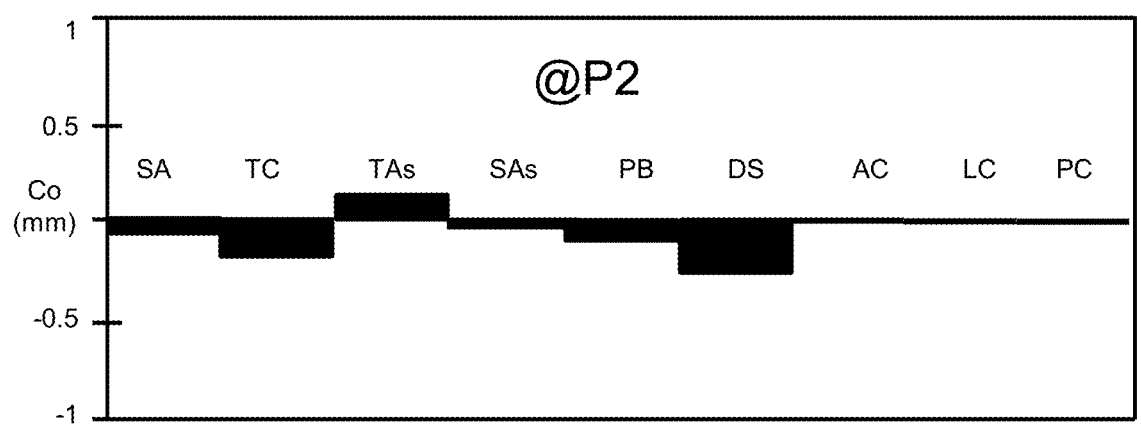
Figure 24C:
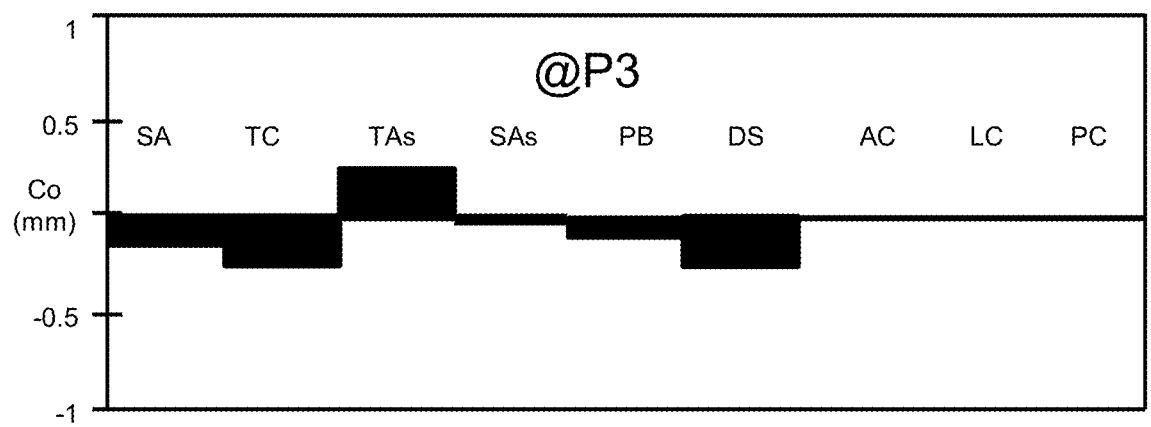
Figure 25A:
FIGS. 25A through 25C are residual aberration plots for the combined imaging optical system that includes the second example three-element RAC for the second set of positions P1, P2 and P3.
Figure 25B:
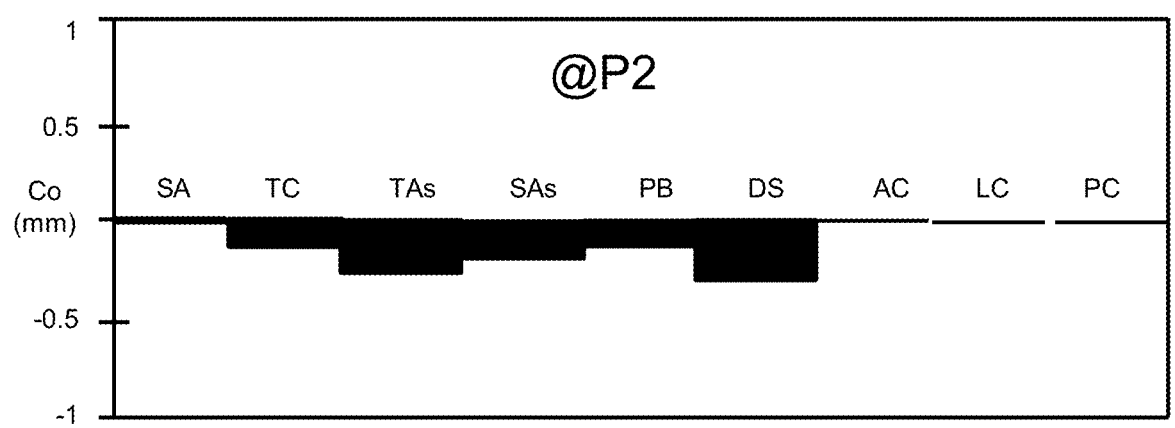
Figure 25C:
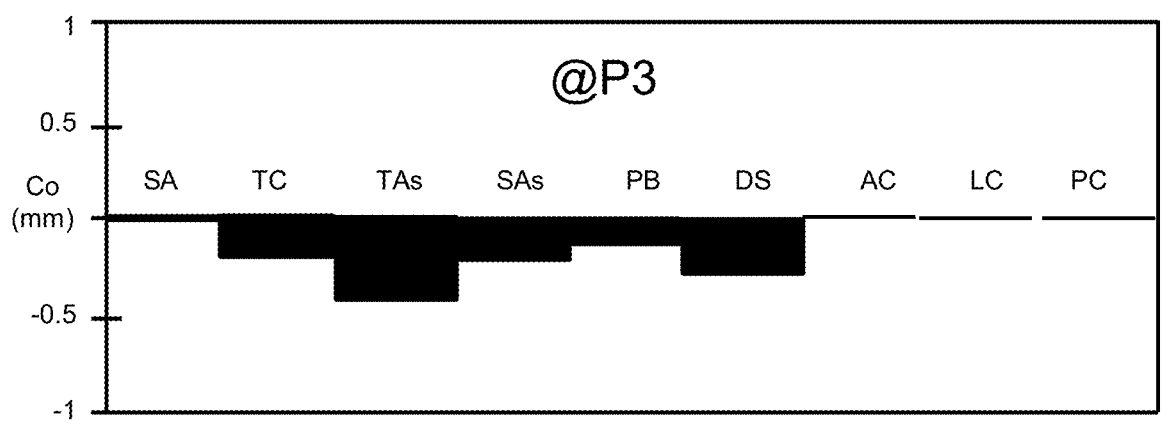
Figure 26A:
FIGS. 26A through 26D show the central portion image using just the objective lens imaging optical system (FIG. 26A, which is the same as FIG. 17B) and for the combined imaging optical system that uses the second example three-element RAC at the first set of positions P1, P2 and P3 (FIGS. 26B, 26C and 26D, respectively).
Figure 26B:
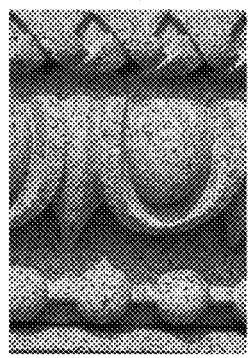
Figure 26C:
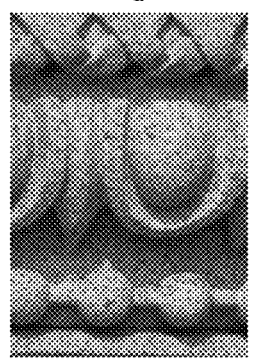
Figure 26D:
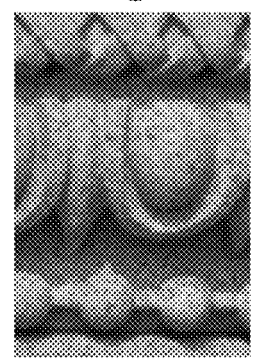
Figure 27A:
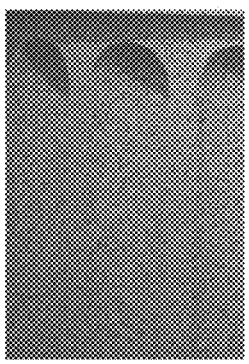
FIGS. 27A through 27D show the corner portion image using just the objective lens imaging optical system (FIG. 27A, which is the same as FIG. 18B) and for the combined imaging optical system that uses the second example three-element RAC at the first set of positions P1, P2 and P3 (FIGS. 27B, 27C and 27D, respectively).
Figure 27B:
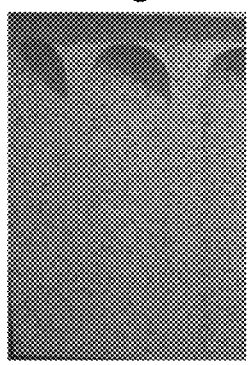
Figure 27C:
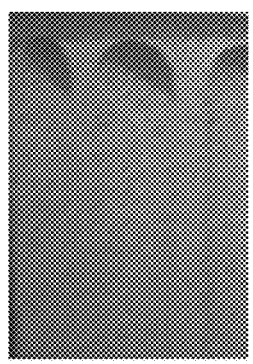
Figure 27D:
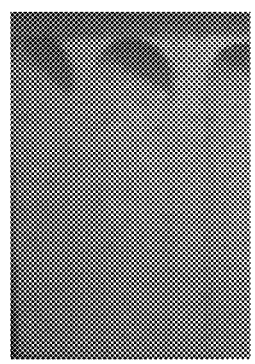

FIGS. 24A through 24C are residual aberration histograms of the combined imaging optical system 61 for the second example three-element RAC 200 for the first set of positions P1, P2 and P3. FIGS. 25A through 25C are residual aberration histograms of the combined imaging optical system 61 for the second example three-element RAC 200 for the second set of positions P1, P2 and P3.

Tables 2C and 2D below set forth the wavefront aberration data for the combined imaging optical system 61 for the first set of positions P1, P2 and P3 while Tables 2E and 2F set forth the wavefront aberration data for the combined imaging optical system 61 for the second set of positions P1, P2 and P3.

FIGS. 26A through 26D show the imaging optical system image of the central region 302 of the reference object 300 (FIG. 26A) along with the combined imaging optical system images for the first set of positions P1, P2 and P3. FIGS. 27A through 27D show the imaging optical system image of the corner region 304 of the reference object 300 (FIG. 27A) along with the combined imaging optical system images for the first set of positions P1, P2 and P3. FIGS. 28A through 28D show the imaging optical system image of the central region 302 of the reference object 300 (FIG. 28A) along with the combined imaging optical system images for the second set of positions P1, P2 and P3. FIGS. 29A through 29D show the imaging optical system image of the corner region 304 of the reference object 300 (FIG. 29A) along with the combined imaging optical system images for the second set of positions P1, P2 and P3.

The image simulations of FIGS. 26A through 26D and 27A through 27D show the aesthetic imaging effect at the first set of positions P2 and P3 is due to the residual aberrations as shown in FIGS. 24B and 24C respectively and the wavefront values shown in Tables 2C and 2D.

The image simulations of FIGS. 28A through 28D and 29A through 29D show the aesthetic imaging effect at the second set of positions P2 and P3 and is due to the residual aberrations as shown in FIGS. 25B and 25C respectively and the wavefront values shown in Tables 2E and 2F.

The residual aberration histograms of FIGS. 24A through 24C show that the imaging performance of the combined imaging optical system 61 for the first set of positions P1, P2 and P3 has an on-axis (central region) having slowly increasing Spherical aberration and off-axis (out to corner region) having slowly increasing Coma aberrations in a negative direction, slowly increasing Tangential Astigmatism in a positive direction, slowly reducing Sagittal Astigmatism in a positive direction and slowly reducing Distortion in a positive direction over positions P1, P2 and P3 of the axially movable lens elements, as shown in the aberration bar charts.

With reference now to the aberration histograms of FIGS. 25A through 25C, the image performance of the second example three-element RAC 200 for the second set of positions P1, P2 and P3 shows an on-axis (central region), shows a substantially constant Spherical aberration and off-axis (out to corner region) having substantially constant Coma while the Tangential and Sagittal Astigmatism aberrations become increasingly large in the negative direction.

For both sets of positions P1, P2 and P3, the on-axis (central region) residual aberrations are almost the same for the imaging optical system 60 and for the combined imaging optical system 61 with the second example three-element RAC 200. However, the on-axis (central region) residual aberrations for the first set of positions P1, P2 and P3 increase in going from the positions P1 to P2 to P3, whereas the on-axis (central region) residual aberrations associated with the second set of positions are almost unchanged. In comparison, the off-axis (out to corner region) aberrations change substantially for both sets of positions. This means that two quite different 'looks' to the image can be provided both in a variable way in terms of strength of the image change provided.

First example two-element RAC

Figure 30:
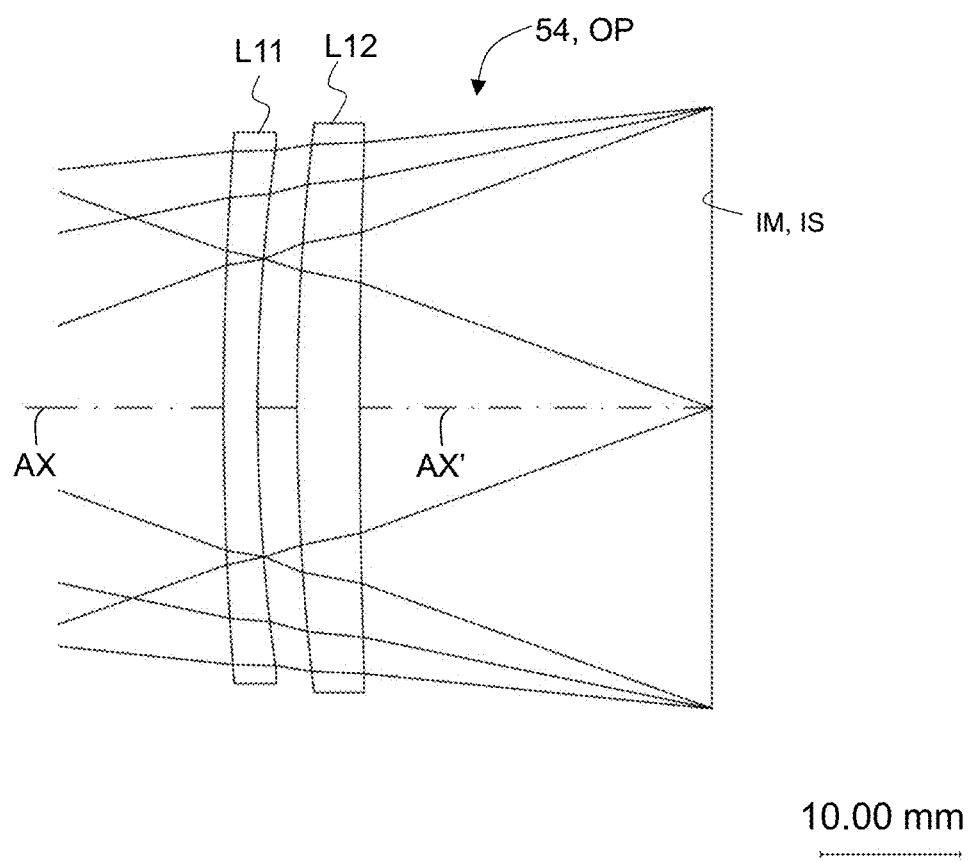
FIG. 30 is a schematic diagram of a first example of a two-element RAC operably disposed in the image-forming optical path.

FIG. 30 is a close-up schematic diagram that shows a first example of a two-element RAC 200 operably disposed in the image-forming optical path OP. This example RAC has first and second lens elements L11 and L12, wherein the first lens element L11 is negative meniscus and the second lens element L12 is positive meniscus.

Table 3A below sets forth the optical prescription of the combined imaging optical system 61 with the second example three-element RAC 200 for the positions P1 through P3.

Figure 31A:
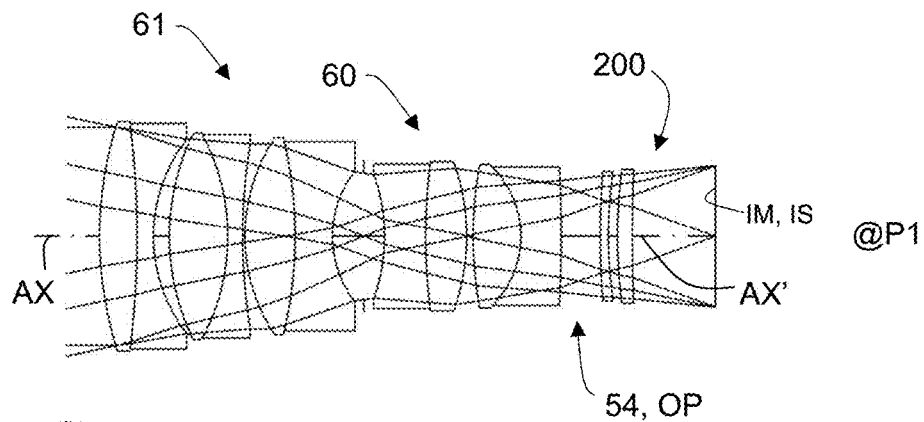
FIGS. 31A through 31C are schematic diagrams of the combined imaging optical system that includes the first example two-element RAC and showing the movement of the first lens element of the RAC between positions P1, P2 and P3.
Figure 31B:
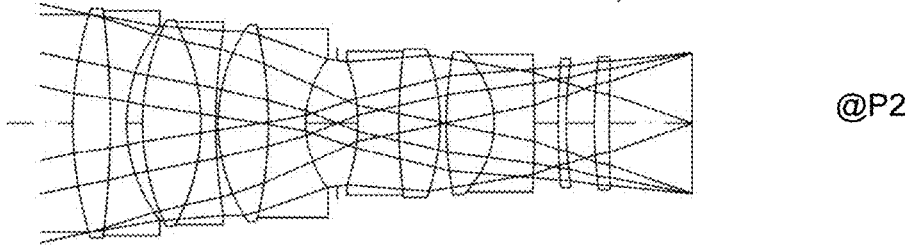
Figure 31C:
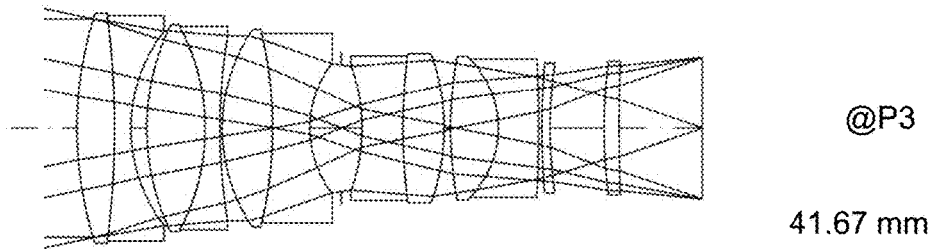

FIGS. 31A through 31C show the positions P1, P2 and P3 for the combined imaging optical system. In this example, the first lens element L11 moves towards the object lens from positions P1 to P3 while the second lens element L12 remains stationary.

Figure 32A:
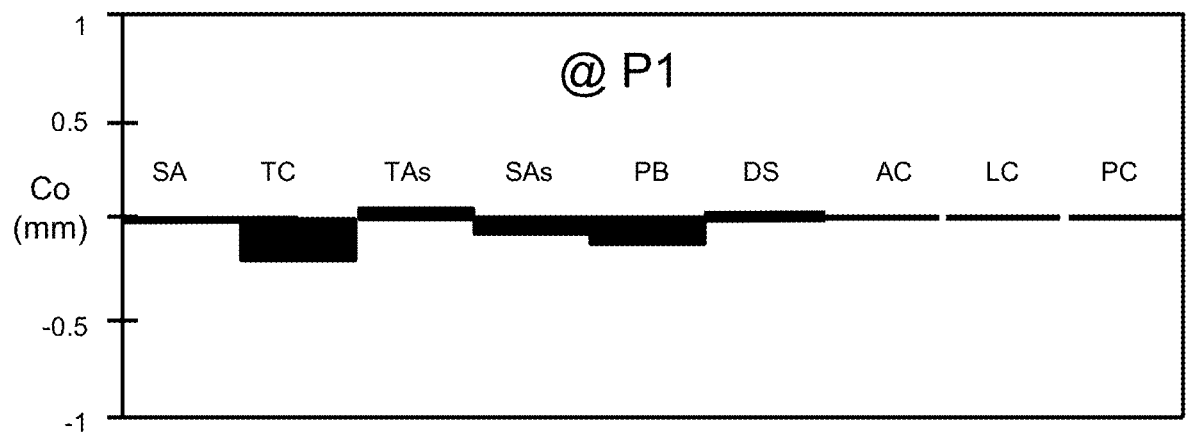
FIGS. 32A through 32C are residual aberration plots of the combined imaging optical system that includes the first example two-element RAC for positions P1, P2 and P3, respectively.
Figure 32B:
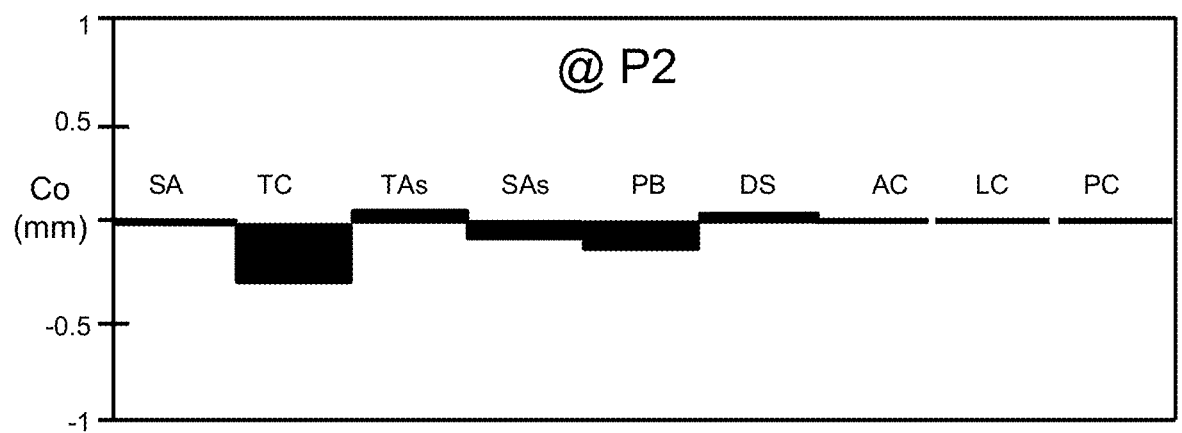
Figure 32C:
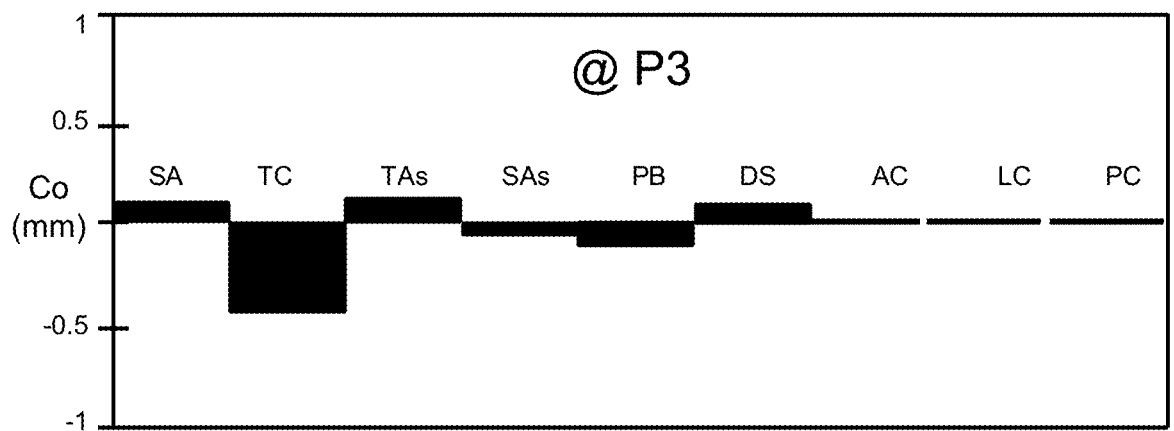

FIGS. 32A through 32C are residual aberration histograms of the combined imaging optical system 61 for the first example two-element RAC 200 for the first set of positions P1, P2 and P3. The on-axis (central region) residual aberrations for the combined imaging optical system 61 are only slightly different than that of the imaging optical system 60 at position P1 but are substantially different by a greater amount at positions P2 and P3. The off-axis (corner region) residual aberrations for the combined imaging optical system 61 are only slightly different at all positions P1, P2 and P3. A feature of this example two-element RAC 200 that can be seen from the aberration plots is the increasing amount of Tangential Coma when moving from position P1 to P2 to P3. This means that the aesthetic effect in the image is due mainly to coma, which smears the image. This is a substantially different way of softening an image as compared to defocus, which blurs the images.

Table 3B below sets forth the wavefront aberration data for the combined imaging optical system 61 for the first set of positions P1, P2 and P3.

FIGS. 33A through 33D show the imaging optical system image of the central region 302 of the reference object 300 (FIG. 33A) along with the combined imaging optical system images for the positions P1, P2 and P3. FIGS. 34A through 34D show the imaging optical system image of the corner region 304 of the reference object 300 (FIG. 34A) along with the combined imaging optical system images for the first set of positions P1, P2 and P3.

The image simulations of FIGS. 33A-33D and 34A-34D show the aesthetic imaging effect at the first set of positions P2 and P3 is due to the residual aberrations as shown in FIGS. 32A and 32C respectively and the wavefront values shown in Tables 3B and 3C. The differences in on-axis (central region) image simulation at all focus distances and for all axial positions P1, P2 and P3 are due to differences in Spherical aberration and Axial Color.

Second example two-element RAC

Figure 35A:
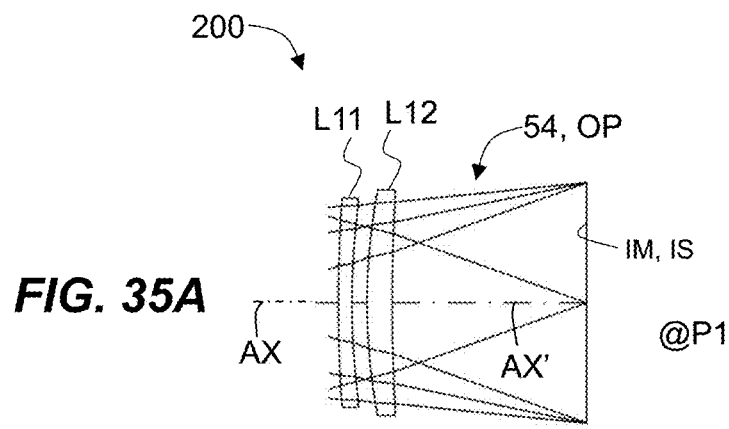
FIGS. 35A through 35C is a schematic diagram of a second example of a two-element RAC operably disposed in the image-forming optical path and showing the different positions P1, P2 and P3.
Figure 35B:
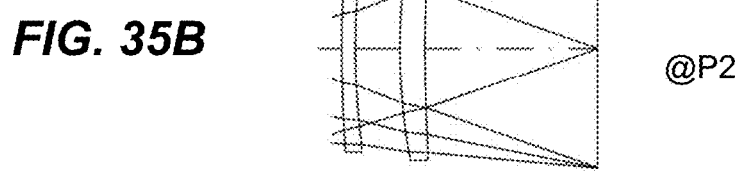
Figure 35C:
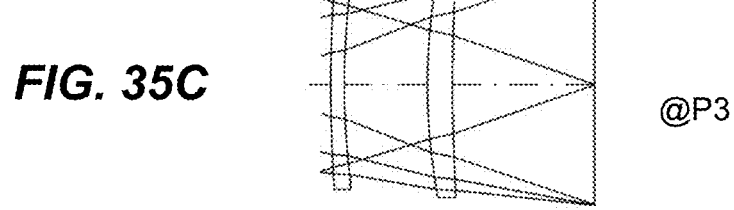

FIGS. 35A through 35C are close-up schematic diagrams of a second example of a two-element RAC 200 operably disposed in the image-forming optical path OP. This example RAC has first and second lens elements L11 and L12, wherein the first lens element L11 is negative meniscus and the second lens element L12 is positive meniscus, with the first and second lens element being axially movable.

Table 4A below sets forth the optical prescription for the combined imaging optical system 61 with the second two-element RAC 200 for the positions P1 through P3.

Figure 36A:
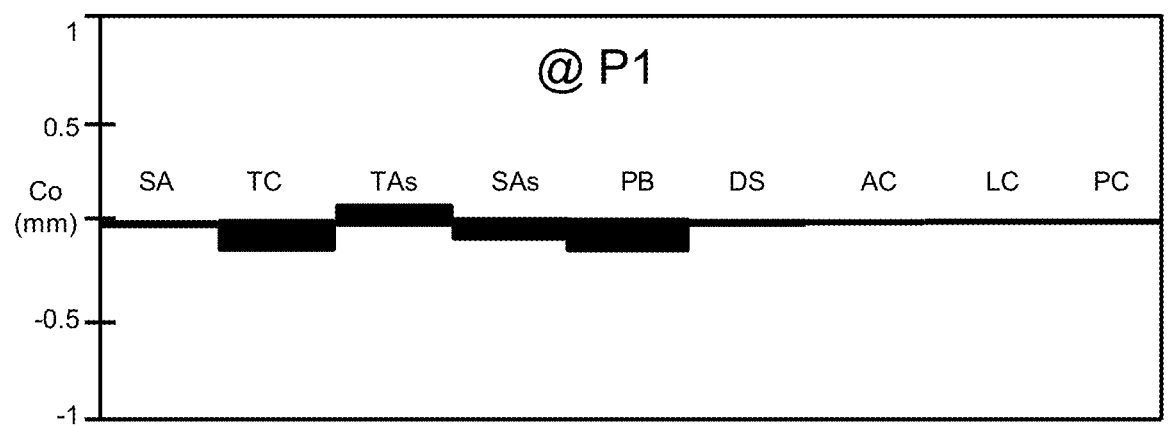
Figure 36B:
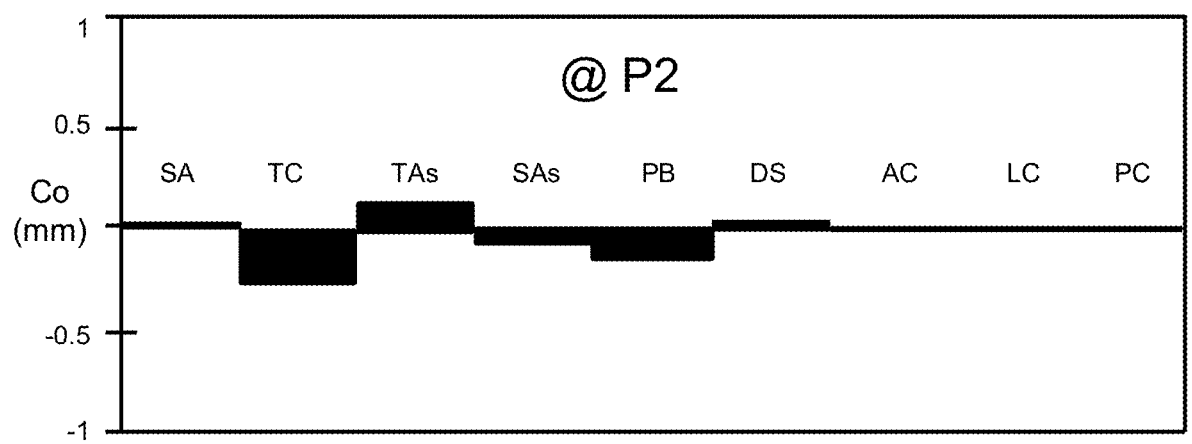
Figure 36C:
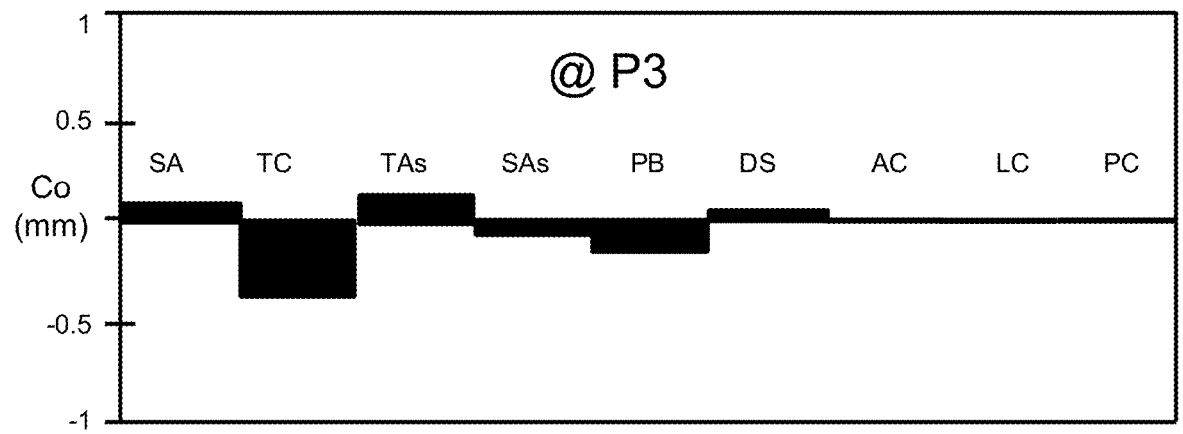

FIGS. 36A through 36C are residual aberration histograms of the combined imaging optical system 61 for the second example two-element RAC 200 for positions P1, P2 and P3. The imaging performance of this second two-element example is similar to that of the first two-element example with respect to the on-axis residual aberrations. The off-axis (corner region) residual Coma and Astigmatism however are different than for the first two-element example. In particular, the residual Coma increases in a negative direction and the residual Tangential Astigmatism and Sagittal Astigmatism increase in a positive direction when moving from positions P1 to P2 to P3.

The corresponding central and corner image simulations are shown in FIGS. 37A through 37D (central) and 38A through 38D (corner) for the second two-element example of the RAC 200.

Table 4B below sets forth the wavefront aberration data for the combined optic system 61 for the positions P1, P2 and P3.

FIGS. 37A through 37D show the imaging optical system image of the central region 302 of the reference object 300 (FIG. 37A) along with the combined imaging optical system images for the first set of positions P1, P2 and P3. FIGS. 38A through 38D show the imaging optical system image of the corner region 304 of the reference object 300 (FIG. 38A) along with the combined imaging optical system images for the positions P1, P2 and P3.

The image simulations of FIGS. 37A through 37D and 38A through 38D show the aesthetic imaging effect at the first set of positions P2 and P3 is due to the residual aberrations as shown in FIGS. 36A through 36C respectively and the wavefront aberration values shown in Table 4B. The differences in on-axis (central region) image simulation at all focus distances and for all axial positions P1, P2 and P3 are due to differences in Spherical aberration and Axial Color.

Third Example Two—Element RAC

Figure 39A:
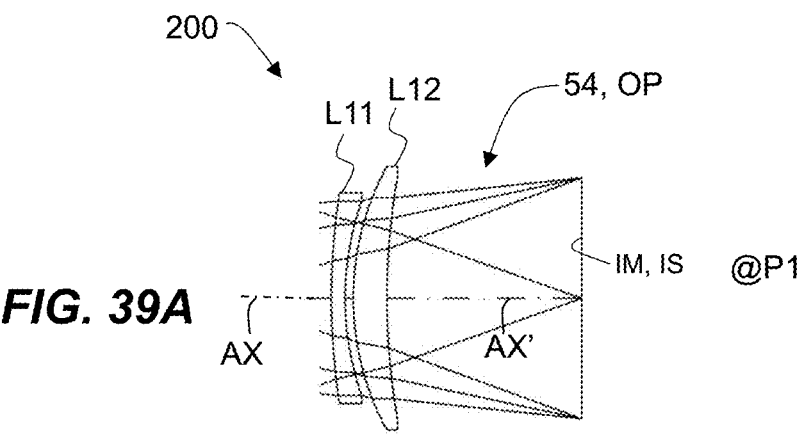
FIGS. 39A through 39C are schematic diagrams of a third example of a two-element RAC operably disposed in the image-forming optical path and showing the different positions P1, P2 and P3.
Figure 39B:
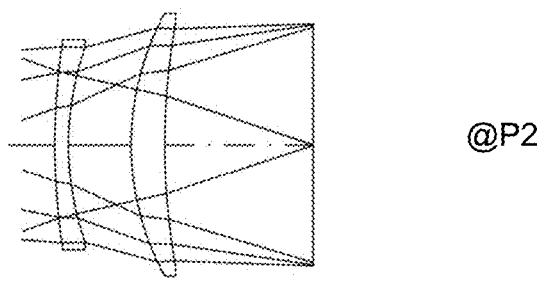
Figure 39C:
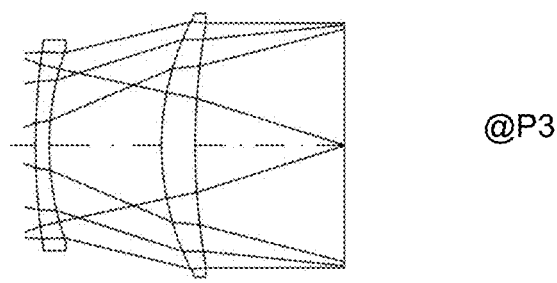

FIGS. 39A through 39C are close-up schematic diagrams of a third example of a two-element RAC 200 operably disposed in the image-forming optical path. This example RAC 200 has first and second lens elements L11 and L12, wherein the first lens element L11 is negative meniscus and the second lens element L12 is positive meniscus, with the first and second lens element being axially movable. The two elements L11 an L12 have larger surface curvatures as compared to the first and second example two-element RACs 200.

Table 5A below sets forth the optical prescription for the combined imaging optical system 61 with the third example two-element RAC 200 for positions P1 through P3.

Figure 40A:
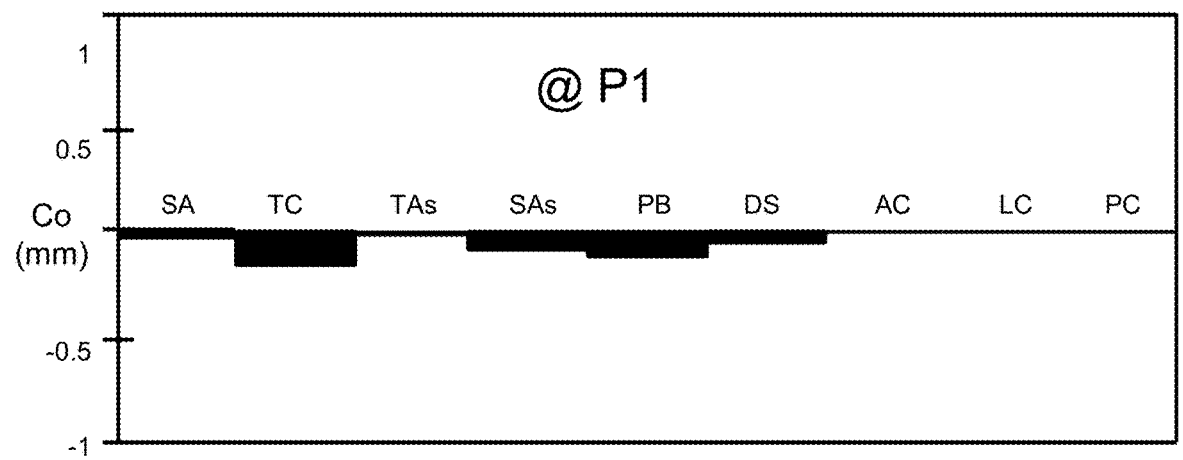
FIGS. 40A through 40C are residual aberration histograms for the combined imaging optical system that includes the third example two-element RAC for the positions P1, P2 and P3, respectively.
Figure 40B:
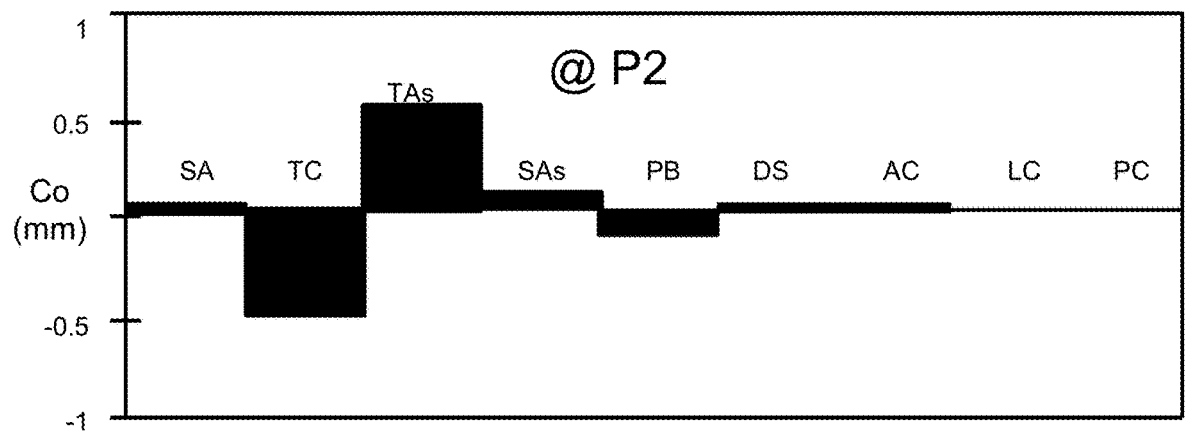
Figure 40C:
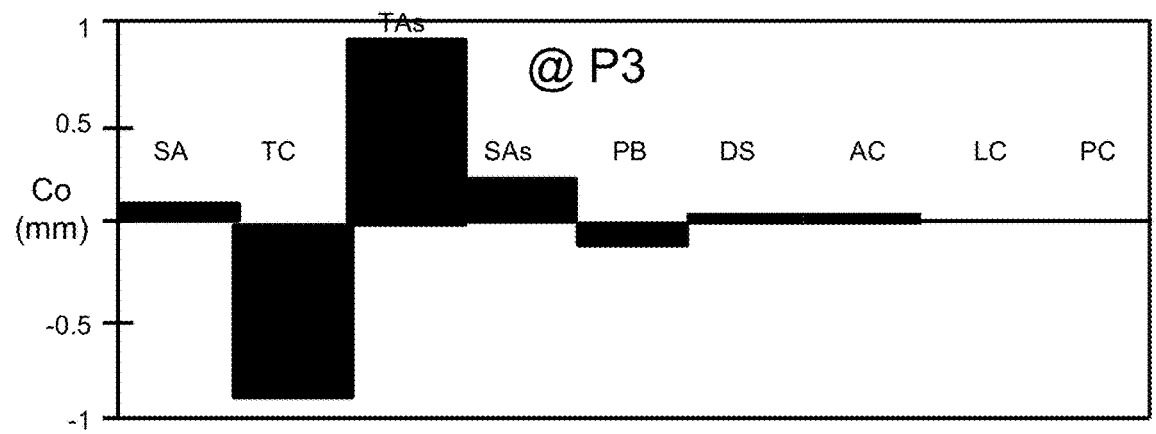
Figure 41A:
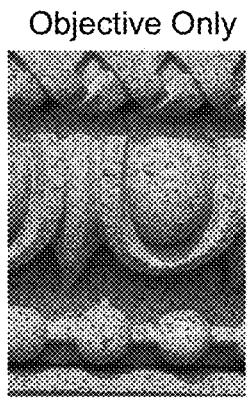
FIGS. 41A through 41D show the central portion image using just the objective lens imaging optical system (FIG. 41A, which is the same as FIG. 17B) and for the combined imaging optical system that uses the third example two-element RAC at positions P1, P2 and P3 (FIGS. 41B, 41C and 41D, respectively).
Figure 41B:
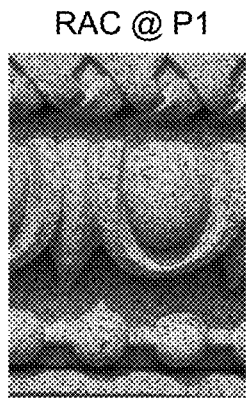
Figure 41C:
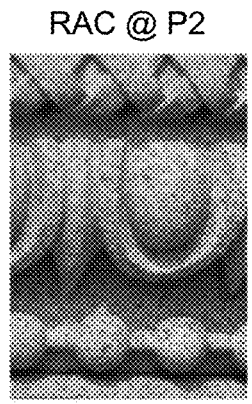
Figure 41D:
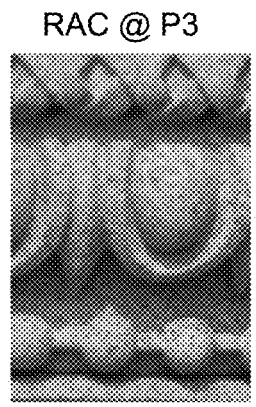
Figure 42A:
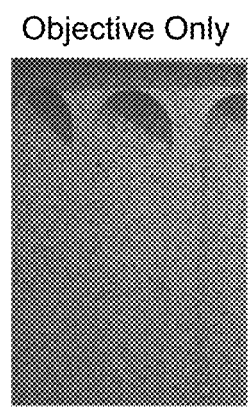
FIGS. 42A through 42D show the corner portion image using just the objective lens imaging optical system (FIG. 42A, which is the same as FIG. 18B) and for the combined imaging optical system that uses the third example two-element RAC at positions P1, P2 and P3 (FIGS. 42B, 42C and 42D, respectively).
Figure 42B:
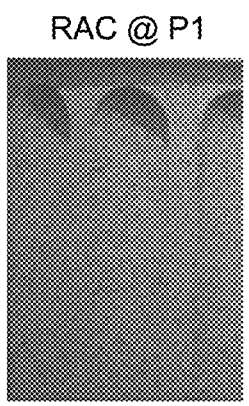
Figure 42C:
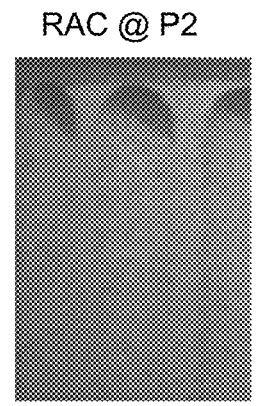
Figure 42D:
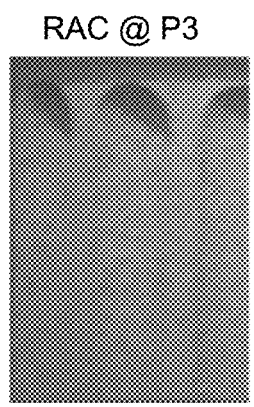

FIGS. 40A through 40C are residual aberration histograms of the combined imaging optical system 61 for the third example two-element RAC 200 for positions P1, P2 and P3. The on-axis (central region) residual aberrations of the combined imaging optical system 61 are similar to that using the second example two-element RAC 200. The off-axis (corner region) residual Coma and Astigmatism aberrations of combined imaging optical system 61 are different than that using the first example two-element RAC 200. In particular the residual Coma aberration increases in a negative direction and the residual Tangential Astigmatism and Sagittal Astigmatism increase in a positive direction going from axial positions P1 to P2 to P3.

The corresponding central and corner image simulations are shown in FIGS. 41A through 41D (central) and 42A through 42D (corner) for the third two-element example of the RAC 200.

Table 5B below sets forth the wavefront aberration data for the combined optic system 61 for the positions P1, P2 and P3.

Example Single-Element RAC

FIGS. 43A through 43C are close-up schematic diagrams of an example single-element RAC 200 operably disposed in the image-forming optical path. This example RAC 200 has a single movable meniscus lens element L11.

Table 6A below sets forth the optical prescription for the combined imaging optical system 61 with the example single-element RAC 200 for positions P1 through P3.

Figure 44A:
FIGS. 44A through 44C are residual aberration histograms for the combined imaging optical system that includes the example single-element RAC for the positions P1, P2 and P3, respectively.
Figure 44B:
Figure 44C:
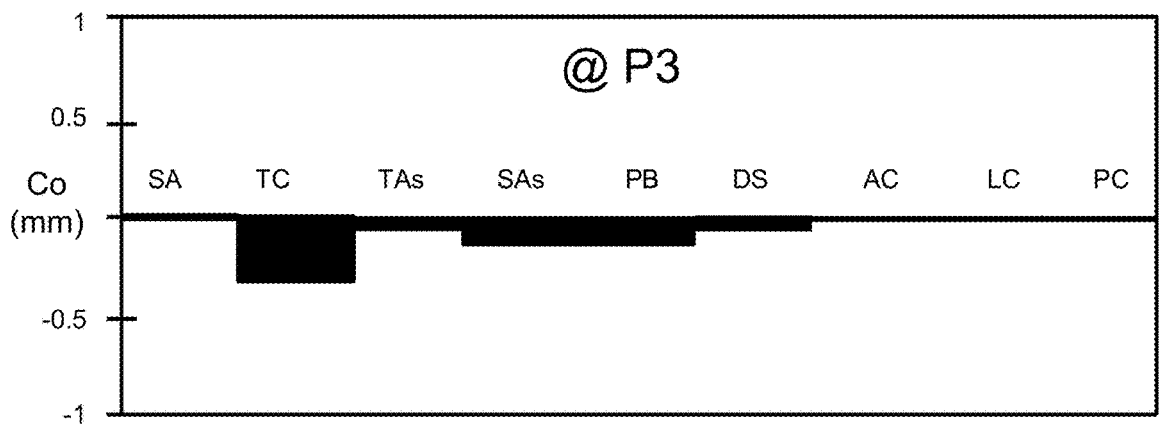
Figures 45A, 45B, 45C, 45D:
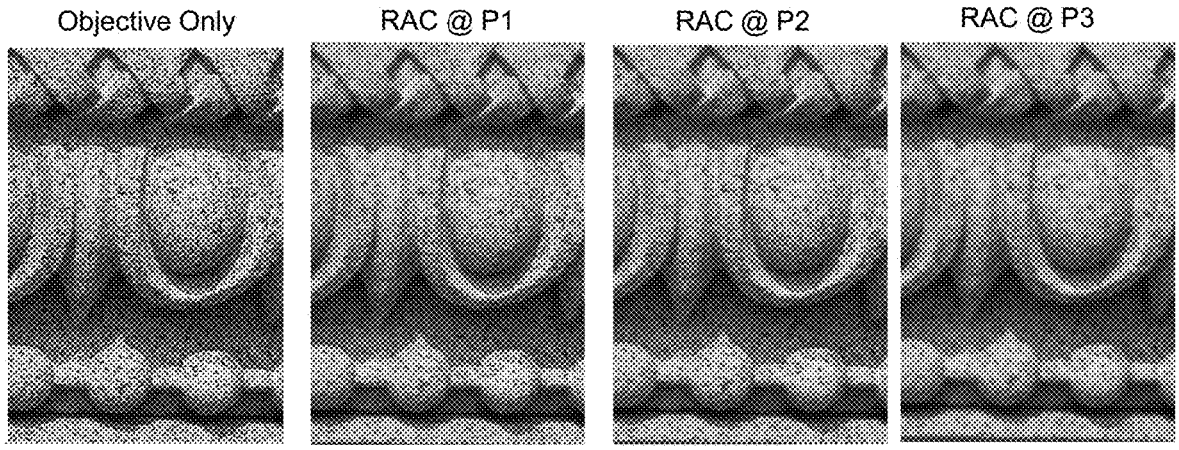
FIGS. 45A through 45D show the central portion image using just the objective lens imaging optical system (FIG. 45A, which is the same as FIG. 17B) and for the combined imaging optical system that uses the example single-element RAC at positions P1, P2 and P3 (FIGS. 45B, 45C and 45D, respectively).
Figures 46A, 46B, 46C, 46D:
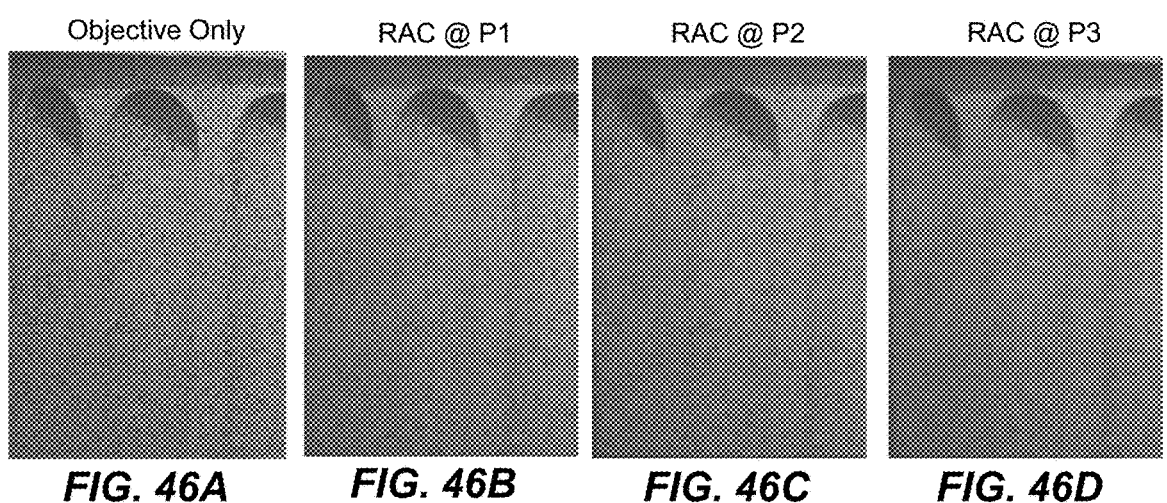
FIGS. 46A through 46D show the corner portion image using just the objective lens imaging optical system (FIG. 46A, which is the same as FIG. 18B) and for the combined imaging optical system that uses the example single-element RAC at positions P1, P2 and P3 (FIGS. 46B, 46C and 46D, respectively).

FIGS. 44A through 44C are residual aberration histograms of the combined imaging optical system 61 with the example single-element RAC 200 for positions P1, P2 and P3. The P1 null position has similar residual aberration than the two- and three-element RAC examples, with the positions P2 and P3 showing decreasing coma.

The corresponding central and corner image simulations are shown in FIGS. 45A through 45D (central) and 46A through 46D (corner) for the third single element example of the RAC 200.

Table 6B below set forth the wavefront aberration data for the combined system 60 for the positions P1, P2 and P3 and for the objective lens imaging optical system without the RAC for infinite, intermediate and close focus settings.

Although the present invention has been fully described in connection with embodiments thereof with reference to the accompanying drawings and tables, it is to be noted that various changes and modifications can be made including smaller and larger focal lengths, smaller and larger image sizes, smaller and larger wavebands (e.g., 435.8 nm to 656.3 nm), smaller and larger apertures, increased and decreased residual aberrations, etc. as will be apparent to those skilled in the art. Such changes and modifications are to be understood as being included within the scope of the present invention as defined by the appended claims.

TABLES

Table Abbreviations and Information

GRP=lens group=G1 or G2
Sf=lens surface
S=spacing (mm)
R=radius of curvature (mm)
n=refractive index at 546.1 microns
V=Dispersion V-value for wavelengths 486.1 nm, 546.1 nm and 587.6 nm
CA=clear aperture
Non-air=Glass, plastic or crystalline material
RMS=root-means square
Wavefront aberrations values are in RMS waves at 531.6 microns Tables 1A and 1B—Imaging Optical System (Objective) Only

TABLE 1A

Optical Prescription

| Item | GRP | Sf | FP | S (mm) | R (mm) | Material Type | n | V | $\frac{CA}{2}$ (mm) |
|---|---|---|---|---|---|---|---|---|---|
| Object | | S0 | F1 | ~∞ | Flat | Air | | | |
| | | | F2 | 1560 | | | | | |
| | | | F3 | 810 | | | | | |
| 1 | G1 | S1 | All | 11.407 | 115.449 | Non-air | 1.821 | 32.8 | 33.34 |
| 2 | G1 | S2 | All | 5.000 | −275.963 | Non-air | 1.561 | 44.2 | 32.73 |
| | | S3 | All | 4.838 | 48.720 | Air | | | 29.72 |
| 3 | G1 | S4 | All | 17.791 | 72.44 | Non-air | 1.735 | 53.0 | 29.90 |
| 4 | G1 | S5 | All | 4.700 | −66.165 | Non-air | 1.825 | 35.1 | 29.44 |
| | | S6 | All | 0.700 | 174.173 | Air | | | 28.45 |
| 5 | G1 | S7 | All | 15.296 | 54.464 | Non-air | 1.835 | 42.7 | 28.50 |
| 6 | G1 | S8 | All | 11.363 | −127.571 | Non-air | 1.606 | 37.4 | 27.37 |
| | | S9 | F1 | 9.611 | 32.766 | Air | | | 20.07 |
| | | | F2 | 12.644 | | | | | |
| | | | F3 | 15.411 | | | | | |
| Stop | G1 | S10 | All | 6.277 | Flat | Air | | | 19.33 |
| 7 | G1 | S11 | All | 12.500 | −56.320 | Non-air | 1.746 | 27.5 | 19.04 |
| 8 | G1 | S12 | All | 12.500 | 185.131 | Non-air | 1.835 | 42.7 | 20.69 |
| | | S13 | All | 1.956 | −66.939 | Air | | | 21.38 |
| 9 | G1 | S14 | All | 14.546 | 121.145 | Non-air | 1.835 | 42.7 | 20.55 |
| 10 | G1 | S15 | All | 12.500 | −30.000 | Non-air | 1.824 | 39.3 | 19.82 |
| | | S16 | F1 | 44.015 | −371.317 | Air | | | 17.10 |
| | | | F2 | 50.009 | | | | | |
| | | | F3 | 55.927 | | | | | |
| Image | | S17 | All | 0.000 | Flat | | | | |

TABLE 1B

| Wavefront Aberrations (Objective Only) | | | |
|---|---|---|---|
| Field | 0.00 | 0.70 | 1.00 |
| Best individual focus | 0.32 | 0.41 | 0.42 |
| Best Composite focus | 0.45 | 0.59 | 0.43 |

Tables 1C and 1D for Combined Imaging Optical System with $1^{st}$ Example 3—Element RAC

TABLE 1C

| | | | | | | | Material | | | |
|---|---|---|---|---|---|---|---|---|---|---|
| Item | GRP | Sf | IP | FP | S (mm) | R (mm) | Type | n | V | $\frac{CA}{2}$ (mm) |
| Object | | S0 | P1 | F1 | ~∞ | | | | | |
| | | | P2 | F1 | ~∞ | | | | | |
| | | | P3 | F1 | ~∞ | | | | | |
| | | | P1 | F2 | 1560 | | | | | |
| | | | P2 | F2 | 1560 | | | | | |
| | | | P3 | F2 | 1560 | | | | | |
| | | | P1 | F3 | 810 | | | | | |
| | | | P2 | F3 | 810 | | | | | |
| | | | P3 | F3 | 810 | | | | | |
| 1 | G1 | S1 | All | All | 11.407 | 115.449 | Non-air | 1.821 | 32.8 | 33.34 |
| 2 | G1 | S2 | All | All | 5.000 | −275.963 | Non-air | 1.561 | 44.2 | 32.73 |
| | | S3 | All | All | 4.838 | 48.720 | Air | | | 29.72 |
| 3 | G1 | S4 | All | All | 17.791 | 72.44 | Non-air | 1.735 | 53.0 | 29.90 |
| 4 | G1 | S5 | All | All | 4.700 | −66.165 | Non-air | 1.825 | 35.1 | 29.44 |
| | | S6 | All | All | 0.700 | 174.173 | Air | | | 28.45 |
| 5 | G1 | S7 | All | All | 15.296 | 54.464 | Non-air | 1.835 | 42.7 | 28.50 |
| 6 | G1 | S8 | All | All | 11.363 | −127.571 | Non-air | 1.606 | 37.4 | 27.37 |
| | | S9 | P1 | F1 | 9.611 | 32.766 | Air | | | 20.07 |
| | | | P2 | F1 | 9.611 | | | | | |
| | | | P3 | F1 | 9.611 | | | | | |
| | | | P1 | F2 | 12.644 | | | | | |
| | | | P2 | F2 | 12.644 | | | | | |
| | | | P3 | F2 | 12.644 | | | | | |
| | | | P1 | F3 | 15.411 | | | | | |
| | | | P2 | F3 | 15.411 | | | | | |
| | | | P3 | F3 | 15.411 | | | | | |
| Stop | G1 | S10 | All | All | 6.277 | Flat | Air | | | 19.33 |
| 7 | G1 | S11 | All | All | 12.500 | −56.320 | Non-air | 1.746 | 27.5 | 19.04 |
| 8 | G1 | S12 | All | All | 12.500 | 185.131 | Non-air | 1.835 | 42.7 | 20.69 |
| | | S13 | All | All | 1.956 | −66.939 | Air | | | 21.38 |
| 9 | G1 | S14 | All | All | 14.546 | 121.145 | Non-air | 1.835 | 42.7 | 20.55 |
| 10 | G1 | S15 | All | All | 12.500 | −30.000 | Non-air | 1.824 | 39.3 | 19.82 |
| | | S16 | All | All | 1.000 | −371.317 | Air | | | 17.10 |
| Dummy | G2 | S17 | P1 | F1 | 0.000 | | Air | | | |
| | | | P2 | F1 | 0.000 | | | | | |
| | | | P3 | F1 | 0.000 | | | | | |
| | | | P1 | F2 | 5.994 | | | | | |
| | | | P2 | F2 | 5.994 | | | | | |
| | | | P3 | F2 | 5.994 | | | | | |
| | | | P1 | F3 | 11.912 | | | | | |
| | | | P2 | F3 | 11.912 | | | | | |
| | | | P3 | F3 | 11.912 | | | | | |
| 11 | G2 | S18 | All | All | 3.194 | 372.423 | Non-air | 1.822 | 33.3 | 17.28 |
| | | S19 | P1 | F1 | 4.003 | −489.146 | Air | | | 17.37 |
| | | | P2 | F1 | 2.596 | | | | | |
| | | | P3 | F1 | 1.216 | | | | | |
| | | | P1 | F2 | 4.003 | | | | | |
| | | | P2 | F2 | 2.596 | | | | | |
| | | | P3 | F2 | 1.216 | | | | | |
| | | | P1 | F3 | 4.003 | | | | | |
| | | | P2 | F3 | 2.596 | | | | | |
| | | | P3 | F3 | 1.216 | | | | | |
| 12 | G2 | S20 | All | Al | 2.400 | −2636.073 | Non-air | 1.835 | 42.7 | 17.46 |
| | | S21 | P1 | F1 | 5.319 | 92.365 | Air | | | 17.54 |
| | | | P2 | F1 | 3.154 | | | | | |
| | | | P3 | F1 | 1.205 | | | | | |
| | | | P1 | F2 | 5.319 | | | | | |
| | | | P2 | F2 | 3.154 | | | | | |

TABLE 1C-continued

Optical Prescription for Combined Imaging Optical System

| Item | GRP | Sf | IP | FP | S (mm) | R (mm) | Material Type | n | V | $\frac{CA}{2}$ (mm) |
|---|---|---|---|---|---|---|---|---|---|---|
| | | | P3 | F2 | 1.205 | | | | | |
| | | | P1 | F3 | 5.319 | | | | | |
| | | | P2 | F3 | 3.154 | | | | | |
| | | | P3 | F3 | 1.205 | | | | | |
| 13 | G2 | S22 | All | All | 4.500 | 48.505 | Non-air | 1.563 | 62.1 | 19.03 |
| | | S23 | P1 | F1 | 27.414 | 75.477 | Air | | | 18.94 |
| | | | P2 | F1 | 30.986 | | | | | |
| | | | P3 | F1 | 34.316 | | | | | |
| | | | P1 | F2 | 27.414 | | | | | |
| | | | P2 | F2 | 30.986 | | | | | |
| | | | P3 | F2 | 34.316 | | | | | |
| | | | P1 | F3 | 27.414 | | | | | |
| | | | P2 | F3 | 30.986 | | | | | |
| | | | P3 | F3 | 34.316 | | | | | |
| Image | | S24 | All | All | 0.000 | Flat | | | | |

TABLE 1D

Wavefront Aberrations (∞ focus)

| Combination Image | Position P1 | | | Position P2 | | | Position P3 | | |
|---|---|---|---|---|---|---|---|---|---|
| Field | 0.00 | 0.70 | 1.00 | 0.00 | 0.70 | 1.00 | 0.00 | 0.70 | 1.00 |
| Best individual focus | 0.37 | 0.60 | 0.61 | 0.86 | 1.78 | 1.40 | 1.52 | 3.12 | 2.55 |
| Relative to prime lens | +0.05 | +0.19 | +0.19 | +0.53 | +1.23 | +1.09 | +1.16 | +2.69 | +2.30 |

Tables 2A Through 2D for Combined Imaging Optical System with $2^{nd}$ Example 3—Element RAC for Two Different Sets of Positions P1-P3

TABLE 2A

Optical Prescription for Combined Imaging Optical System [$1^{st}$ set of positions P1-P3]

| Item | GRP | Sf | IP | FP | S (mm) | R (mm) | Material Type | n | V | $\frac{CA}{2}$ (mm) |
|---|---|---|---|---|---|---|---|---|---|---|
| Object | | S0 | P1 | F1 | ~∞ | | | | | |
| | | | P2 | F1 | ~∞ | | | | | |
| | | | P3 | F1 | ~∞ | | | | | |
| | | | P1 | F2 | 1560 | | | | | |
| | | | P2 | F2 | 1560 | | | | | |
| | | | P3 | F2 | 1560 | | | | | |
| | | | P1 | F3 | 810 | | | | | |
| | | | P2 | F3 | 810 | | | | | |
| | | | P3 | F3 | 810 | | | | | |
| 1 | G1 | S1 | All | All | 11.407 | 115.449 | Non-air | 1.821 | 32.8 | 33.34 |
| 2 | G1 | S2 | All | All | 5.000 | −275.963 | Non-air | 1.561 | 44.2 | 32.73 |
| | | S3 | All | All | 4.838 | 48.720 | Air | | | 29.72 |
| 3 | G1 | S4 | All | All | 17.791 | 72.44 | Non-air | 1.735 | 53.0 | 29.90 |
| 4 | G1 | S5 | All | All | 4.700 | −66.165 | Non-air | 1.825 | 35.1 | 29.44 |
| | | S6 | All | All | 0.700 | 174.173 | Air | | | 28.45 |
| 5 | G1 | S7 | All | All | 15.296 | 54.464 | Non-air | 1.835 | 42.7 | 28.50 |
| 6 | G1 | S8 | All | All | 11.363 | −127.571 | Non-air | 1.606 | 37.4 | 27.37 |
| | | S9 | P1 | F1 | 9.611 | 32.766 | Air | | | 20.07 |
| | | | P2 | F1 | 9.611 | | | | | |
| | | | P3 | F1 | 9.611 | | | | | |
| | | | P1 | F2 | 12.644 | | | | | |
| | | | P2 | F2 | 12.644 | | | | | |
| | | | P3 | F2 | 12.644 | | | | | |
| | | | P1 | F3 | 15.411 | | | | | |
| | | | P2 | F3 | 15.411 | | | | | |
| | | | P3 | F3 | 15.411 | | | | | |

TABLE 2A-continued

Optical Prescription for Combined Imaging Optical System [1st set of positions P1-P3]

| | | | | | | | Material | | | |
|---|---|---|---|---|---|---|---|---|---|---|
| Item | GRP | Sf | IP | FP | S (mm) | R (mm) | Type | n | V | $\frac{CA}{2}$ (mm) |
| Stop | G1 | S10 | All | All | 6.277 | Flat | Air | | | 19.33 |
| 7 | G1 | S11 | All | All | 12.500 | −56.320 | Non-air | 1.746 | 27.5 | 19.04 |
| 8 | G1 | S12 | All | All | 12.500 | 185.131 | Non-air | 1.835 | 42.7 | 20.69 |
| | | S13 | All | All | 1.956 | −66.939 | Air | | | 21.38 |
| 9 | G1 | S14 | All | All | 14.546 | 121.145 | Non-air | 1.835 | 42.7 | 20.55 |
| 10 | G1 | S15 | All | All | 12.500 | −30.000 | Non-air | 1.824 | 39.3 | 19.82 |
| | | S16 | P1 | F1 | 0.000 | −371.317 | Air | | | 17.10 |
| | | | P2 | F1 | 0.000 | | | | | |
| | | | P3 | F1 | 0.000 | | | | | |
| | | | P1 | F2 | 5.994 | | | | | |
| | | | P2 | F2 | 5.994 | | | | | |
| | | | P3 | F2 | 5.994 | | | | | |
| | | | P1 | F3 | 11.912 | | | | | |
| | | | P2 | F3 | 11.912 | | | | | |
| | | | P3 | F3 | 11.912 | | | | | |
| Dummy Surface | G2 | S17 | P1 | F1 | 8.674 | Flat | Air | | | 18.14 |
| | | | P2 | F1 | 7.171 | | | | | |
| | | | P3 | F1 | 4.208 | | | | | |
| | | | P1 | F2 | 8.674 | | | | | |
| | | | P2 | F2 | 7.171 | | | | | |
| | | | P3 | F2 | 4.208 | | | | | |
| | | | P1 | F3 | 8.674 | | | | | |
| | | | P2 | F3 | 7.171 | | | | | |
| | | | P3 | F3 | 4.208 | | | | | |
| 11 | G2 | S18 | All | All | 4.175 | 161.922 | Non-air | 1.805 | 25.4 | 18.39 |
| | | S19 | P1 | F1 | 2.780 | −270.705 | Air | | | 18.41 |
| | | | P2 | F1 | 4.190 | | | | | |
| | | | P3 | F1 | 5.282 | | | | | |
| | | | P1 | F2 | 2.780 | | | | | |
| | | | P2 | F2 | 4.190 | | | | | |
| | | | P3 | F2 | 5.282 | | | | | |
| | | | P1 | F3 | 2.780 | | | | | |
| | | | P2 | F3 | 4.190 | | | | | |
| | | | P3 | F3 | 5.282 | | | | | |
| 12 | G2 | S20 | All | All | 2.400 | −217.831 | Non-air | 1.828 | 31.7 | 18.31 |
| | | S21 | P1 | F1 | 0.984 | 50.155 | Air | | | 18.43 |
| | | | P2 | F1 | 3.122 | | | | | |
| | | | P3 | F1 | 4.994 | | | | | |
| | | | P1 | F2 | 0.984 | | | | | |
| | | | P2 | F2 | 3.122 | | | | | |
| | | | P3 | F2 | 4.994 | | | | | |
| | | | P1 | F3 | 0.984 | | | | | |
| | | | P2 | F3 | 3.122 | | | | | |
| | | | P3 | F3 | 4.994 | | | | | |
| 13 | G2 | S22 | All | All | 13.845 | 36.964 | Non-air | 1.487 | 70.2 | 20.97 |
| | | S23 | P1 | F1 | 17.046 | 135.990 | Air | | | 20.86 |
| | | | P2 | F1 | 15.000 | | | | | |
| | | | P3 | F1 | 15.000 | | | | | |
| | | | P1 | F2 | 17.046 | | | | | |
| | | | P2 | F2 | 15.000 | | | | | |
| | | | P3 | F2 | 15.000 | | | | | |
| | | | P1 | F3 | 17.046 | | | | | |
| | | | P2 | F3 | 15.000 | | | | | |
| | | | P3 | F3 | 15.000 | | | | | |
| Image | | S24 | All | All | 0.000 | Flat | | | | |

TABLE 2B

Optical Prescription for Combined Imaging Optical System [2nd set of positions P1-P3]

| | | | | | | | Material | | | |
|---|---|---|---|---|---|---|---|---|---|---|
| Item | GRP | Sf | IP | FP | S (mm) | R (mm) | Type | n | V | $\frac{CA}{2}$ (mm) |
| Object | | S0 | P1 | F1 | ~∞ | | | | | |
| | | | P2 | F1 | ~∞ | | | | | |
| | | | P3 | F1 | ~∞ | | | | | |
| | | | P1 | F2 | 1560 | | | | | |
| | | | P2 | F2 | 1560 | | | | | |

TABLE 2B-continued

Optical Prescription for Combined Imaging Optical System [2$^{nd}$ set of positions P1-P3]

| Item | GRP | Sf | IP | FP | S (mm) | R (mm) | Material Type | n | V | $\frac{CA}{2}$ (mm) |
|---|---|---|---|---|---|---|---|---|---|---|
| | | | P3 | F2 | 1560 | | | | | |
| | | | P1 | F3 | 810 | | | | | |
| | | | P2 | F3 | 810 | | | | | |
| | | | P3 | F3 | 810 | | | | | |
| 1 | G1 | S1 | All | All | 11.407 | 115.449 | Non-air | 1.821 | 32.8 | 33.34 |
| 2 | G1 | S2 | All | All | 5.000 | −275.963 | Non-air | 1.561 | 44.2 | 32.73 |
| | | S3 | All | All | 4.838 | 48.720 | Air | | | 29.72 |
| 3 | G1 | S4 | All | All | 17.791 | 72.44 | Non-air | 1.735 | 53.0 | 29.90 |
| 4 | G1 | S5 | All | All | 4.700 | −66.165 | Non-air | 1.825 | 35.1 | 29.44 |
| | | S6 | All | All | 0.700 | 174.173 | Air | | | 28.45 |
| 5 | G1 | S7 | All | All | 15.296 | 54.464 | Non-air | 1.835 | 42.7 | 28.50 |
| 6 | G1 | S8 | All | All | 11.363 | 127.571 | Non-air | 1.606 | 37.4 | 27.37 |
| | | S9 | P1 | F1 | 9.611 | 32.766 | Air | | | 20.07 |
| | | | P2 | F1 | 9.611 | | | | | |
| | | | P3 | F1 | 9.611 | | | | | |
| | | | P1 | F2 | 12.644 | | | | | |
| | | | P2 | F2 | 12.644 | | | | | |
| | | | P3 | F2 | 12.644 | | | | | |
| | | | P1 | F3 | 15.411 | | | | | |
| | | | P2 | F3 | 15.411 | | | | | |
| | | | P3 | F3 | 15.411 | | | | | |
| Stop | G1 | S10 | All | All | 6.277 | Flat | Air | | | 19.33 |
| 7 | G1 | S11 | All | All | 12.500 | −56.320 | Non-air | 1.746 | 27.5 | 19.04 |
| 8 | G1 | S12 | All | All | 12.500 | 185.131 | Non-air | 1.835 | 42.7 | 20.69 |
| | | S13 | All | All | 1.956 | −66.939 | Air | | | 21.38 |
| 9 | G1 | S14 | All | All | 14.546 | 121.145 | Non-air | 1.835 | 42.7 | 20.55 |
| 10 | G1 | S15 | All | All | 12.500 | −30.000 | Non-air | 1.824 | 39.3 | 19.82 |
| | | S16 | P1 | F1 | 0.000 | −371.317 | Air | | | 17.10 |
| | | | P2 | F1 | 0.000 | | | | | |
| | | | P3 | F1 | 0.000 | | | | | |
| | | | P1 | F2 | 5.994 | | | | | |
| | | | P2 | F2 | 5.994 | | | | | |
| | | | P3 | F2 | 5.994 | | | | | |
| | | | P1 | F3 | 11.912 | | | | | |
| | | | P2 | F3 | 11.912 | | | | | |
| | | | P3 | F3 | 11.912 | | | | | |
| Dummy | G2 | S17 | P1 | F1 | 8.221 | Flat | Air | | | 18.14 |
| | | | P2 | F1 | 4.138 | | | | | |
| | | | P3 | F1 | 0.700 | | | | | |
| | | | P1 | F2 | 8.221 | | | | | |
| | | | P2 | F2 | 4.138 | | | | | |
| | | | P3 | F2 | 0.700 | | | | | |
| | | | P1 | F3 | 8.221 | | | | | |
| | | | P2 | F3 | 4.138 | | | | | |
| | | | P3 | F3 | 0.700 | | | | | |
| 11 | G2 | S18 | All | All | 4.175 | 161.922 | Non-air | 1.805 | 25.4 | 18.39 |
| | | S19 | P1 | F1 | 2.893 | −270.705 | Air | | | 18.41 |
| | | | P2 | F1 | 2.759 | | | | | |
| | | | P3 | F1 | 2.759 | | | | | |
| | | | P1 | F2 | 2.893 | | | | | |
| | | | P2 | F2 | 2.759 | | | | | |
| | | | P3 | F2 | 2.759 | | | | | |
| | | | P1 | F3 | 2.893 | | | | | |
| | | | P2 | F3 | 2.759 | | | | | |
| | | | P3 | F3 | 2.759 | | | | | |
| 12 | G2 | S20 | All | All | 2.400 | −217.831 | Non-air | 1.828 | 31.7 | 18.31 |
| | | S21 | P1 | F1 | 1.138 | 50.155 | Air | | | 18.43 |
| | | | P2 | F1 | 0.857 | | | | | |
| | | | P3 | F1 | 0.700 | | | | | |
| | | | P1 | F2 | 1.138 | | | | | |
| | | | P2 | F2 | 0.857 | | | | | |
| | | | P3 | F2 | 0.700 | | | | | |
| | | | P1 | F3 | 1.138 | | | | | |
| | | | P2 | F3 | 0.857 | | | | | |
| | | | P3 | F3 | 0.700 | | | | | |
| 13 | G2 | S22 | All | All | 13.845 | 36.964 | Non-air | 1.487 | 70.2 | 20.97 |
| | | S23 | P1 | F1 | 17.231 | 135.990 | Air | | | 20.86 |
| | | | P2 | F1 | 21.729 | | | | | |
| | | | P3 | F1 | 25.323 | | | | | |
| | | | P1 | F2 | 17.231 | | | | | |
| | | | P2 | F2 | 21.729 | | | | | |
| | | | P3 | F2 | 25.323 | | | | | |
| | | | P1 | F3 | 17.231 | | | | | |

TABLE 2B-continued

Optical Prescription for Combined Imaging Optical System [2$^{nd}$ set of positions P1-P3]

| Item | GRP | Sf | IP | FP | S (mm) | R (mm) | Type | n | V | $\frac{CA}{2}$ (mm) |
|---|---|---|---|---|---|---|---|---|---|---|
| | | | P2 | F3 | 21.729 | | | | | |
| | | | P3 | F3 | 25.323 | | | | | |
| | Image | S24 | All | All | 0.000 | | | | | |

TABLE 2C

Wavefront Aberrations (∞ focus) [1$^{st}$ Set Of Positions P1-P3]

| Combination Image | Position P1 | | | Position P2 | | | Position P3 | | |
|---|---|---|---|---|---|---|---|---|---|
| Field | 0.00 | 0.70 | 1.00 | 0.00 | 0.70 | 1.00 | 0.00 | 0.70 | 1.00 |
| Best individual focus | 0.42 | 0.74 | 0.85 | 1.02 | 2.76 | 3.53 | 2.15 | 4.19 | 5.04 |
| Relative to prime lens | +0.10 | +0.33 | +0.43 | +0.69 | +2.21 | +3.22 | +1.79 | +3.76 | +4.79 |

TABLE 2D

Wavefront Aberrations (∞ focus) [2$^{nd}$ Set Of Positions P1-P3]

| Combination Image | Position P1 | | | Position P2 | | | Position P3 | | |
|---|---|---|---|---|---|---|---|---|---|
| Field | 0.00 | 0.70 | 1.00 | 0.00 | 0.70 | 1.00 | 0.00 | 0.70 | 1.00 |
| Best individual focus | 0.39 | 0.72 | 0.85 | 0.42 | 2.60 | 2.92 | 0.42 | 4.28 | 4.81 |
| Relative to prime lens | +0.07 | +0.31 | +0.43 | +0.11 | +2.05 | +2.61 | +0.06 | +3.85 | +4.56 |

Tables 3A and 3B for Combined Imaging Optical System for 1$^{st}$ Example 2-Element RAC

TABLE 3A

Optical Prescription for Combined Imaging Optical System

| Item | GRP | Sf | IP | FP | S (mm) | R (mm) | Type | n | V | $\frac{CA}{2}$ (mm) |
|---|---|---|---|---|---|---|---|---|---|---|
| Object | | S0 | P1 | F1 | ~∞ | | | | | |
| | | | P2 | F1 | ~∞ | | | | | |
| | | | P3 | F1 | ~∞ | | | | | |
| | | | P1 | F2 | 1560 | | | | | |
| | | | P2 | F2 | 1560 | | | | | |
| | | | P3 | F2 | 1560 | | | | | |
| | | | P1 | F3 | 810 | | | | | |
| | | | P2 | F3 | 810 | | | | | |
| | | | P3 | F3 | 810 | | | | | |
| 1 | G1 | S1 | All | All | 11.407 | 115.449 | Non-air | 1.821 | 32.8 | 33.34 |
| 2 | G1 | S2 | All | All | 5.000 | −275.963 | Non-air | 1.561 | 44.2 | 32.73 |
| | | S3 | All | All | 4.838 | 48.720 | Air | | | 29.72 |
| 3 | G1 | S4 | All | All | 17.791 | 72.44 | Non-air | 1.735 | 53.0 | 29.90 |
| 4 | G1 | S5 | All | All | 4.700 | −66.165 | Non-air | 1.825 | 35.1 | 29.44 |
| | | S6 | All | All | 0.700 | 174.173 | Air | | | 28.45 |
| 5 | G1 | S7 | All | All | 15.296 | 54.464 | Non-air | 1.835 | 42.7 | 28.50 |
| 6 | G1 | S8 | All | All | 11.363 | −127.571 | Non-air | 1.606 | 37.4 | 27.37 |
| | | S9 | P1 | F1 | 9.611 | 32.766 | Air | | | 20.07 |
| | | | P2 | F1 | 9.611 | | | | | |
| | | | P3 | F1 | 9.611 | | | | | |
| | | | P1 | F2 | 12.644 | | | | | |
| | | | P2 | F2 | 12.644 | | | | | |
| | | | P3 | F2 | 12.644 | | | | | |

TABLE 3A-continued

Optical Prescription for Combined Imaging Optical System

| Item | GRP | Sf | IP | FP | S (mm) | R (mm) | Type | n | V | $\frac{CA}{2}$ (mm) |
|---|---|---|---|---|---|---|---|---|---|---|
| | | | P1 | F3 | 15.411 | | | | | |
| | | | P2 | F3 | 15.411 | | | | | |
| | | | P3 | F3 | 15.411 | | | | | |
| Stop | G1 | S10 | All | All | 6.277 | Flat | Air | | | 19.33 |
| 7 | G1 | S11 | All | All | 12.500 | 56.320 | Non-air | 1.746 | 27.5 | 19.04 |
| 8 | G1 | S12 | All | All | 12.500 | 185.131 | Non-air | 1.835 | 42.7 | 20.69 |
| | | S13 | All | All | 1.956 | −66.939 | Air | | | 21.38 |
| 9 | G1 | S14 | All | All | 14.546 | 121.145 | Non-air | 1.835 | 42.7 | 20.55 |
| 10 | G1 | S15 | All | All | 12.500 | −30.000 | Non-air | 1.824 | 39.3 | 19.82 |
| | | S16 | P1 | F1 | 0.000 | −371.317 | Air | | | 17.10 |
| | | | P2 | F1 | 0.000 | | | | | |
| | | | P3 | F1 | 0.000 | | | | | |
| | | | P1 | F2 | 5.994 | | | | | |
| | | | P2 | F2 | 5.994 | | | | | |
| | | | P3 | F2 | 5.994 | | | | | |
| | | | P1 | F3 | 11.912 | | | | | |
| | | | P2 | F3 | 11.912 | | | | | |
| | | | P3 | F3 | 11.912 | | | | | |
| Dummy | G2 | S17 | P1 | F1 | 11.868 | Flat | Air | | | 17.58 |
| | | | P2 | F1 | 7.198 | | | | | |
| | | | P3 | F1 | 1.000 | | | | | |
| | | | P1 | F2 | 11.868 | | | | | |
| | | | P2 | F2 | 7.198 | | | | | |
| | | | P3 | F2 | 1.000 | | | | | |
| | | | P1 | F3 | 11.868 | | | | | |
| | | | P2 | F3 | 7.198 | | | | | |
| | | | P3 | F3 | 1.000 | | | | | |
| 11 | G2 | S18 | All | All | 2.450 | 254.539 | Non-air | 1.805 | 25.4 | 18.45 |
| | | S19 | P1 | F1 | 2.838 | 135.179 | Air | | | 18.52 |
| | | | P2 | F1 | 8.592 | | | | | |
| | | | P3 | F1 | 16.498 | | | | | |
| | | | P1 | F2 | 2.838 | | | | | |
| | | | P2 | F2 | 8.592 | | | | | |
| | | | P3 | F2 | 16.498 | | | | | |
| | | | P1 | F3 | 2.838 | | | | | |
| | | | P2 | F3 | 8.592 | | | | | |
| | | | P3 | F3 | 16.498 | | | | | |
| 12 | G2 | S20 | All | All | 4.500 | 171.725 | Non-air | 1.759 | 51.7 | 19.05 |
| | | S21 | All | All | 25.327 | 560.402 | Air | | | 19.15 |
| Image | | S22 | All | All | 0.000 | Flat | | | | |

TABLE 3B

Wavefront Aberrations (∞ focus)

| Combination Image | Position P1 | | | Position P2 | | | Position P3 | | |
|---|---|---|---|---|---|---|---|---|---|
| Field | 0.00 | 0.70 | 1.00 | 0.00 | 0.70 | 1.00 | 0.00 | 0.70 | 1.00 |
| Best individual focus | 0.45 | 1.43 | 0.99 | 0.92 | 1.89 | 1.35 | 1.66 | 2.69 | 2.07 |
| Relative to prime lens | +0.13 | +1.02 | +0.56 | +0.59 | +1.34 | +1.03 | +1.30 | +2.26 | +1.82 |

Tables 4A and 4B for Combined Imaging Optical System for 2$^{nd}$ Example 2—Element RAC

TABLE 4A

Optical Prescription for Combined Imaging Optical System

| Item | GRP | Sf | IP | FP | S (mm) | R (mm) | Type | n | V | $\frac{CA}{2}$ (mm) |
|---|---|---|---|---|---|---|---|---|---|---|
| Object | | S0 | P1 | F1 | 1000010 | | | | | |
| | | | P2 | F1 | 1000010 | | | | | |

TABLE 4A-continued

Optical Prescription for Combined Imaging Optical System

| Item | GRP | Sf | IP | FP | S (mm) | R (mm) | Material Type | n | V | $\frac{CA}{2}$ (mm) |
|---|---|---|---|---|---|---|---|---|---|---|
| | | | P3 | F1 | 1000010 | | | | | |
| | | | P1 | F2 | 1560 | | | | | |
| | | | P2 | F2 | 1560 | | | | | |
| | | | P3 | F2 | 1560 | | | | | |
| | | | P1 | F3 | 810 | | | | | |
| | | | P2 | F3 | 810 | | | | | |
| | | | P3 | F3 | 810 | | | | | |
| 1 | G1 | S1 | All | All | 11.407 | 115.449 | Non-air | 1.821 | 32.8 | 33.34 |
| 2 | G1 | S2 | All | All | 5.000 | −275.963 | Non-air | 1.561 | 44.2 | 32.73 |
| | | S3 | All | All | 4.838 | 48.720 | Air | | | 29.72 |
| 3 | G1 | S4 | All | All | 17.791 | 72.44 | Non-air | 1.735 | 53.0 | 29.90 |
| 4 | G1 | S5 | All | All | 4.700 | −66.165 | Non-air | 1.825 | 35.1 | 29.44 |
| | | S6 | All | All | 0.700 | 174.173 | Air | | | 28.45 |
| 5 | G1 | S7 | All | All | 15.296 | 54.464 | Non-air | 1.835 | 42.7 | 28.50 |
| 6 | G1 | S8 | All | All | 11.363 | −127.571 | Non-air | 1.606 | 37.4 | 27.37 |
| | | S9 | P1 | F1 | 9.611 | 32.766 | Air | | | 20.07 |
| | | | P2 | F1 | 9.611 | | | | | |
| | | | P3 | F1 | 9.611 | | | | | |
| | | | P1 | F2 | 12.644 | | | | | |
| | | | P2 | F2 | 12.644 | | | | | |
| | | | P3 | F2 | 12.644 | | | | | |
| | | | P1 | F3 | 15.411 | | | | | |
| | | | P2 | F3 | 15.411 | | | | | |
| | | | P3 | F3 | 15.411 | | | | | |
| Stop | G1 | S10 | All | All | 6.277 | Flat | Air | | | 19.33 |
| 7 | G1 | S11 | All | All | 12.500 | −56.320 | Non-air | 1.746 | 27.5 | 19.04 |
| 8 | G1 | S12 | All | All | 12.500 | 185.131 | Non-air | 1.835 | 42.7 | 20.69 |
| | | S13 | All | All | 1.956 | 66.939 | Air | | | 21.38 |
| 9 | G1 | S14 | All | All | 14.546 | 121.145 | Non-air | 1.835 | 42.7 | 20.55 |
| 10 | G1 | S15 | All | All | 12.500 | −30.000 | Non-air | 1.824 | 39.3 | 19.82 |
| | | S16 | P1 | F1 | 0.000 | −371.317 | Air | | | 17.10 |
| | | | P2 | F1 | 0.000 | | | | | |
| | | | P3 | F1 | 0.000 | | | | | |
| | | | P1 | F2 | 5.994 | | | | | |
| | | | P2 | F2 | 5.994 | | | | | |
| | | | P3 | F2 | 5.994 | | | | | |
| | | | P1 | F3 | 11.912 | | | | | |
| | | | P2 | F3 | 11.912 | | | | | |
| | | | P3 | F3 | 11.912 | | | | | |
| Dummy | G2 | S17 | All | All | 1.745 | Flat | Air | | | 17.34 |
| 11 | G2 | S18 | All | All | 2.450 | 268.153 | Non-air | 1.835 | 42.7 | 17.39 |
| | | S19 | P1 | F1 | 2.721 | 135.855 | Air | | | 17.52 |
| | | | P2 | F1 | 8.008 | | | | | |
| | | | P3 | F1 | 14.958 | | | | | |
| | | | P1 | F2 | 2.721 | | | | | |
| | | | P2 | F2 | 8.008 | | | | | |
| | | | P3 | F2 | 14.958 | | | | | |
| | | | P1 | F3 | 2.721 | | | | | |
| | | | P2 | F3 | 8.008 | | | | | |
| | | | P3 | F3 | 14.958 | | | | | |
| 12 | G2 | S20 | All | All | 4.500 | 111.260 | Non-air | 1.530 | 51.6 | 18.86 |
| | | S21 | P1 | F1 | 35.000 | 335.787 | Air | | | 18.97 |
| | | | P2 | F1 | 31.005 | | | | | |
| | | | P3 | F1 | 25.536 | | | | | |
| | | | P1 | F2 | 35.000 | | | | | |
| | | | P2 | F2 | 31.005 | | | | | |
| | | | P3 | F2 | 25.536 | | | | | |
| | | | P1 | F3 | 35.000 | | | | | |
| | | | P2 | F3 | 31.005 | | | | | |
| | | | P3 | F3 | 25.536 | | | | | |
| Image | | S22 | All | All | 0.000 | Flat | | | | |

TABLE 4B

| | \multicolumn{9}{c}{Wavefront Aberrations (∞ focus)} |
|---|---|---|---|---|---|---|---|---|---|
| Combination Image | Position P1 | | | Position P2 | | | Position P3 | | |
| Field | 0.00 | 0.70 | 1.00 | 0.00 | 0.70 | 1.00 | 0.00 | 0.70 | 1.00 |
| Best individual focus | 0.47 | 1.68 | 1.18 | 0.96 | 2.25 | 1.68 | 1.67 | 2.75 | 1.87 |
| Relative to prime lens | +0.15 | +1.27 | +0.76 | +0.63 | +1.70 | +1.37 | +1.34 | +1.32 | +1.62 |

Table 5A and 5B for Combined Imaging Optical System for 3$^{rd}$ Example 2—Element RAC

TABLE 5A

Optical Prescription for Combined Imaging Optical System

| Item | GRP | Sf | IP | FP | S (mm) | R (mm) | Type | n | V | $\frac{CA}{2}$ (mm) |
|---|---|---|---|---|---|---|---|---|---|---|
| Object | | S0 | P1 | F1 | ~∞ | | | | | |
| | | | P2 | F1 | ~∞ | | | | | |
| | | | P3 | F1 | ~∞ | | | | | |
| | | | P1 | F2 | 1560 | | | | | |
| | | | P2 | F2 | 1560 | | | | | |
| | | | P3 | F2 | 1560 | | | | | |
| | | | P1 | F3 | 810 | | | | | |
| | | | P2 | F3 | 810 | | | | | |
| | | | P3 | F3 | 810 | | | | | |
| 1 | G1 | S1 | All | All | 11.407 | 115.449 | Non-air | 1.821 | 32.8 | 33.34 |
| 2 | G1 | S2 | All | All | 5.000 | −275.963 | Non-air | 1.561 | 44.2 | 32.73 |
| | | S3 | All | All | 4.838 | 48.720 | Air | | | 29.72 |
| 3 | G1 | S4 | All | All | 17.791 | 72.44 | Non-air | 1.735 | 53.0 | 29.90 |
| 4 | G1 | S5 | All | All | 4.700 | −66.165 | Non-air | 1.825 | 35.1 | 29.44 |
| | | S6 | All | All | 0.700 | 174.173 | Air | | | 28.45 |
| 5 | G1 | S7 | All | All | 15.296 | 54.464 | Non-air | 1.835 | 42.7 | 28.50 |
| 6 | G1 | S8 | All | All | 11.363 | −127.571 | Non-air | 1.606 | 37.4 | 27.37 |
| | | S9 | P1 | F1 | 9.611 | 32.766 | Air | | | 20.07 |
| | | | P2 | F1 | 9.611 | | | | | |
| | | | P3 | F1 | 9.611 | | | | | |
| | | | P1 | F2 | 12.644 | | | | | |
| | | | P2 | F2 | 12.644 | | | | | |
| | | | P3 | F2 | 12.644 | | | | | |
| | | | P1 | F3 | 15.411 | | | | | |
| | | | P2 | F3 | 15.411 | | | | | |
| | | | P3 | F3 | 15.411 | | | | | |
| Stop | G1 | S10 | All | All | 6.277 | Flat | Air | | | 19.33 |
| 7 | G1 | S11 | All | All | 12.500 | −56.320 | Non-air | 1.746 | 27.5 | 19.04 |
| 8 | G1 | S12 | All | All | 12.500 | 185.131 | Non-air | 1.835 | 42.7 | 20.69 |
| | | S13 | All | All | 1.956 | −66.939 | Air | | | 21.38 |
| 9 | G1 | S14 | All | All | 14.546 | 121.145 | Non-air | 1.835 | 42.7 | 20.55 |
| 10 | G1 | S15 | All | All | 12.500 | −30.000 | Non-air | 1.824 | 39.3 | 19.82 |
| | | S16 | P1 | F1 | 0.000 | −371.317 | Air | | | 17.10 |
| | | | P2 | F1 | 0.000 | | | | | |
| | | | P3 | F1 | 0.000 | | | | | |
| | | | P1 | F2 | 5.994 | | | | | |
| | | | P2 | F2 | 5.994 | | | | | |
| | | | P3 | F2 | 5.994 | | | | | |
| | | | P1 | F3 | 11.912 | | | | | |
| | | | P2 | F3 | 11.912 | | | | | |
| | | | P3 | F3 | 11.912 | | | | | |
| Dummy | G2 | S17 | P1 | F1 | 2.149 | Flat | Air | | | 17.21 |
| | | | P2 | F1 | 5.910 | | | | | |
| | | | P3 | F1 | 2.000 | | | | | |
| | | | P1 | F2 | 2.149 | | | | | |
| | | | P2 | F2 | 5.910 | | | | | |
| | | | P3 | F2 | 2.000 | | | | | |
| | | | P1 | F3 | 2.149 | | | | | |
| | | | P2 | F3 | 5.910 | | | | | |
| | | | P3 | F3 | 2.000 | | | | | |
| 11 | G2 | S18 | All | All | 2.450 | 126.485 | Non-air | 1.835 | 42.7 | 17.65 |
| | | S19 | P1 | F1 | 1.468 | 52.755 | Air | | | 17.55 |
| | | | P2 | F1 | 11.262 | | | | | |
| | | | P3 | F1 | 20.178 | | | | | |
| | | | P1 | F2 | 1.468 | | | | | |
| | | | P2 | F2 | 11.262 | | | | | |

TABLE 5A-continued

Optical Prescription for Combined Imaging Optical System

| Item | GRP | Sf | IP | FP | S (mm) | R (mm) | Type | n | V | $\frac{CA}{2}$ (mm) |
|---|---|---|---|---|---|---|---|---|---|---|
| | | | P3 | F2 | 20.178 | | | | | |
| | | | P1 | F3 | 1.468 | | | | | |
| | | | P2 | F3 | 11.262 | | | | | |
| | | | P3 | F3 | 20.178 | | | | | |
| 12 | G2 | S20 | All | All | 6.057 | 49.573 | Non-air | 1.698 | 44.8 | 22.21 |
| | | S21 | P1 | F1 | 35.000 | 126.646 | Air | | | 22.00 |
| | | | P2 | F1 | 26.679 | | | | | |
| | | | P3 | F1 | 26.866 | | | | | |
| | | | P1 | F2 | 35.000 | | | | | |
| | | | P2 | F2 | 26.679 | | | | | |
| | | | P3 | F2 | 26.866 | | | | | |
| | | | P1 | F3 | 35.000 | | | | | |
| | | | P2 | F3 | 26.679 | | | | | |
| | | | P3 | F3 | 26.866 | | | | | |
| Image | | S22 | All | All | 0.000 | Flat | | | | |

TABLE 5B

| Wavefront Aberrations (∞ focus) | | | | | | | | | |
|---|---|---|---|---|---|---|---|---|---|
| Combination Image | Position P1 | | | Position P2 | | | Position P3 | | |
| Field | 0.00 | 0.70 | 1.00 | 0.00 | 0.70 | 1.00 | 0.00 | 0.70 | 1.00 |
| Best individual focus | 0.55 | 0.84 | 0.74 | 1.44 | 6.38 | 6.75 | 2.20 | 9.77 | 11.87 |
| Relative to prime lens | +0.23 | +0.43 | +0.32 | +1.11 | +5.83 | +6.44 | +1.84 | +9.34 | +11.12 |

Tables 6A and 6B for Combined Imaging Optical System with Single—Element RAC

TABLE 6A

Optical Prescription for Combined Imaging Optical System with Single-Element RAC

| Item | GRP | Sf | IP | FP | S (mm) | R (mm) | Type | n | V | $\frac{CA}{2}$ (mm) |
|---|---|---|---|---|---|---|---|---|---|---|
| Object | | S0 | P1 | F1 | 1000010 | Flat | Air | | | |
| | | | P2 | F1 | 1000010 | | | | | |
| | | | P3 | F1 | 1000010 | | | | | |
| | | | P1 | F2 | 1560 | | | | | |
| | | | P2 | F2 | 1560 | | | | | |
| | | | P3 | F2 | 1560 | | | | | |
| | | | P1 | F3 | 810 | | | | | |
| | | | P2 | F3 | 810 | | | | | |
| | | | P3 | F3 | 810 | | | | | |
| 1 | G1 | S1 | All | All | 11.407 | 115.449 | Non-air | 1.821 | 32.8 | 33.34 |
| 2 | G1 | S2 | All | All | 5.000 | −275.963 | Non-air | 1.561 | 44.2 | 32.73 |
| | | S3 | All | All | 4.838 | 48.720 | Air | | | 29.72 |
| 3 | G1 | S4 | All | All | 17.791 | 72.44 | Non-air | 1.735 | 53.0 | 29.90 |
| 4 | G1 | S5 | All | All | 4.700 | −66.165 | Non-air | 1.825 | 35.1 | 29.44 |
| | | S6 | All | All | 0.700 | 174.173 | Air | | | 28.45 |
| 5 | G1 | S7 | All | All | 15.296 | 54.464 | Non-air | 1.835 | 42.7 | 28.50 |
| 6 | G1 | S8 | All | All | 11.363 | 127.571 | Non-air | 1.606 | 37.4 | 27.37 |
| | | S9 | P1 | F1 | 9.611 | 32.766 | Air | | | 20.07 |
| | | | P2 | F1 | 9.611 | | | | | |
| | | | P3 | F1 | 9.611 | | | | | |
| | | | P1 | F2 | 12.644 | | | | | |
| | | | P2 | F2 | 12.644 | | | | | |
| | | | P3 | F2 | 12.644 | | | | | |
| | | | P1 | F3 | 15.411 | | | | | |
| | | | P2 | F3 | 15.411 | | | | | |
| | | | P3 | F3 | 15.411 | | | | | |

TABLE 6A-continued

Optical Prescription for Combined Imaging Optical System with Single-Element RAC

| Item | GRP | Sf | IP | FP | S (mm) | R (mm) | Type | n | V | $\frac{CA}{2}$ (mm) |
|---|---|---|---|---|---|---|---|---|---|---|
| Stop | G1 | S10 | All | All | 6.277 | Flat | Air | | | 19.33 |
| 7 | G1 | S11 | All | All | 12.500 | −56.320 | Non-air | 1.746 | 27.5 | 19.04 |
| 8 | G1 | S12 | All | All | 12.500 | 185.131 | Non-air | 1.835 | 42.7 | 20.69 |
| | | S13 | All | All | 1.956 | −66.939 | Air | | | 21.38 |
| 9 | G1 | S14 | All | All | 14.546 | 121.145 | Non-air | 1.835 | 42.7 | 20.55 |
| 10 | G1 | S15 | All | All | 12.500 | −30.000 | Non-air | 1.824 | 39.3 | 19.82 |
| | | S16 | P1 | F1 | 0.000 | −371.317 | Air | | | 17.10 |
| | | | P2 | F1 | 0.000 | | | | | |
| | | | P3 | F1 | 0.000 | | | | | |
| | | | P1 | F2 | 5.994 | | | | | |
| | | | P2 | F2 | 5.994 | | | | | |
| | | | P3 | F2 | 5.994 | | | | | |
| | | | P1 | F3 | 11.912 | | | | | |
| | | | P2 | F3 | 11.912 | | | | | |
| | | | P3 | F3 | 11.912 | | | | | |
| Dummy | G2 | S17 | All | All | 7.705 | Flat | Air | | | 17.93 |
| | | | P1 | F1 | 2.782 | | | | | |
| | | | P2 | F1 | 8.041 | | | | | |
| | | | P3 | F1 | 13.448 | | | | | |
| | | | P1 | F2 | 2.782 | | | | | |
| | | | P2 | F2 | 8.041 | | | | | |
| | | | P3 | F2 | 13.448 | | | | | |
| | | | P1 | F3 | 2.782 | | | | | |
| | | | P2 | F3 | 8.041 | | | | | |
| | | | P3 | F3 | 13.448 | | | | | |
| 11 | G2 | S18 | All | All | 4.500 | −67.531 | Non-air | 1.835 | 42.7 | 18.38 |
| | | S19 | P1 | F1 | 32.244 | −64.918 | Air | | | 19.15 |
| | | | P2 | F1 | 26.985 | | | | | |
| | | | P3 | F1 | 21.578 | | | | | |
| | | | P1 | F2 | 32.244 | | | | | |
| | | | P2 | F2 | 26.985 | | | | | |
| | | | P3 | F2 | 21.578 | | | | | |
| | | | P1 | F3 | 32.244 | | | | | |
| | | | P2 | F3 | 26.985 | | | | | |
| | | | P3 | F3 | 21.578 | | | | | |
| Image | | S20 | All | All | 0.000 | Flat | | | | |

TABLE 6B

Wavefront Aberrations (∞ focus F1)

| Combination Image | Position P1 | | | Position P2 | | | Position P3 | | |
|---|---|---|---|---|---|---|---|---|---|
| Field | 0.00 | 0.70 | 1.00 | 0.00 | 0.70 | 1.00 | 0.00 | 0.70 | 1.00 |
| Best individual focus | 0.47 | 2.02 | 1.46 | 0.74 | 1.67 | 1.32 | 0.85 | 1.36 | 1.17 |
| Change w/r to prime | +0.15 | +1.61 | +1.04 | +0.41 | +1.12 | +1.01 | +0.49 | +0.93 | +0.92 |

Intermediate Focus F2

| Combination Image | Position P1 | | | Position P2 | | | Position P3 | | |
|---|---|---|---|---|---|---|---|---|---|
| Field | 0.00 | 0.70 | 1.00 | 0.00 | 0.70 | 1.00 | 0.00 | 0.70 | 1.00 |
| Best individual focus | 0.45 | 1.59 | 1.23 | 0.65 | 1.32 | 1.08 | 0.73 | 1.05 | 0.90 |
| Change w/r to prime | +0.13 | +1.00 | +0.81 | +0.32 | +0.77 | +0.77 | +0.37 | +0.62 | +0.65 |

| Close Focus F3 | | | | | | | | | |
|---|---|---|---|---|---|---|---|---|---|
| Combination Image | Position P1 | | | Position P2 | | | Position P3 | | |
| Field | 0.00 | 0.70 | 1.00 | 0.00 | 0.70 | 1.00 | 0.00 | 0.70 | 1.00 |
| Best individual focus | 0.31 | 1.40 | 1.06 | 0.40 | 1.16 | 1.00 | 0.45 | 0.93 | 0.87 |
| Change w/r to prime | −0.01 | +0.29 | +0.64 | +0.07 | +0.61 | +0.67 | +0.07 | +0.50 | +0.62 |

What is claimed is:

1. A residual aberration controller adjustable for causing an aesthetic change in an image formed by an image-forming light beam, the residual aberration controller comprising:
 a) one or more optical elements operably disposed in an image-forming optical path over which the image-forming light beam travels;
 b) wherein at least one of the one or more optical elements is axially movable between at least a first position and a second position wherein:
  i) the first position alters the image-forming light beam by introducing at least one residual aberration to cause a first amount of the aesthetic change to the image; and
  ii) the second position comprises either:
   A) a null position that causes no substantial aesthetic change to the image, or;
   B) a minimum position that causes a second amount of the aesthetic change to the image that is less than the first amount of the aesthetic change to the image.

2. The residual aberration controller according to claim 1, wherein the residual aberration controller has an overall optical power of less than one diopter.

3. The residual aberration controller according to claim 1, wherein the residual aberration controller has optics consisting of a single lens element.

4. The residual aberration controller according to claim 1, wherein the residual aberration controller has optics consisting of two lens elements.

5. The residual aberration controller according to claim 1, wherein the residual aberration controller has optics consisting of three lens elements.

6. The residual aberration controller according to claim 1, wherein the image-forming light beam is formed by an image-forming optical system having a focal length, and wherein the residual aberration controller does not change the focal length by more than 15%.

7. The residual aberration controller according to claim 6, wherein the residual aberration controller does not change the focal length by more than 10%.

8. The residual aberration controller according to claim 1, wherein the image-forming light beam forms the image on an image sensor surface, and wherein the residual aberration controller resides immediately adjacent the image sensor surface when in use.

9. The residual aberration controller according to claim 1, wherein, during use, the image-forming light beam is formed by an image-forming optical system having a working space, and wherein the residual aberration controller is operably disposed within the working space.

10. The residual aberration controller according to claim 1, wherein, during use, the residual aberration controller is removably attachable to a rear-end of the image-forming optical system as a rear-end attachment.

11. The residual aberration controller according to claim 1, wherein the residual aberration controller is formed integral with the image-forming optical system.

12. The residual aberration controller according to claim 1, wherein the image-forming light beam forms an intermediate image, and wherein the residual aberration controller resides adjacent and optically upstream of the intermediate image.

13. The residual aberration controller according to claim 1, wherein the at least one residual aberration comprises at least one of spherical aberration, coma, astigmatism and field curvature.

14. The residual aberration controller according to claim 1, wherein the image-forming light beam has a root-mean-square (RMS) wavefront error, and wherein the at least one residual aberration increases the RMS wavefront error by at least a ½ wave for at least one field position of the image and for at least one imaging wavelength between at least the first position and the second position.

15. The residual aberration controller according to claim 1, wherein the aesthetic change in the image comprises at least one of flare and bokeh.

16. The residual aberration controller according to claim 1, wherein the aesthetic change in the image substantially replicates imaging by an anamorphic optical system.

17. The residual aberration controller according to claim 1, wherein the image-forming light beam is formed by an all spherical image-forming optical system, and wherein the one or more optical elements are all spherical optical elements.

18. A method, comprising:
 adjustably producing an aesthetic effect in an image formed by an image-forming optical beam, wherein adjustably producing the aesthetic effect comprises:
 operably disposing a residual aberration controller (RAC) in the image-forming optical beam; and
 adjusting the RAC between:
  a) a first configuration that introduces at least one residual aberration to the image-forming light beam to cause a first amount of the aesthetic change to the image; and
  b) a second configuration that is either: i) a null position that causes no substantial aesthetic change to the image; or ii) a minimum position that introduces at least one residual aberration to cause a second amount of the aesthetic change to the image that is less than the first amount of the aesthetic change to the image.

19. The method according to claim 18, further comprising:
 forming the image-forming optical beam using an imaging optical system having a working space; and
 operably disposing the RAC within the working space.

20. The method according to claim 18, wherein the at least one residual aberration comprises at least one of spherical aberration, coma, astigmatism and field curvature.

21. The method according to claim 18, wherein producing the aesthetic change in the image forms an aesthetic image, and the method further comprising:
   capturing a digital image of the aesthetic image using a digital image sensor; and
   displaying the digital image of the aesthetic image.

22. The method according to claim 21, further comprising creating a movie by capturing a series of digital images of the aesthetic images.

23. The method according to claim 18, wherein the aesthetic effect in the image comprises at least one of flare and bokeh.

24. The method according to claim 18, wherein the RAC has optics consisting of only spherical lens elements and wherein the aesthetic effect in the image substantially replicates imaging by an anamorphic optical system.

* * * * *